US011206405B2

(12) United States Patent
Gao et al.

(10) Patent No.: US 11,206,405 B2
(45) Date of Patent: Dec. 21, 2021

(54) VIDEO ENCODING METHOD AND APPARATUS, VIDEO DECODING METHOD AND APPARATUS, COMPUTER DEVICE, AND STORAGE MEDIUM

(71) Applicant: Tencent Technology (Shenzhen) Company Limited, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/988,513

(22) Filed: Aug. 7, 2020

(65) Prior Publication Data

US 2020/0396460 A1  Dec. 17, 2020

Related U.S. Application Data

(63) Continuation of application No. PCT/CN2019/090277, filed on Jun. 6, 2019.

(30) Foreign Application Priority Data

Jun. 20, 2018 (CN) .......................... 201810636200.4

(51) Int. Cl.
*H04N 19/132* (2014.01)
*H04N 19/124* (2014.01)
(Continued)

(52) U.S. Cl.
CPC ......... *H04N 19/132* (2014.11); *H04N 19/124* (2014.11); *H04N 19/147* (2014.11);
(Continued)

(58) Field of Classification Search
CPC .......... H04N 21/8456; H04N 21/2662; H04N 19/132; H04N 19/30; H04N 19/124; H04N 19/172; H04N 19/59; H04N 19/34
See application file for complete search history.

(56) References Cited

U.S. PATENT DOCUMENTS

| 6,937,770 B1 * | 8/2005 | Oguz | H04N 19/176 375/240.2 |
|---|---|---|---|
| 2003/0063810 A1 * | 4/2003 | Chebil | H04N 19/103 382/240 |

(Continued)

FOREIGN PATENT DOCUMENTS

| CN | 101399991 A | 4/2009 |
|---|---|---|
| CN | 103813174 A | 5/2014 |

(Continued)

OTHER PUBLICATIONS

Tencent Technology, WO, PCT/CN2019/090277, Aug. 23, 2019, 5 pgs.
Tencent Technology, IPRP, PCT/CN2019/090277, Dec. 22, 2020, 6 pgs.

*Primary Examiner* — Daniel Chang
(74) *Attorney, Agent, or Firm* — Morgan, Lewis & Bockius LLP

(57) ABSTRACT

This application relates to a video decoding method performed at a computer device. The method includes: obtaining encoded data corresponding to a current video frame; obtaining a processing parameter corresponding to the current video frame; determining a target processing manner corresponding to the current video frame according to the processing parameter, the target processing manner being one of candidate processing manners, the candidate processing manners comprising at least one of a full resolution processing manner and a downsampling processing manner, and the processing parameter being consistent with a cor- (Continued)

responding processing parameter in an encoding process; and decoding the encoded data corresponding to the current video frame according to the target processing manner, to obtain a corresponding decoded video frame. In the encoding method, a processing manner for a video frame can be flexibly selected, thereby improving video encoding quality in the case of limited bandwidth.

18 Claims, 28 Drawing Sheets

(51) Int. Cl.
*H04N 19/147* (2014.01)
*H04N 19/176* (2014.01)
*H04N 19/513* (2014.01)
*H04N 19/523* (2014.01)
*H04N 19/59* (2014.01)

(52) U.S. Cl.
CPC ......... *H04N 19/176* (2014.11); *H04N 19/513* (2014.11); *H04N 19/523* (2014.11); *H04N 19/59* (2014.11)

(56) References Cited

U.S. PATENT DOCUMENTS

| | | | | |
|---|---|---|---|---|
| 2004/0088739 A1* | 5/2004 | Shimoji | ............... | H04N 21/426 725/135 |
| 2005/0220180 A1* | 10/2005 | Barlev | ............... | H04L 12/2856 375/222 |
| 2008/0137755 A1* | 6/2008 | Onur | ............... | H04N 19/115 375/240.26 |
| 2009/0052526 A1* | 2/2009 | Fukuda | ............... | H04N 19/61 375/240.03 |
| 2011/0317773 A1 | 12/2011 | Lancaster | | |
| 2014/0301441 A1* | 10/2014 | Wang | ............... | H04N 19/70 375/240.02 |
| 2014/0325572 A1* | 10/2014 | Yie | ............... | H04N 21/8456 725/74 |
| 2015/0172726 A1* | 6/2015 | Faramarzi | ............ | H04N 19/132 375/240.24 |
| 2015/0206542 A1* | 7/2015 | Gilson | ............... | H04N 21/437 704/226 |
| 2016/0255355 A1* | 9/2016 | Andersson | ............ | H04N 19/157 375/240.02 |
| 2016/0277762 A1* | 9/2016 | Zhang | ............... | H04N 19/593 |
| 2016/0316215 A1* | 10/2016 | Minoo | ............... | H04N 19/132 |
| 2017/0012725 A1* | 1/2017 | Lee | ............... | H04N 21/4722 |
| 2017/0013028 A1* | 1/2017 | Yang | ............... | H04N 21/235 |
| 2017/0048531 A1 | 2/2017 | Minoo et al. | | |
| 2017/0064311 A1* | 3/2017 | Ma | ............... | H04L 65/4084 |
| 2017/0208328 A1* | 7/2017 | Kuusela | ............... | H04N 19/59 |
| 2017/0302981 A1* | 10/2017 | Sethuraman | ....... | H04N 21/2662 |
| 2019/0141323 A1* | 5/2019 | Yang | ............... | H04N 19/70 |

FOREIGN PATENT DOCUMENTS

| | | | |
|---|---|---|---|
| CN | 103828358 A | | 5/2014 |
| CN | 104601993 A | | 5/2015 |
| CN | 105959700 A | * | 9/2016 |
| CN | 105959700 A | | 9/2016 |
| CN | 107155107 A | | 9/2017 |
| CN | 108769681 A | | 11/2018 |
| CN | 108833918 A | | 11/2018 |

* cited by examiner

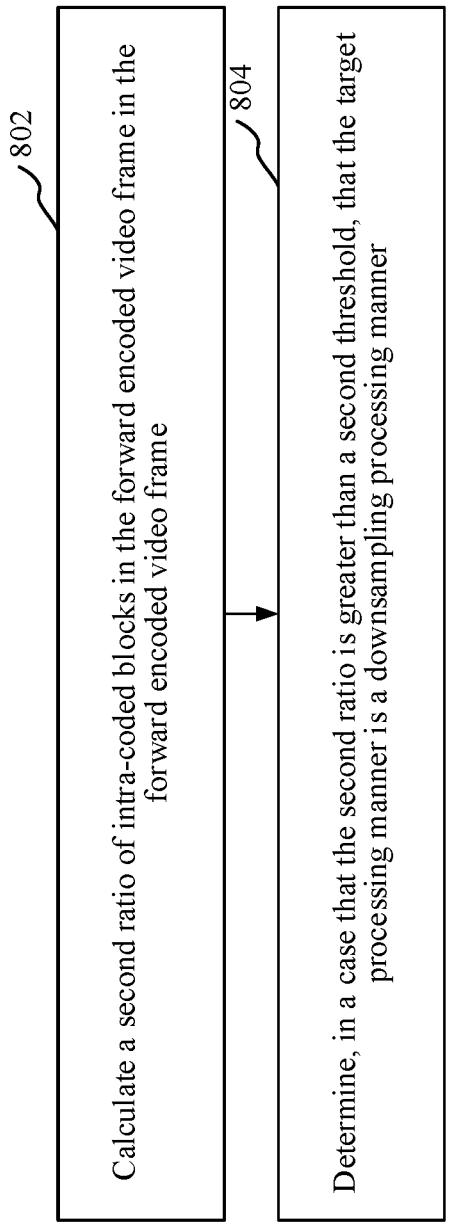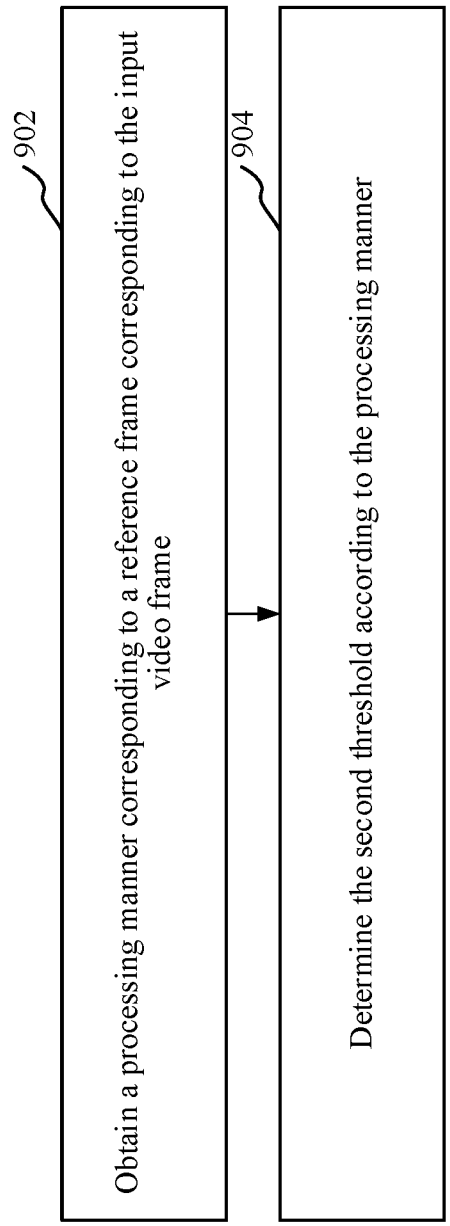
FIG. 8
FIG. 9

|   | ... | ... | ... | ... | ... | ... |   |
|---|-----|-----|-----|-----|-----|-----|---|
|...| C1  | c11 | A1  | a11 | B1  | b11 |...|
|...| c13 | c12 | a13 | a12 | b13 | b12 |...|
|...| C2  | c21 | A2  | a21 | B2  | b21 |...|
|...| c23 | c22 | a23 | a22 | b13 | b22 |...|
|...| C3  | c31 | A3  | a31 | B3  | b31 |...|
|...| c33 | c32 | a33 | a32 | b33 | b32 |...|
|   | ... | ... | ... | ... | ... | ... |   |

FIG. 15

| C1 | ... | ... | ... | A1  | ... | ... | ... | B1 |
|----|-----|-----|-----|-----|-----|-----|-----|----|
|... | ... | ... | ... | ... | ... | ... | ... |... |
|... | ... | ... | ... | ... | ... | ... | ... |... |
|... | ... | ... | ... | ... | ... | ... | ... |... |
| C2 | ... | ... | ... | A2  | a4  | a8  | a12 | B2 |
|... | ... | ... | ... | a1  | a5  | a9  | a13 |... |
|... | ... | ... | ... | a2  | a6  | a10 | a14 |... |
|... | ... | ... | ... | a3  | a7  | a11 | a15 |... |
| C3 | ... | ... | ... | A3  | ... | ... | ... | B3 |

FIG. 16

VIDEO ENCODING METHOD AND APPARATUS, VIDEO DECODING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2019/090277, entitled "VIDEO ENCODING METHOD AND DECODING METHOD AND DEVICE, COMPUTER EQUIPMENT AND STORAGE MEDIUM" filed on Jun. 6, 2019, which claims priority to Chinese Patent Application No. 201810636200.4, entitled "VIDEO ENCODING METHOD AND APPARATUS, VIDEO DECODING METHOD AND APPARATUS, COMPUTER DEVICE, AND STORAGE MEDIUM" filed Jun. 20, 2018, all of which are incorporated by reference in their entirety.

FIELD OF THE TECHNOLOGY

This application relates to the field of video encoding technologies, and in particular, to a video encoding method and apparatus, a video decoding method and apparatus, a computer device, and a storage medium.

BACKGROUND OF THE DISCLOSURE

With development of digital media technologies and computer technologies, videos are applied to various fields, such as mobile communication, network monitoring, and network television. As hardware performance and screen resolution improve, users are increasingly demanding high-definition videos.

Under the condition of limited bandwidth, a conventional encoder encodes video frames indiscriminately, which may lead to poor video quality in some scenarios. For example, at 750 kbps, when all video frames are encoded indiscriminately, some of the video frames have poor quality. Through analysis, similar problems exist in H.264, H.265, iOS, and other encoders.

SUMMARY

Embodiments of this application provide a video encoding method and apparatus, a video decoding method and apparatus, a computer device, and a storage medium, so that a processing manner for a video frame can be flexibly selected, to process an input video frame, thereby improving video encoding or video decoding quality in the case of limited bandwidth.

A video decoding method is provided, applied to a computer device having a processor and memory storing a plurality of computer programs to be executed by the processor, the method including:

obtaining encoded data corresponding to a current frame to be decoded;

obtaining a processing parameter corresponding to the current frame;

determining a target processing manner corresponding to the current frame according to the processing parameter, the target processing manner being one of candidate processing manners, the candidate processing manners including at least one of a full resolution processing manner and a downsampling processing manner, and the processing parameter being consistent with a corresponding processing parameter in an encoding process; and decoding the encoded data corresponding to the current frame according to the target processing manner, to obtain a corresponding decoded video frame.

A computer device is provided, including memory, a processor, and a plurality of computer programs stored in the memory and executable on the processor, the plurality of computer programs, when executed by the processor, implementing the video decoding method provided above.

A non-transitory computer-readable storage medium is provided, storing a plurality of computer programs, the computer programs, when executed by a processor of a computer device, causing the computer device to implement the video decoding method provided above.

According to the video decoding method and apparatus, the computer device, and the storage medium, encoded data corresponding to a current video frame is obtained, a processing parameter corresponding to the current video frame is obtained, a target processing manner corresponding to the current video frame is determined according to the processing parameter, the target processing manner being one of candidate processing manners, the candidate processing manners including at least one of a full resolution processing manner and a downsampling processing manner, and the processing parameter being consistent with a corresponding processing parameter in an encoding process, and finally, the encoded data corresponding to the current video frame is decoded according to the target processing manner, to obtain a corresponding decoded video frame. Therefore, during decoding, the processing parameter corresponding to the current video frame is obtained, the processing parameter being consistent with the corresponding processing parameter in the encoding process, that is, the processing parameter in the encoding process being reproduced in the decoding process, then, the target processing manner is determined according to the processing parameter, and finally, decoding is performed according to the target processing manner, so that an accurate decoded video frame can be obtained.

BRIEF DESCRIPTION OF THE DRAWINGS

FIG. 8 is a schematic flowchart of generation steps of a target processing manner corresponding to an input video frame according to still another embodiment of this application.

FIG. 9 is a schematic flowchart of a video encoding method according to another embodiment of this application.

FIG. 15 is a schematic diagram of interpolating a reference frame according to an embodiment of this application.

FIG. 16 is a schematic diagram of interpolating a reference frame according to an embodiment of this application.

DESCRIPTION OF EMBODIMENTS

To make the objectives, the technical solutions, and the advantages of this application clearer, the following further describes this application in detail with reference to the accompanying drawings and the embodiments. It is to be understood that the embodiments described herein are only used to describe this application, instead of limiting this application.

It may be understood that the terms "first", "second" and the like used in this application may be used for describing various elements in this specification. However, the elements are not limited by the terms unless otherwise specified. The terms are only used for distinguishing one element from another element. For example, without departing from the scope of this application, a first threshold may be referred to as a second threshold, and similarly, for example, a second threshold may be referred to as a first threshold.

Figure 1:
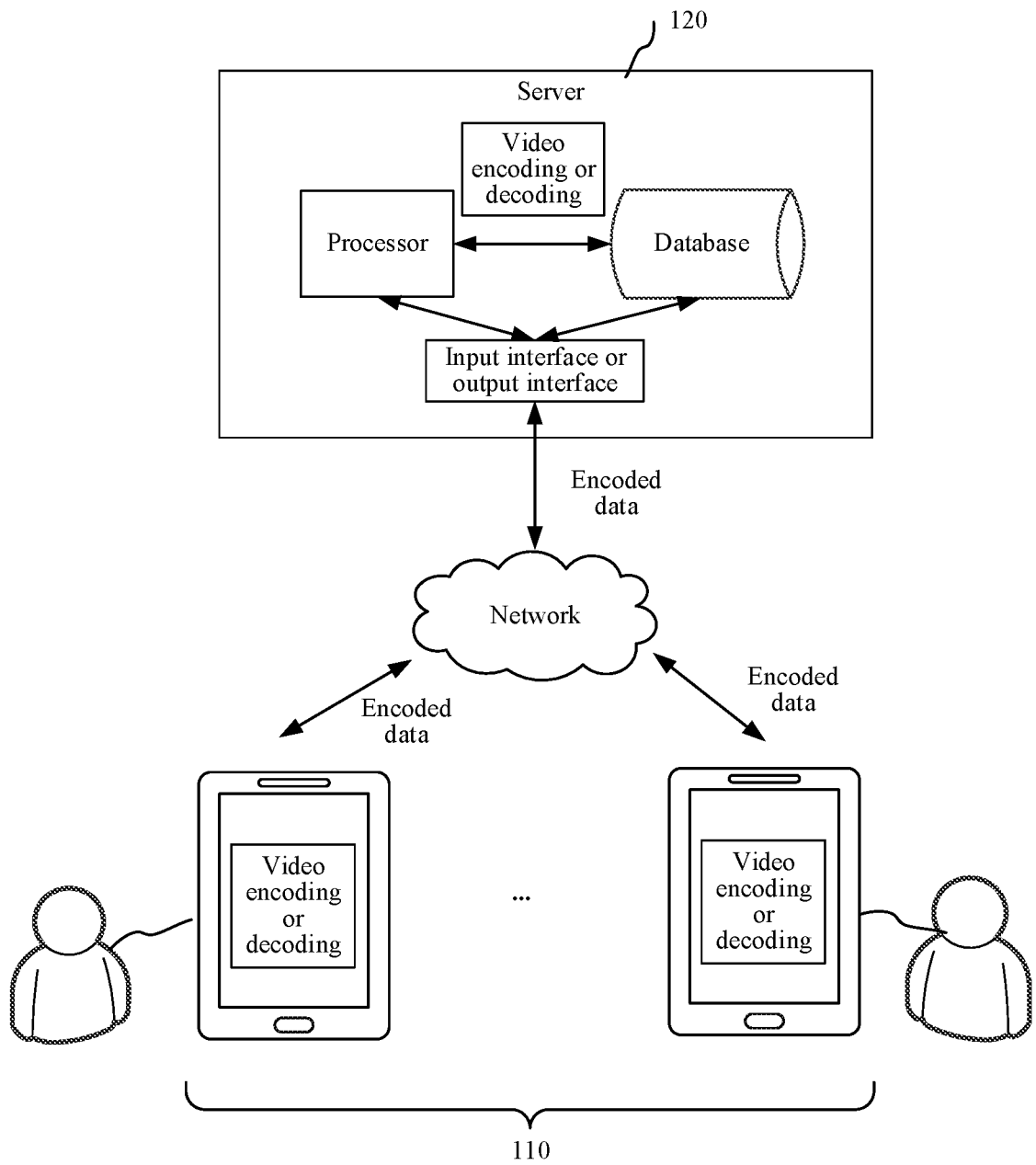
FIG. 1 is a diagram of an application environment of a video encoding method according to an embodiment of this application.

FIG. 1 is a diagram of an application environment of a video encoding method (or a video decoding method) according to an embodiment of this application. As shown in FIG. 1, the application environment includes a terminal 110 and a server 120.

The terminal 110 or the server 120 may perform video encoding by using an encoder or perform video decoding by using a decoder. The terminal 110 or the server 120 may alternatively perform video encoding by using a processor running a video encoding program or perform video decoding by using a processor running a video decoding program. After receiving, through an input interface, encoded data sent by the terminal 110, the server 120 may directly transfer the encoded data to the processor for decoding, or may store the encoded data in a database for subsequent decoding. After obtaining the encoded data by using the processor encoding an original video frame, the server 120 may directly send the encoded data to the terminal 110 through an output interface, or may store the encoded data in a database for subsequent transferring.

The terminal 110 is connected to the server 120 through a network. The terminal 110 may be a desktop terminal or a mobile terminal, and the mobile terminal may be at least one of, but not limited to, a mobile phone, a tablet computer, and a notebook computer. The server 120 may be implemented by an independent server or a server cluster including a plurality of servers.

Figure 2:
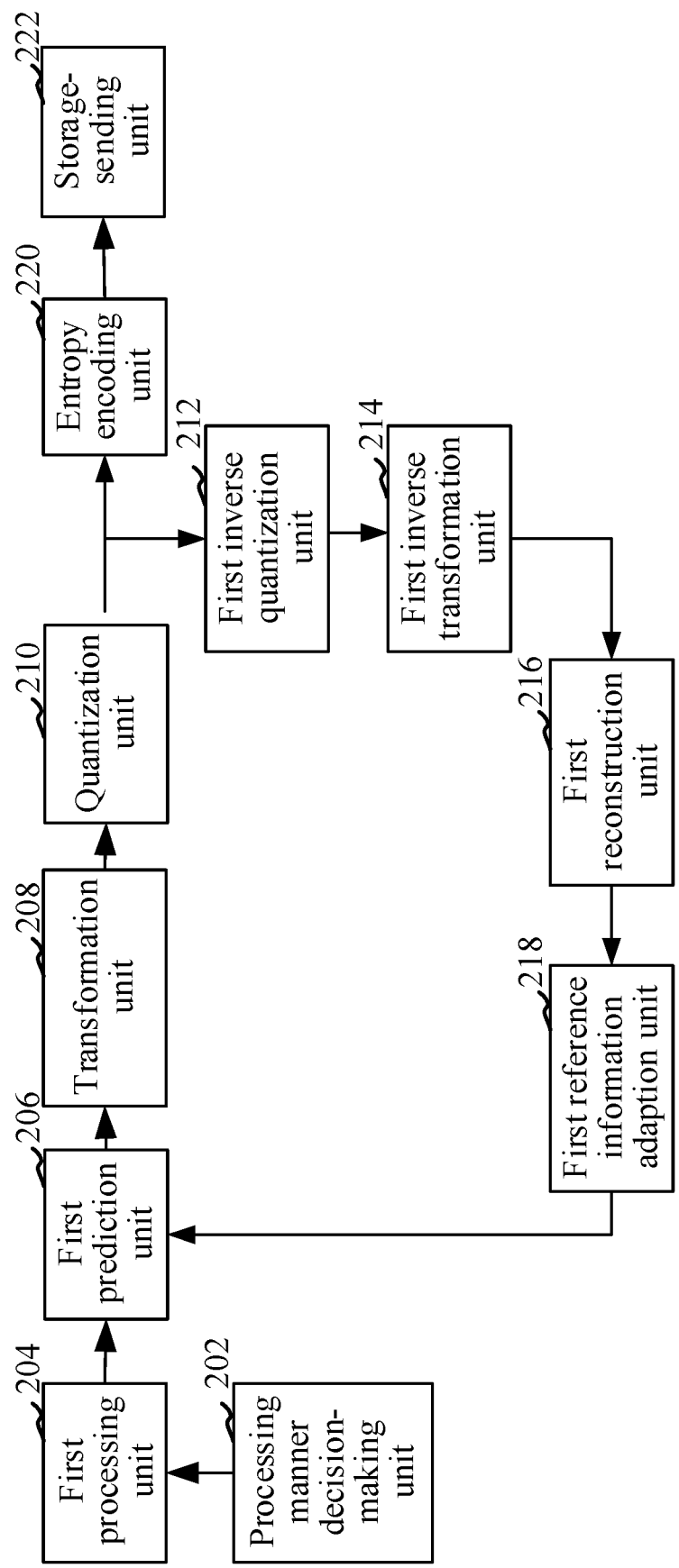
FIG. 2 is a diagram of an encoding framework corresponding to a video encoding method according to an embodiment of this application.

FIG. 2 is a diagram of an encoding framework corresponding to a video encoding method according to an embodiment. In the video encoding method provided in this embodiment of this application, each input video frame of an input video sequence may be obtained and encoded to obtain corresponding encoded data, and the encoded data may be stored or sent by using a storage/sending unit 222, or the encoded data may be stored and sent by using a storage/sending unit 222. A processing manner decision unit 202 may make a processing manner decision on the input video frame, to obtain a processing manner corresponding to the input video frame. A first processing unit 204 may process the input video frame according to the processing manner obtained by the processing manner decision unit 202, to obtain a current frame. A first prediction unit 206 may perform intra prediction or inter prediction on each encoded block of the current frame at a resolution of the current frame, obtain a prediction value and a corresponding motion vector according to an image value of a reference block corresponding to the encoded block, and obtain a prediction residual by subtracting an actual value of the encoded block from the prediction value, the motion vector representing a displacement of the encoded block relative to the reference block. A transformation unit 208 transforms a prediction residual and vector information in a spatial domain to a frequency domain, and may encode a transformation parameter. A method for transforming the prediction residual and the vector information to the frequency domain may be a discrete Fourier transform, a discrete cosine transform, or the like. The vector information may be an actual motion vector or a motion vector difference representing a displacement. The motion vector difference is a difference between the actual motion vector and a prediction motion vector.

A quantization unit 210 maps transformed data to another value. For example, a relatively small value may be obtained by dividing the transformed data by a quantization step. A quantization parameter is a sequence number corresponding to a quantization step, and the corresponding quantization step may be found according to the quantization parameter. A small quantization parameter indicates reservation of most details of an image frame and a high corresponding bit rate. A large quantization parameter indicates a low corresponding bit rate, and relatively great distortion and low quality of an image. A principle of quantization is expressed by the following formula: $FQ=round(y/Qstep)$. $y$ is a value corresponding to a video frame before quantization is performed, $Qstep$ is the quantization step, and $FQ$ is a quantization value obtained by quantizing $y$. The round(x) function refers to rounding a value to an even number, that is, banker's rounding. A correspondence between the quantization parameter and the quantization step may be set according to a requirement. For example, in some video encoding standards, for brightness encoding, the quantization step has 52 values in total that are integers from 0 to 51. For chroma encoding, the quantization step has values that are integers from 0 to 39. In addition, the quantization step increases as the quantization parameter increases. Each time the quantization parameter is increased by 6, the quantization step is doubled.

An entropy encoding unit 220 is configured to perform entropy encoding. Entropy encoding is a data encoding mode in which encoding is performed according to an entropy principle without losing any information, and certain information can be expressed by using a relatively small character. An entropy encoding method may be, for example, Shannon coding or Huffman coding.

A first inverse quantization unit 212, a first inverse transformation unit 214, a first reconstruction unit 216, and a reference information adaption unit 218 are units corresponding to a reconstructed path. Frame reconstruction is performed by using each unit on the reconstructed path to obtain a reference frame, so that consistency of reference frames during encoding and decoding can be maintained. Steps performed by the first inverse quantization unit 212 are a reverse process of quantization. Steps performed by the first inverse transformation unit 214 are a reverse process of transformation performed by the transformation unit 210. The first reconstruction unit 216 is configured to add residual data obtained through inverse transformation to predicted data to obtain a reconstructed reference frame. The first reference information adaption unit 218 is configured to perform, at the resolution of the current frame, adaptive processing on at least one piece of reference information of a reference frame obtained through reconstruction, location information corresponding to each encoded block of the current frame, location information corresponding to each reference block of the reference frame, and a motion vector, so that the first prediction unit 206 performs prediction according to the reference information obtained after the adaptive processing.

Figure 3:
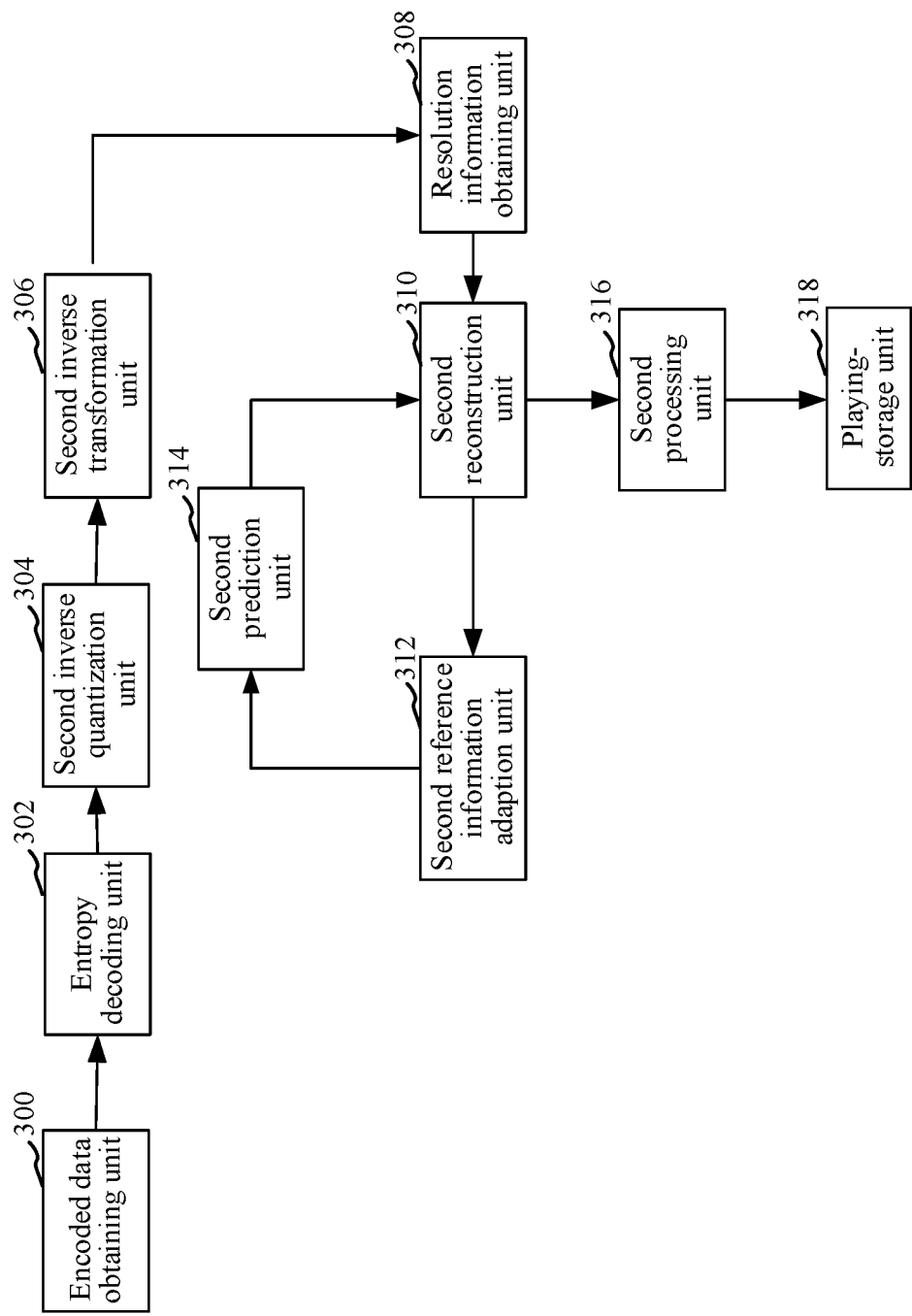
FIG. 3 is a diagram of a decoding framework corresponding to a video decoding method according to an embodiment of this application.

FIG. 3 is a diagram of a decoding framework corresponding to a video decoding method according to an embodiment. In the video decoding method provided in this embodiment of this application, encoded data corresponding to each frame of a video sequence to be decoded may be obtained by using an encoded data obtaining unit 300. Entropy encoded data is obtained after an entropy decoding unit 302 performs entropy decoding. A second inverse quantization unit 304 performs inverse quantization on the entropy encoded data, to obtain inversely quantized data. A second inverse transformation unit 306 performs inverse transformation on the inversely quantized data, to obtain inversely transformed data. The inversely transformed data may be consistent with the data obtained after the first inverse transformation unit 214 in FIG. 2 performs inverse transformation. A resolution information obtaining unit 308 is configured to obtain resolution information corresponding to the current video frame. A second reference information adaption unit 312 is configured to obtain a reference frame obtained through reconstruction performed by a second reconstruction unit 310, perform adaptive processing on at least one piece of reference information of a reference frame, location information corresponding to each current block of the current video frame, location information corresponding to each reference block of the reference frame, and a motion vector according to the resolution information of the current video frame, and perform prediction according to the information obtained after the adaptive processing. A second prediction unit 314 obtains a reference block corresponding to a current block according to the reference information obtained after the adaptive processing, and obtains a prediction value consistent with the prediction value in FIG. 2 according to an image value of the reference block. The second reconstruction unit 310 performs reconstruction according to the prediction value and the inversely transformed data (that is, a prediction residual), to obtain a reconstructed video frame. A second processing unit 316 processes the reconstructed video frame according to the resolution information corresponding to the current video frame, to obtain a corresponding decoded video frame. A playing/storage unit 318 may play or store or play and store the decoded video frame.

It may be understood that the diagram of the encoding framework and the diagram of the decoding framework are merely examples, and do not constitute any limitation on the encoding method applied to the solution of this application. The diagram of the encoding framework and the diagram of the decoding framework may include more or fewer units than those shown in the figures, or some units may be combined, or different component arrangements may be used. For example, loop filtering may alternatively be performed on the reconstructed video frame, to reduce blocking artifacts of the video frame, to improve video quality.

Figure 4:
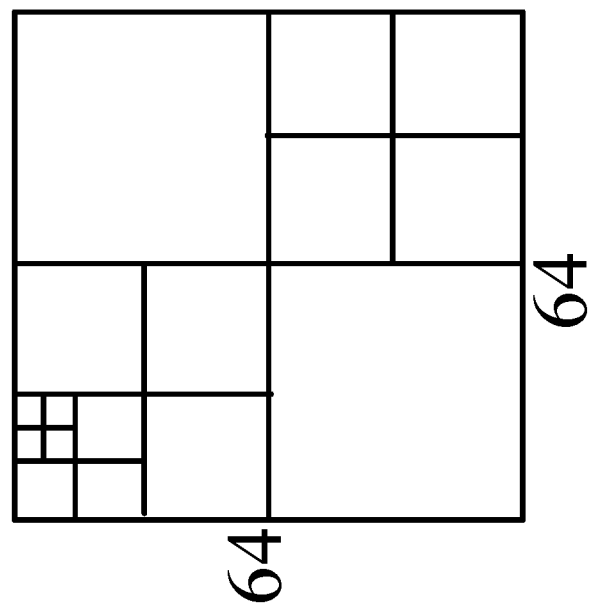
FIG. 4 is a schematic diagram corresponding to an encoded block according to an embodiment of this application.

The current frame may be divided into a plurality of encoded blocks, and a size of the encoded block may be set according to a requirement or obtained through calculation. For example, the size of each encoded block may be 8*8 pixels. Alternatively, rate distortion costs corresponding to various encoded block division manners may be calculated, and a division manner with small rate distortion costs may be selected for encoded block division. FIG. 4 is a schematic diagram of division of an image block of 64*64 pixels, one square representing one encoded block. As can be learned from FIG. 4, a size of the encoded block may include 32*32 pixels, 16*16 pixels, 8*8 pixels, and 4*4 pixels. Certainly, the size of the encoded block may alternatively have other values, for example, 32*16 pixels or 64*64 pixels. It may be understood that, during decoding, because encoded blocks and current blocks are in a one-to-one correspondence, a pixel size of the current block may also include 32*32 pixels, 16*16 pixels, 8*8 pixels, 4*4 pixels, and the like.

In a possible application scenario, the video encoding method and the video decoding method provided in the embodiments of this application may be applied to an application having a video call function. The application may be a social application or an instant messaging application. When two terminals on which the application is installed are engaged in a video call process, a first terminal captures a video frame through a camera, then encodes the video frame by using a video encoding function of the application, to obtain encoded data, and sends the encoded data to a background server of the application. The background server forwards the encoded data to a second terminal. After receiving the encoded data, the second terminal decodes the encoded data by using a video decoding function of the application, performs reconstruction to obtain a video frame, and then displays the video frame. Similarly, the second terminal may send the encoded data obtained through decoding to the first terminal through the background server, and the first terminal decodes and displays the encoded data, thereby achieving a video call between the two parties.

In another possible application scenario, the video encoding method and the video decoding method provided in the embodiments of this application may be applied to an application having a video playing function. The application may be a live video application, a short video application, or a video playing application. A terminal on which the application is installed may capture a video frame through a camera, then encode the video frame by using a video encoding function of the application, to obtain encoded data, and sends the encoded data to a background server of the application. When another terminal requests to view the video, the background server sends the encoded data of the video to the another terminal, and an application on the another terminal decodes the encoded data, to play the video.

Certainly, the foregoing several possible application scenarios are merely used as an example for description. The video encoding method and the video decoding method provided in the embodiments of this application may also be applied to another scenario in which video encoding and decoding are required. This is not limited in the embodiments of this application.

Figure 5:
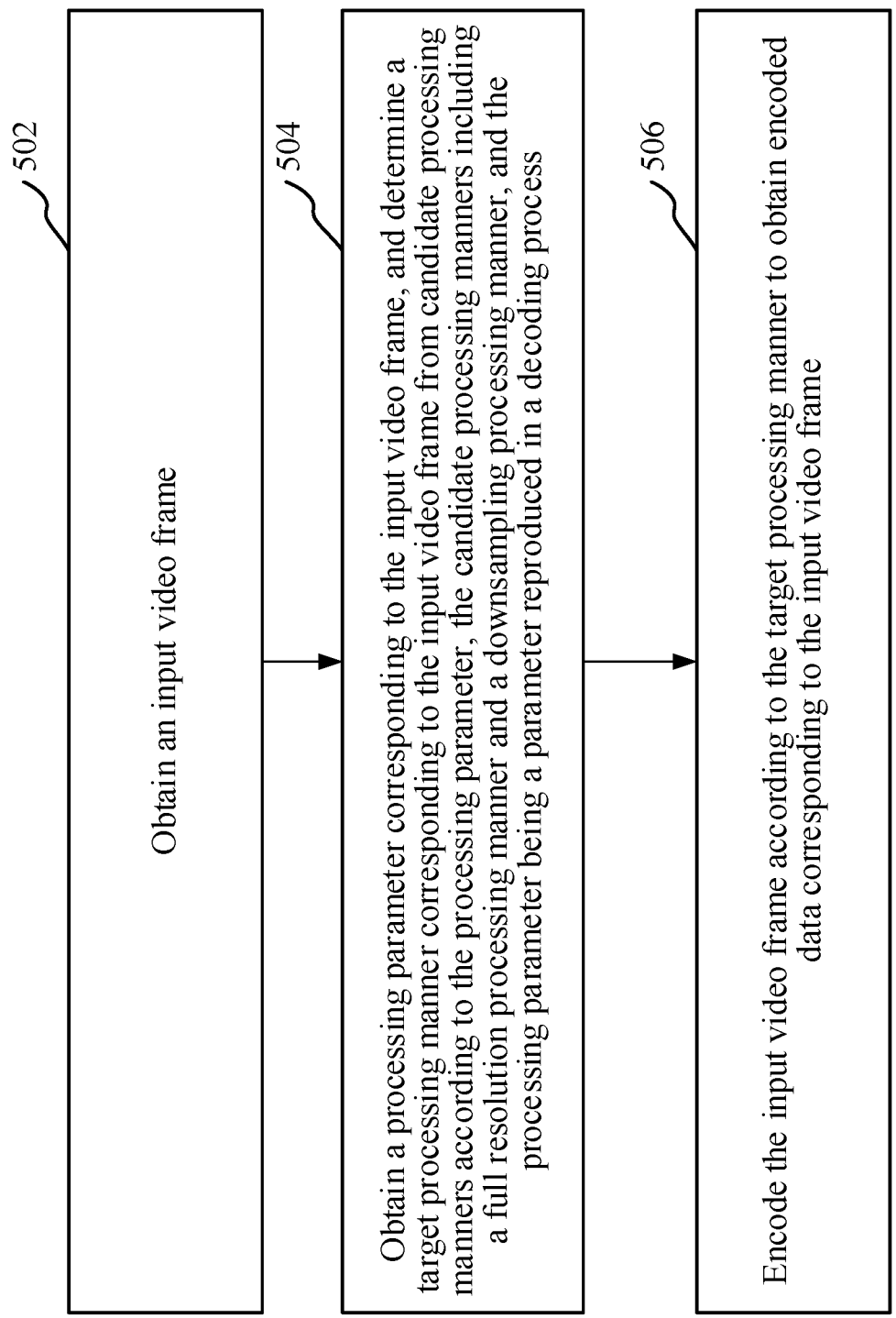
FIG. 5 is a schematic flowchart of a video encoding method according to an embodiment of this application.

As shown in FIG. 5, in an embodiment of this application, a video encoding method is provided. This embodiment is described mainly by using an example in which the method is applied to the terminal 110 or the server 120 in FIG. 1. That is, the method may be performed by a computer device. Referring to FIG. 5, the video encoding method includes at least the following steps:

Step 502. Obtain an Input Video Frame.

For example, a video frame is a unit for forming a video, and one video sequence may include a plurality of input video frames. The input video frame may be a video frame acquired in real time, for example, a video frame acquired in real time by using a camera of a terminal; or may be a prestored video frame corresponding to a video sequence.

An encoded frame prediction type corresponding to the input video frame is determined according to an encoding algorithm. The encoded frame prediction type includes at least one of an I-frame, a P-frame, or a B-frame, the I-frame being an intra prediction frame, the P-frame being a forward prediction frame, and the B-frame being a bidirectional prediction frame. Each encoded block in the P-frame and the B-frame may be encoded in an intra prediction manner or an inter prediction manner.

Step 504. Obtain a processing parameter corresponding to the input video frame, and determine a target processing manner corresponding to the input video frame from candidate processing manners according to the processing parameter, the candidate processing manners including at least one of a full resolution processing manner and a downsampling processing manner, and the processing parameter being a parameter reproduced in a decoding process.

The processing parameter is a parameter used for determining a processing manner. That the processing parameter can be reproduced in a decoding process means that the processing parameter can be obtained or generated in the decoding process, so that information corresponding to the processing manner does not need to be carried in encoded data.

After obtaining a processing parameter consistent with one on an encoder side, a decoder side can determine a processing manner consistent with one on the encoder side. The processing parameter used on the encoder side may be set according to a requirement, provided that the processing parameter can be reproduced in the decoding process. For example, the processing parameter may include at least one of historical encoding information and an image feature that corresponds to a reconstructed frame.

In the processing parameter, information that can be reproduced in the decoding process is information existing in a bitstream or information that can be deduced by using encoding information in a bitstream. However, some information that is still non-optimal after a plurality of attempt and search processes on the encoder side is not to be reproduced on the encoder side. Such information is considered not reproducible in the decoding process.

The target processing manner is selected from the candidate processing manners. The candidate processing manners include at least one of a full resolution processing manner and a downsampling processing manner. The full resolution processing manner refers to performing full resolution processing on the input video frame to obtain a current frame to be encoded. The downsampling processing manner refers to performing downsampling processing on the input video frame, to obtain a current frame. For example, when a resolution of the input video frame is 800*800 pixels, and the processing manner is performing 1/2 downsampling in both horizontal and vertical directions, a resolution of the downsampled frame is 400*400 pixels.

In an embodiment, when the target processing manner corresponding to the input video frame includes the downsampling processing manner, a downsampling ratio and a downsampling method may further be obtained. A sampling ratio is a ratio obtained by dividing resolution after sampling by resolution before sampling. The downsampling method may be direct averaging, a filter, bicubic interpolation, bilinear interpolation, or the like. The downsampling may be preset or may be flexibly adjusted. For example, each downsampling ratio may be set to be 1/2. For another example, a downsampling ratio of the first input video frame in an input video sequence may be 1/2, and a downsampling ratio of the second input video frame in the input video sequence is 1/4. For still another example, the downsampling ratio is obtained according to an encoding location of the input video frame in a group of pictures (GOP). A later encoding location indicates a smaller downsampling ratio. The downsampling direction may be at least one of vertical downsampling, horizontal downsampling, and a combination of vertical downsampling and horizontal downsampling. For example, if a resolution of a video frame before sampling is 800*800 pixels, when the downsampling ratio is 1/2 and the downsampling direction is horizontal, the resolution of the video frame after sampling is 400*800 pixels. When the downsampling ratio is 1/2 and the downsampling direction is vertical, the resolution of the video frame after sampling is 800*400 pixels.

In an embodiment, the downsampling ratio may be obtained according to a processing capability of a processor of a device for performing the video encoding method, such as the terminal or the server. A device whose processor has a stronger processing capability corresponds to a larger downsampling ratio, and a device whose processor has a weaker processing capability corresponds to a smaller downsampling ratio. For example, a correspondence between the processing capability of the processor and the downsampling ratio may be preset. When needing to perform encoding, the computer device obtains the processing capability of the processor, and obtains the corresponding downsampling ratio according to the processing capability of the processor. For example, a downsampling ratio corresponding to a 16-bit processor may be set to 1/8, and a downsampling ratio corresponding to a 32-bit processor may be set to 1/4.

In an embodiment, the downsampling ratio may be obtained according to the frequency or quantity of times for which the input video frame is used as a reference frame, a correspondence between the downsampling ratio and the frequency or quantity of times for which the input video frame is used as a reference frame may be set. A higher frequency or a larger quantity of times for which the input video frame is used as a reference frame indicates a larger downsampling ratio. A lower frequency or a smaller quantity of times for which the input video frame is used as a reference frame indicates a smaller downsampling ratio. For example, a frequency for which the I-frame is used as a reference frame is high. In this case, a downsampling ratio corresponding to the I-frame is large, and may be 1/2. A frequency for which the P-frame is used as a reference frame is low. In this case, a downsampling ratio corresponding to the P-frame is small, and may be 1/4. The computer device obtains the downsampling ratio according to the frequency or quantity of times for which the input video frame is used as a reference frame. When the frequency or quantity of times for which the input video frame is used as a reference frame is high or large, image quality is relatively good. Therefore, prediction accuracy can be improved, a prediction residual can be reduced, and quality of an encoded image can be improved.

In an embodiment, the downsampling method may be obtained according to a processing capability of a processor of a device for performing the video encoding method, such as the terminal or the server. A device whose processor has a stronger processing capability corresponds to a downsampling method with higher complexity, and a device whose processor has a weaker processing capability corresponds to a downsampling method with lower complexity. A correspondence between the processing capability of the processor and the downsampling method may be preset. When needing to perform encoding, the computer device obtains the processing capability of the processor, and obtains the corresponding downsampling method according to the processing capability of the processor. For example, because bicubic interpolation is more complex than bilinear interpolation, a downsampling method corresponding to a 16-bit processor may be set to bilinear interpolation, and a downsampling method corresponding to a 32-bit processor may be set to bicubic interpolation.

In this embodiment of this application, when the input video frame is to be processed in the downsampling processing manner, the input video frame may further be downsampled according to different downsampling methods or downsampling ratios. Therefore, the input video frame is more flexibly processed.

In an embodiment, the computer device may obtain the target processing manner corresponding to the input video frame according to at least one of current encoding information and image feature information that correspond to the input video frame. The current encoding information refers to video compression parameter information obtained during encoding of a video. The current encoding information includes one or more of a frame prediction type, a motion vector, a quantization parameter, a video source, a bit rate, a frame rate, and a resolution. The image feature information refers to information related to content of an image. The image feature information includes one or more pieces of image motion information and image texture information, such as edges.

The current encoding information and the image feature information reflect a scene, detail complexity, intensity of a motion, or the like corresponding to the video frame. For example, a motion scene may be determined by using one or more of a motion vector, a quantization parameter, a bit rate, or the like. A larger quantization parameter usually indicates an intense motion, and a larger motion vector indicates that an image scene is a large motion scene. The computer device may further determine intensity of a motion according to a bit rate ratio of an encoded I-frame to an encoded P-frame, or determine intensity of a motion according to a bit rate ratio of an encoded I-frame to an encoded B-frame. If the ratio is greater than a first preset threshold, a determining result is a static image. If the ratio is less than a second preset threshold, a determining result is an intense motion image. Alternatively, the computer device directly tracks a target object according to content of an image, and determines, according to a motion speed of the target object, whether the target object is in a large motion scene. A specified bit rate can express a specified amount of information. In an intense motion scene, an amount of information in time domain is large, and correspondingly, a bit rate that can be used for expressing spatial domain information is low. Therefore, use of a low resolution can achieve good image quality, and it is more suitable to select a downsampling mode for encoding. A picture switching scene may be determined according to a frame prediction type, or a more suitable processing manner may be determined according to impact of a frame prediction type on another frame. For example, an I-frame is usually the first frame or there is screen switching, quality of the I-frame affects quality of the subsequent P-frame or B-frame. Therefore, it is more suitable to select the full resolution processing manner for an intra prediction frame than for an inter prediction frame, to ensure image quality. The P-frame may be used as a reference frame of the B-frame, and image quality of the P-frame affects image quality of the subsequent B-frame. Therefore, it is more suitable to select the full resolution processing manner for P-frame encoding than for B-frame encoding. A texture complexity of a current video frame is determined by using image feature information, such as image texture information. If the texture is complex and contains more details, there is more image space information. If downsampling is performed, video quality may be affected due to the loss of more detail information caused by downsampling. Therefore, it is more suitable to select the full resolution processing manner for processing a current video frame with a complex texture than a current video frame with a simple texture.

In an embodiment, the computer device may obtain a processing manner corresponding to the input video frame according to a magnitude relationship between a current quantization parameter corresponding to the input video frame and a quantization parameter threshold. If the current quantization parameter is greater than the quantization parameter threshold, it is determined that the target processing manner is the downsampling processing manner; otherwise, it is determined that the target processing manner is the full resolution processing manner. The quantization parameter threshold may be obtained according to a ratio of intra-coded blocks in an encoded forward encoded video frame before the input video frame. A correspondence between an intra prediction block ratio and the quantization parameter threshold may be preset, so that after an intra prediction block ratio of a current frame is determined, a quantization parameter threshold corresponding to the intra prediction block ratio of the current frame can be determined according to the correspondence. For fixed quantization parameter encoding, the current quantization parameter may be a corresponding fixed quantization parameter value. For fixed bit rate encoding, the current quantization parameter corresponding to the input video frame may be obtained through calculation according to a bit rate control model. Alternatively, a quantization parameter corresponding to a reference frame may be used as the current quantization parameter corresponding to the input video frame. In this embodiment of this application, a larger current quantization parameter indicates a more intense motion, and it is more suitable to select the downsampling processing manner for a scene with intense motions.

In an embodiment, the intra prediction block ratio is positively correlated with the quantization parameter threshold. For example, the correspondence between the intra prediction block ratio $Intra_0$ and the quantization parameter threshold $QP_{TH}$ may be predetermined according to experience as follows:

$$QP_{TH} = \begin{cases} 33, & Intra_0 < 10\% \\ 31, & 10\% \leq Intra_0 < 50\% \\ 29, & Intra_0 \geq 50\% \end{cases}$$

Step 506. Encode the input video frame according to the target processing manner to obtain encoded data corresponding to the input video frame.

The input video frame is encoded according to the target processing manner to obtain the encoded data corresponding to the input video frame.

After obtaining the target processing manner, the computer device processes the input video frame according to the target processing manner, to obtain the current frame, and encodes the current frame at a resolution of the current frame, to obtain the encoded data corresponding to the input video frame. For example, the current frame is obtained after processing the input video frame according to the target processing manner. When the target processing manner is the full resolution processing manner, the input video frame may be used as the current frame. When the target processing manner is the downsampling processing manner, the input video frame may be downsampled, to obtain the current frame. For example, when a resolution of the input video frame is 800*800 pixels, and the target processing manner is performing 1/2 downsampling in both horizontal and vertical directions, a resolution of the downsampled current frame is 400*400 pixels.

Encoding may include at least one of prediction, transformation, quantization, and entropy encoding. For example, a reference frame corresponding to the current frame may be obtained, prediction is performed according to a reference frame to obtain a prediction residual, and transformation, quantization, entropy encoding, or the like is performed on the prediction residual, to obtain the encoded data corresponding to the input video frame. For example, during calculation of the prediction residual, the reference frame may be processed according to resolution information of the current frame, to obtain a target reference frame whose resolution is consistent with that of the current frame. Then, a reference block corresponding to each encoded block in the current frame is obtained from the target reference frame, and prediction is performed according to the reference block, to obtain a prediction value corresponding to the encoded block. Then, the prediction residual is obtained according to a difference between an actual value of the encoded block and the prediction value. During calculation of a motion vector value, if the reference frame has a different resolution, location information of encoded blocks or location information of decoded blocks may be transformed according to the reference frame and the resolution of the current frame. Then, the motion vector value is obtained according to the transformed location information. For example, it is assumed that the resolution of the current frame is 400*800 pixels, and a resolution of the reference frame is 800*1600 pixels. In this case, the reference frame may be processed according to the resolution of the current frame, to obtain the corresponding target reference frame, and then video encoding is performed according to the target reference frame. For example, 1/2 downsampling is performed on a width and a height of the reference frame, to obtain a resolution of 400*800 pixels of the target reference frame.

According to the video encoding method, an input video frame is obtained, a processing parameter corresponding to the input video frame is obtained, a target processing manner corresponding to the input video frame is determined from candidate processing manners according to the processing parameter, the processing parameter being a parameter reproduced in a decoding process, and the candidate processing manners including at least one of a full resolution processing manner and a downsampling processing manner, and finally, the input video frame is encoded according to the target processing manner to obtain encoded data corresponding to the input video frame. In this way, a processing manner for a video frame can be flexibly selected, to process the input video frame, so that the processing parameter of an encoding process can be reproduced in the decoding process, thereby improving video encoding quality in the case of limited bandwidth, and obtaining accurate encoded data.

In an embodiment, the obtaining, by the computer device, a processing parameter corresponding to the input video frame includes: obtaining a frame type corresponding to the input video frame, and obtaining the processing parameter corresponding to the input video frame according to the frame type.

For example, the frame type refers to a prediction type of the video frame. A frame prediction type may be an I-frame, a P-frame, or a B-frame. The I-frame is an intra prediction frame, the P-frame is a forward prediction frame, and the B-frame is a bidirectional prediction frame. Each encoded block of the P-frame and the B-frame may be encoded in an intra prediction manner or an inter prediction manner. The computer device may set a correspondence between a frame prediction type and a processing parameter. After the frame type corresponding to the input video frame is obtained, the processing parameter corresponding to the input video frame is obtained according to the correspondence between the frame prediction type and the processing parameter. At least one of parameter types and parameter values of processing parameters corresponding to different frame types are different.

In an embodiment, the computer device sets a value of a corresponding processing parameter according to the frequency of quantity of times for which the input video frame is used as a reference frame. A higher frequency or a larger quantity of times for which the input video frame is used as a reference frame indicates a larger probability that the target processing manner obtained according to the corresponding processing parameter is the full resolution processing manner. For example, a frequency for which the I-frame is used as a reference frame is high. In this case, when the processing parameter includes a current quantization parameter and a quantization parameter threshold, a rule for determining the processing manner includes: if the current quantization parameter is greater than the quantization parameter threshold, determining that the processing manner is a downsampling manner; otherwise, determining that the processing manner is a full resolution processing manner. A quantization parameter threshold corresponding to the I-frame is less than those corresponding to the P-frame and the B-frame, so that a probability that a target processing manner corresponding to the I-frame is the full resolution processing manner is larger than a probability for the P-frame and the B-frame.

In an embodiment, the computer device obtains a corresponding processing manner of each of the P-frame and the B-frame according to a second ratio of intra-coded blocks in a forward encoded video frame of each of the P-frame and the B-frame. Because the I-frame is of an intra-coded prediction type, a second ratio of intra-coded blocks in a forward encoded video frame of the I-frame is of little reference for determining a processing manner. Even if the second ratio of the intra-coded blocks in the forward encoded video frame of the I-frame is large, encoded data corresponding to the I-frame is still relatively small when a correlation of intra-coded blocks is large. Therefore, after the I-frame is downsampled and then encoded, an effect is not substantially better than that of encoding at full resolution. Therefore, a processing manner corresponding to the I-frame may be determined according to image feature information of the I-frame. For example, if it is determined that the I-frame corresponds to an intense motion scene according to image content of the I-frame, an amount of time domain information corresponding to the I-frame is large, and a corresponding bit rate that can be used for expressing spatial domain information is low. Therefore, use of a low resolution can achieve better image quality, and it is more suitable to select the downsampling processing manner as the processing manner corresponding to the I-frame.

In this embodiment, the target processing manner corresponding to the input video frame is determined from the candidate processing manners according to the processing parameter.

For example, processing manner determining methods corresponding to different frame types may be different or may be the same. For example, if parameter types of processing parameters corresponding to different frame types are the same, and values of the processing parameters are different, the same processing manner determining method may be used to determine corresponding target processing manners. If parameter types of processing parameters corresponding to different frame types are different, different processing manner determining methods may be used. After the processing parameter is obtained, the processing manner is determined from the candidate processing manners according to the processing parameter, and the target processing manner may be determined according to the processing parameter with reference to the processing manner determining method in the foregoing embodiment. Details are not described in this embodiment again.

In this embodiment of this application, a correspondence between a frame type and a processing parameter is set, so that a target processing manner can be flexibly determined according to a prediction type of an input video frame, thereby improving encoding quality.

Figure 6:
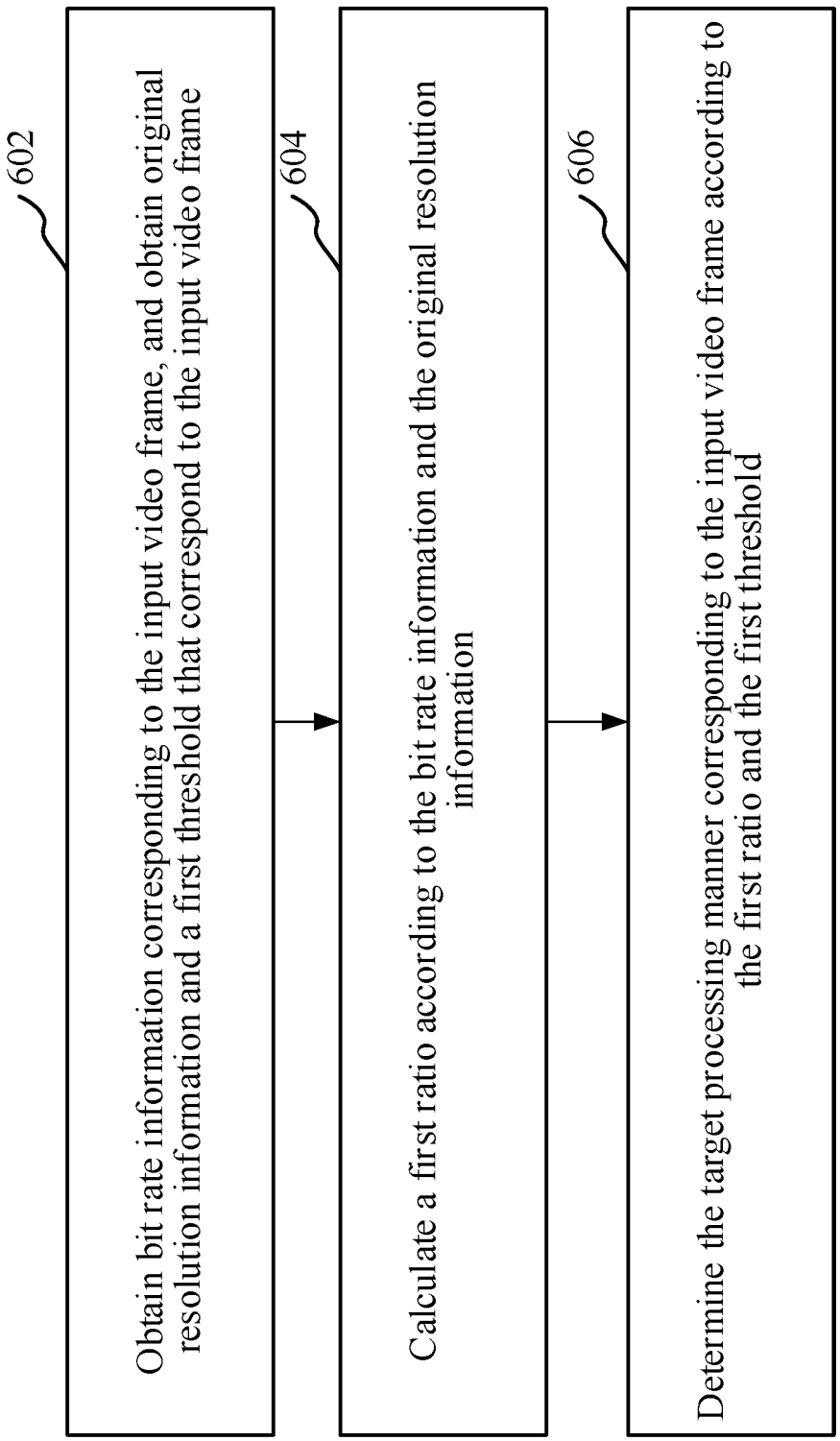
FIG. 6 is a schematic flowchart of generation steps of a target processing manner corresponding to an input video frame according to an embodiment of this application.

In an embodiment, as shown in FIG. 6, the obtaining a processing parameter corresponding to the input video frame, and determining a target processing manner corresponding to the input video frame from candidate processing manners according to the processing parameter includes the following steps:

Step 602. Obtain bit rate information corresponding to the input video frame, and obtain original resolution information and a first threshold that correspond to the input video frame.

The bit rate information is information related to a bit rate. The bit rate information is an important factor for determining video picture quality. The bit rate information includes but is not limited to a target bit rate. The original resolution information is information related to a resolution corresponding to an original image, and may be, for example, information obtained through calculation by using a width and a height of original resolution. For example, the bit rate information corresponding to the input video frame is obtained, and then the corresponding original resolution information and the preset first threshold are obtained according to the input video frame. The first threshold is used for comparison with the original resolution information to obtain a target manner corresponding to the input video frame. The first threshold may be set according to an actual requirement.

Step 604. Calculate a first ratio according to the bit rate information and the original resolution information.

Step 606. Determine the target processing manner corresponding to the input video frame according to the first ratio and the first threshold.

For example, after the bit rate information corresponding to the input video frame and the corresponding original resolution information and first threshold are obtained, the first ratio is calculated according to the bit rate information and the original resolution information. The calculation may be, but is not limited to, using a ratio of the bit rate information to the original resolution information as the first ratio. For example, if the obtained bit rate information corresponding to the input video frame is a target bit rate, and the obtained original resolution information is a product of a width and a height of an original resolution, the first ratio k calculated according to the bit rate information and the original resolution information is: the target bit rate/the product of the width and the height of the original resolution.

For example, the target processing manner is selected from the candidate processing manners. The candidate processing manners include at least one of a full resolution processing manner and a downsampling processing manner. For example, after the first ratio is calculated according to the bit rate information and the original resolution information, the target processing manner corresponding to the input video frame is determined according to the first ratio and the obtained first threshold. When the target bit rate corresponding to the input video frame is less than a preset threshold, a small quantity of bits are allocated to the input video frame. If encoding is performed at the original resolution, quality of a decoded image is relatively low. However, if encoding is performed at the downsampling resolution, a high-quality encoded image having the downsampling resolution may be obtained. Therefore, at such a low bit rate, a higher-quality frame having the downsampling resolution is selected for encoding. Therefore, when the first ratio is less than the obtained first threshold, the target processing manner corresponding to the input video frame is determined as the downsampling processing manner; otherwise, the target processing manner corresponding to the input video frame is determined as the full resolution processing manner.

Figure 7:
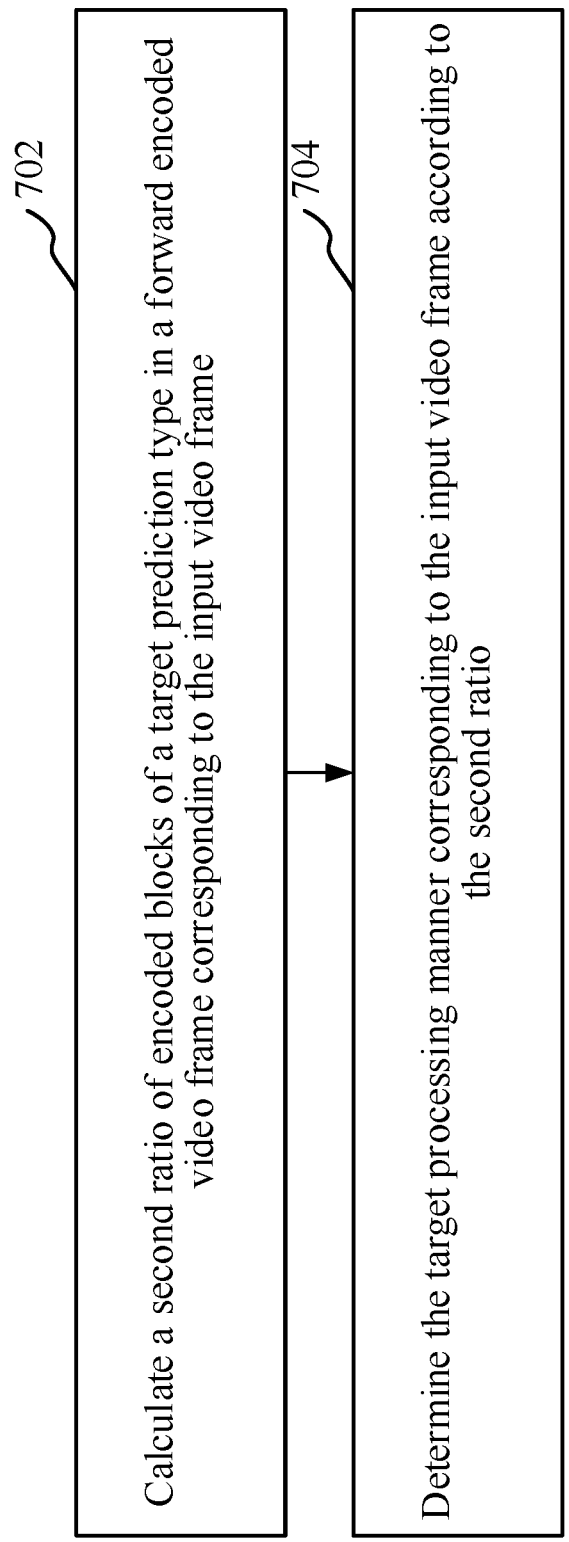
FIG. 7 is a schematic flowchart of generation steps of a target processing manner corresponding to an input video frame according to another embodiment of this application.

In an embodiment, as shown in FIG. 7, the obtaining a processing parameter corresponding to the input video frame, and determining a target processing manner corresponding to the input video frame from candidate processing manners according to the processing parameter includes the following steps:

Step 702. Calculate a second ratio of encoded blocks of a target prediction type in a forward encoded video frame corresponding to the input video frame.

Step 704. Determine the target processing manner corresponding to the input video frame according to the second ratio.

For example, an encoded block of a prediction type is an encoded block corresponding to a frame prediction type. A ratio of the target prediction type may be one or both of a second ratio corresponding to intra-coded blocks and a second ratio corresponding to inter-coded blocks. The second ratio of the encoded blocks of the target prediction type in the forward encoded video frame corresponding to the input video frame may be a ratio of the encoded blocks of the target prediction type to encoded blocks of other prediction types, or may be a ratio of a quantity of encoded blocks of this type to a total quantity of encoded blocks. A form of the second ratio may be set according to a requirement.

For example, the encoded blocks of the target prediction type are intra-coded blocks. A first quantity of intra-coded blocks in the forward encoded video frame and a second quantity of inter-coded blocks in the forward encoded video frame may be obtained, and a second ratio of the intra-coded blocks to the inter-coded blocks is calculated according to the first quantity and the second quantity. Alternatively, a third quantity of all encoded blocks in the forward encoded video frame is collected, and a second ratio of the intra-coded blocks to the third quantity is calculated according to the first quantity and the third quantity. For another example, the encoded blocks of the target prediction type are inter-coded blocks. A second ratio of the inter-coded blocks to a third quantity may further be calculated according to a second quantity and a third quantity.

The forward encoded video frame is a video frame that has been encoded before the input video frame is encoded. A quantity of obtained forward encoded video frames may be customized. For example, the forward encoded video frame may be a previous encoded video frame that has been encoded before the input video frame, or the forward encoded video frame may be the previous three encoded video frames that have been encoded before the input video frame. After the corresponding ratio of the encoded blocks of the target prediction type in the forward encoded video frame is calculated, the target processing manner corresponding to the input video frame is determined according to the calculated ratio. If a plurality of forward encoded video frames are obtained, a corresponding ratio of each different type of encoded blocks in each forward encoded video frame may be calculated, a total ratio may be obtained through weighted calculation according to each ratio, and then the target processing manner corresponding to the input video frame is determined according to the total ratio and the preset threshold. A weight corresponding to the forward encoded video frame may be negatively correlated with an encoding distance between the forward encoded video frame and the input video frame.

In an embodiment, as shown in FIG. 8, the determining a target processing manner corresponding to the input video frame from candidate processing manners according to the processing parameter includes the following steps:

Step 802. Calculate a second ratio of intra-coded blocks in the forward encoded video frame in the forward encoded video frame.

Step 804. Determine, in a case that the second ratio is greater than a second threshold, that the target processing manner is a downsampling processing manner.

For example, after the forward encoded video frame corresponding to the input video frame is obtained, a second ratio of intra-coded blocks in the forward encoded video frame is calculated according to encoded data corresponding to the forward encoded video frame. The second ratio of the intra-coded blocks in the forward encoded video frame may be reflected by using a ratio of a quantity of the intra-coded blocks in the forward encoded video frame to a total quantity of encoded blocks in the forward encoded video frame, or may be reflected by using a second ratio of the intra-coded blocks in the forward encoded video frame to inter-coded blocks in the forward encoded video frame.

For example, a quantity of intra-coded blocks in the forward encoded video frame may be first obtained, and then a total quantity of forward encoded video blocks is collected. The second ratio of the intra-coded blocks in the forward encoded video frame is calculated according to the quantity of the intra-coded blocks and the total quantity of the forward encoded video blocks. For example, a ratio of the quantity of the intra-coded blocks to the total quantity of the forward encoded video blocks is used as the second ratio. Alternatively, a first quantity of intra-coded blocks in the forward encoded video frame and a second quantity of inter-coded blocks in the forward encoded video frame are first calculated, and a second ratio of the intra-coded blocks in the forward encoded video frame is calculated according to the first quantity of intra-coded blocks and the second quantity of inter-coded blocks. For example, a ratio of the first quantity of intra-coded blocks to the second quantity of inter-coded blocks is used as the second ratio.

When the second ratio corresponding to the intra-coded blocks is greater than a second threshold, it may be determined that the target processing manner corresponding to the input video frame is the downsampling processing manner; otherwise, it is determined that the target processing manner corresponding to the input video frame is the full resolution processing manner. For example, when the second ratio is greater than the second threshold, it is determined that the processing manner corresponding to the input video frame is the downsampling processing manner; otherwise, it is determined that the target processing manner corresponding to the input video frame is the full resolution processing manner.

In this embodiment of this application, if the second ratio of the intra-coded blocks is large, it indicates that the video is relatively complex or a correlation between video frames is relatively low. Therefore, an obtained prediction residual is relative large, and it is more suitable to adopt the downsampling processing manner for encoding, thereby reducing a volume of encoded data.

The second threshold may be determined according to a processing manner of a reference frame corresponding to the input video frame. When the processing manner of the reference frame corresponding to the input video frame is the downsampling processing manner, a first preset threshold T1 is obtained, and the first preset threshold T1 is used as the second threshold. For example, when the processing manner of the reference frame corresponding to the input video frame is the full resolution processing manner, a second preset threshold T2 is obtained, and the second preset threshold T2 is used as the second threshold. For example, after the second threshold is obtained according to resolution information of the reference frame corresponding to the input video frame, the processing manner of the input video frame is determined according to the second threshold and the second ratio of the intra-coded blocks in the forward encoded video frame in the forward encoded video frame. When the second ratio of the intra-coded blocks in the forward encoded video frame in the forward encoded video frame is greater than the second threshold, it is determined that the processing manner corresponding to the input video frame is the downsampling processing manner.

In an embodiment, when the processing manner of the reference frame corresponding to the input video frame is the downsampling processing manner, a first preset threshold T1 is obtained, the first preset threshold T1 is used as the second threshold, and a calculated ratio of the intra-coded blocks in the forward encoded video frame in the forward encoded video frame is S. In this case, when S is greater than T1, it is determined that the target processing manner corresponding to the input video frame is the downsampling processing manner; otherwise, it is determined that the target processing manner corresponding to the input video frame is the full resolution processing manner.

In another embodiment, when the processing manner of the reference frame corresponding to the input video frame is the full resolution processing manner, a second preset threshold T2 is obtained, the second preset threshold T2 is used as the second threshold, and a calculated ratio of the intra-coded blocks in the forward encoded video frame in the forward encoded video frame is S. In this case, when S is greater than T2, it is determined that the target processing manner corresponding to the input video frame is the downsampling processing manner; otherwise, it is determined that the target processing manner corresponding to the input video frame is the full resolution processing manner.

When the input video frame is the second frame in a GOP, the forward encoded video frame corresponding to the input video frame is the first frame. The first frame is usually an intra prediction frame I-frame. Because the intra prediction frame I-frame includes only intra-coded blocks, a ratio of intra-coded blocks in the forward encoded video frame in the forward encoded video frame is 100%. Therefore, when it is determined that the input video frame is the second frame in the GOP, a corresponding target processing manner is determined by using the method shown in FIG. 6.

In an embodiment, as shown in FIG. 9, based on the video encoding method shown in FIG. 8, the video encoding method further includes the following steps:

Step 902. Obtain a processing manner corresponding to a reference frame corresponding to the input video frame.

Step 904. Determine the second threshold according to the processing manner.

The second threshold may be determined according to the processing manner of the reference frame corresponding to the input video frame. When the processing manner of the reference frame corresponding to the input video frame is the downsampling manner, a first preset threshold T1 is obtained, and the first preset threshold T1 is used as the second threshold. For example, when the processing manner of the reference frame corresponding to the input video frame is the full resolution processing manner, a second preset threshold T2 is obtained, and the second preset threshold T2 is used as the second threshold. For example, after the second threshold is obtained according to resolution information of the reference frame corresponding to the input video frame, the processing manner of the input video frame is determined according to the second threshold and the ratio of the intra-coded blocks in the forward encoded video frame in the forward encoded video frame. When the ratio of the intra-coded blocks in the forward encoded video frame in the forward encoded video frame is greater than the second threshold, it is determined that the processing manner corresponding to the input video frame is the downsampling processing manner.

In an embodiment, a second preset threshold is greater than a first preset threshold. In this case, when the processing manner corresponding to the reference frame is the full resolution processing manner, it is more suitable to adopt the full resolution processing manner for the input video frame. When the reference frame corresponds to the downsampling processing manner, it is more suitable to adopt the downsampling processing manner for the input video frame.

Figure 10:
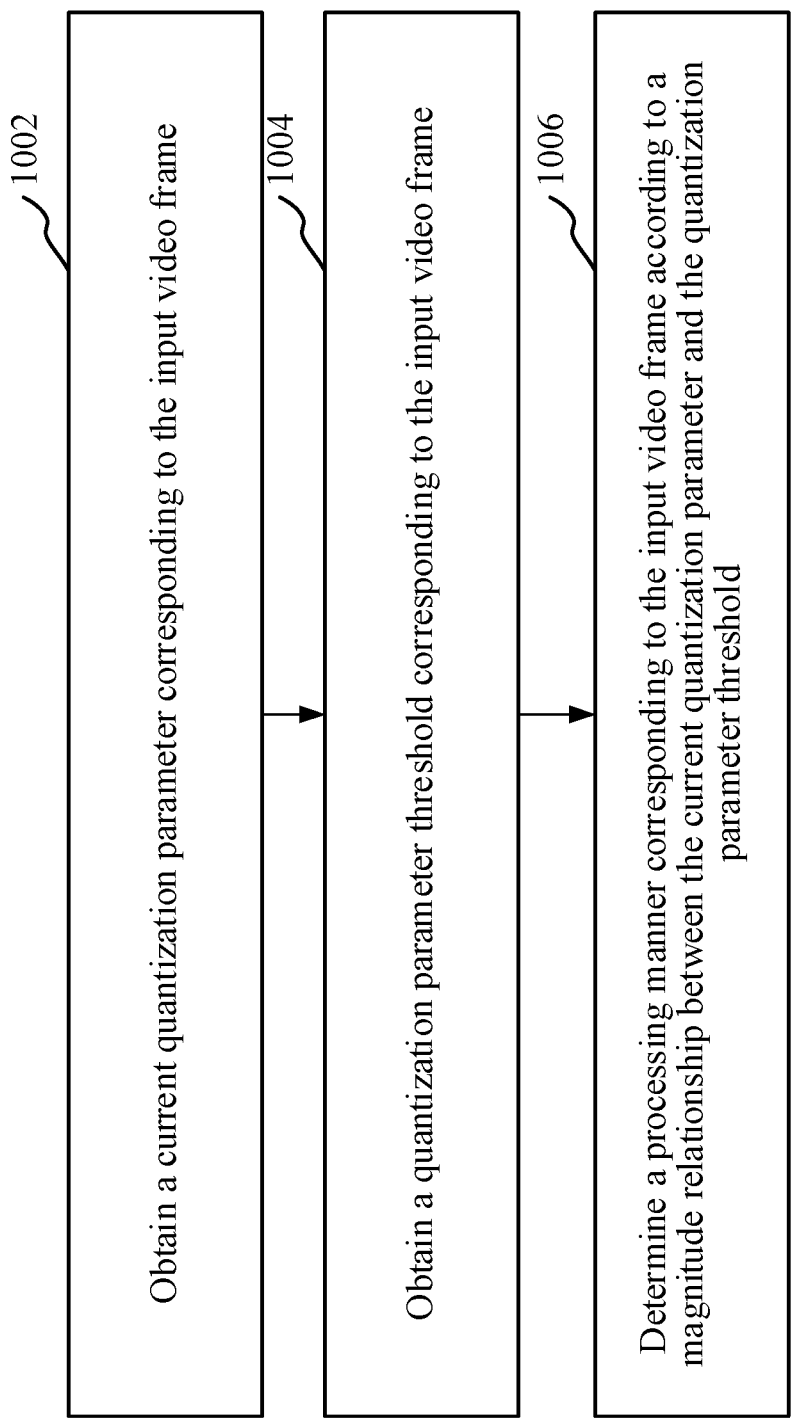
FIG. 10 is a schematic flowchart of generation steps of a target processing manner corresponding to an input video frame according to an embodiment of this application.

In an embodiment, as shown in FIG. 10, the obtaining a processing parameter corresponding to the input video frame, and determining a target processing manner corresponding to the input video frame from candidate processing manners according to the processing parameter includes the following steps:

Step 1002. Obtain a current quantization parameter corresponding to the input video frame.

Step 1004. Obtain a quantization parameter threshold corresponding to the input video frame.

Step 1006. Determine a processing manner corresponding to the input video frame according to a magnitude relationship between the current quantization parameter and the quantization parameter threshold.

For example, the processing manner corresponding to the input video frame may be obtained according to the magnitude relationship between the current quantization parameter corresponding to the input video frame and the quantization parameter threshold. If the current quantization parameter is greater than the quantization parameter threshold, it is determined that the processing manner is the downsampling manner; otherwise, it is determined that the processing manner is the full resolution processing manner. The quantization parameter threshold may be obtained according to a ratio of intra-coded blocks in an encoded forward encoded video frame before the input video frame. A correspondence between an intra prediction block ratio and the quantization parameter threshold may be preset, so that after an intra prediction block ratio of a current frame is determined, a quantization parameter threshold corresponding to the intra prediction block ratio of the current frame can be determined according to the correspondence. For fixed quantization parameter encoding, the current quantization parameter may be a corresponding fixed quantization parameter value. For fixed bit rate encoding, the current quantization parameter corresponding to the input video frame may be obtained through calculation according to a bit rate control model. Alternatively, a quantization parameter corresponding to a reference frame may be used as the current quantization parameter corresponding to the input video frame. In this embodiment of this application, a larger current quantization parameter indicates a more intense motion, and it is more suitable to select the downsampling processing manner for a scene with intense motions.

In an implementation, the intra prediction block ratio is positively correlated with the quantization parameter threshold. For example, the correspondence between the intra prediction block ratio Intra0 of the current frame and the quantization parameter threshold QPTH may be predetermined according to experience as follows:

$$QP_{TH} = \begin{cases} 33, & Intra_0 < 10\% \\ 31, & 10\% \le Intra_0 < 50\% \\ 29, & Intra_0 \ge 50\% \end{cases}$$

Figure 11:
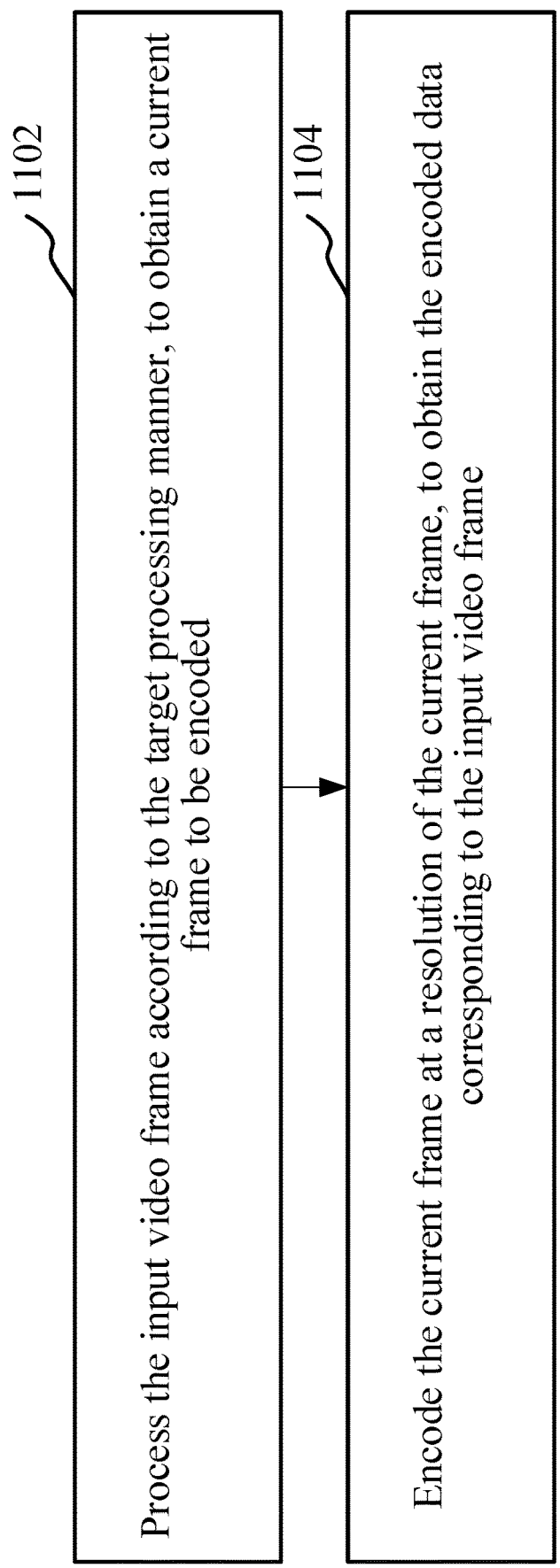
FIG. 11 is a schematic flowchart of encoding steps of an input video frame according to an embodiment of this application.

In an embodiment as shown in FIG. 11, the encoding the input video frame according to the target processing manner to obtain encoded data corresponding to the input video frame includes the following steps:

Step 1102. Process the input video frame according to the target processing manner, to obtain a current frame to be encoded.

Step 1104. Encode the current frame at a resolution of the current frame, to obtain the encoded data corresponding to the input video frame.

For example, the current frame is obtained after processing the input video frame according to the target processing manner. When the target processing manner is the full resolution processing manner, the input video frame may be used as the current frame. When the target processing manner is the downsampling processing manner, the input video frame may be downsampled, to obtain the current frame. For example, when a resolution of the input video frame is 800*800 pixels, and the target processing manner is performing 1/2 downsampling in both horizontal and vertical directions, a resolution of the downsampled current frame is 400*400 pixels.

For example, the current frame is encoded at the resolution of the current frame. Encoding may include at least one of prediction, transformation, quantization, and entropy encoding. For example, a reference frame corresponding to the current frame may be obtained, prediction is performed according to a reference frame to obtain a prediction residual, and transformation, quantization, entropy encoding, or the like is performed on the prediction residual, to obtain the encoded data corresponding to the input video frame. For example, during calculation of the prediction residual, the reference frame may be processed according to resolution information of the current frame, to obtain a target reference frame whose resolution is consistent with that of the current frame. Then, a reference block corresponding to each encoded block in the current frame is obtained from the target reference frame, and prediction is performed according to the reference block, to obtain a prediction value corresponding to the encoded block. Then, the prediction residual is obtained according to a difference between an actual value of the encoded block and the prediction value. During calculation of a motion vector value, if the reference frame has a different resolution, location information of encoded blocks or location information of decoded blocks may be transformed according to the resolution of the reference frame and the resolution of the current frame. Then, the motion vector value is obtained according to the transformed location information. For example, it is assumed that the resolution of the current frame is 400*800 pixels, and a resolution of the reference frame is 800*1600 pixels. In this case, the reference frame may be processed according to the resolution of the current frame, to obtain the corresponding target reference frame, and then video encoding is performed according to the target reference frame. For example, 1/2 downsampling is performed on a width and a height of the reference frame, to obtain a resolution of 400*800 pixels of the target reference frame. In an embodiment, the encoding the current frame at a resolution of the current frame, to obtain the encoded data corresponding to the input video frame includes: adding processing manner information corresponding to the processing manner to the encoded data corresponding to the input video frame.

Figure 12:
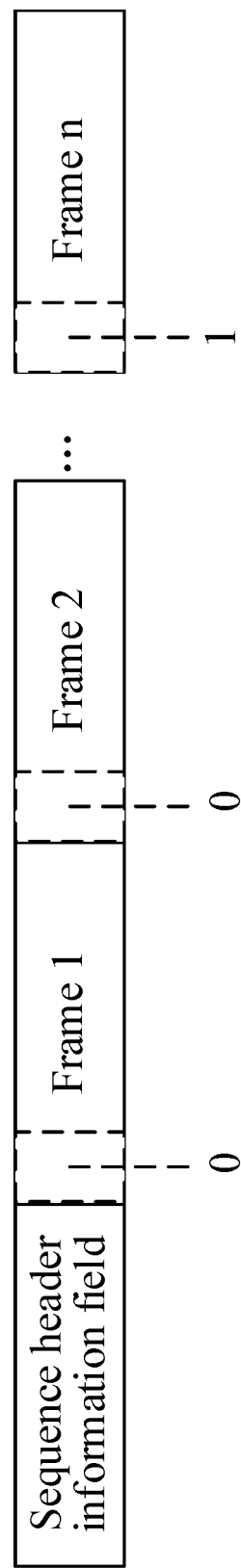
FIG. 12 is a schematic diagram of encoded data according to an embodiment of this application.

For example, the processing manner information is used for describing the used processing manner for the input video frame. A flag Frame_Resolution_Flag for describing the processing manner may be added to the encoded data. That is, a syntactic element for describing the processing manner information is added to the encoded data. A value of a flag corresponding to each processing manner may be set according to a requirement. For example, when the processing manner is a full resolution processing manner, the corresponding Frame_Resolution_Flag may be 0. When the processing manner is a downsampling processing manner, the corresponding Frame_Resolution_Flag may be 1. In an embodiment, the processing manner information is added to frame-level header information corresponding to the encoded data. For example, the processing manner information may be added to a preset location in the frame-level header information. The frame-level header information is header information of the encoded data corresponding to the input video frame. Sequence-level header information refers to header information of encoded data corresponding to a video sequence. Group-level header information refers to header information of encoded data corresponding to a GOP. One video frame sequence may include a plurality of a GOP, and one GOP may include a plurality of video frames. A block indicated by dashed lines in FIG. 12 represents frame-level header information of encoded data corresponding to each input video frame, frames respectively represent encoded data corresponding to the first, the second, and the $n^{th}$ video frame. In FIG. 12, a processing manner corresponding to each of the first input video frame and the second input video frame is a full resolution processing manner, and a processing manner corresponding to the third input video frame is a downsampling processing manner.

In an embodiment, information about the downsampling processing manner for downsampling the input video frame may further be added to the encoded data corresponding to the input video frame, so that when the encoded data is obtained on a decoder side, a corresponding method for upsampling a reconstructed video frame and an upsampling ratio can be obtained according to the information about the downsampling processing manner. The information about the downsampling processing manner includes at least one of downsampling method information and downsampling ratio information. A location at which the downsampling method information is added to the encoded data may be one of corresponding group-level header information, sequence-level header information, and frame-level header information. The location at which the downsampling method information is added to the encoded data may be determined according to a corresponding range of action of the downsampling method. A location at which the downsampling ratio information is added to the encoded data may be any one of corresponding group-level header information, sequence-level header information, and frame-level header information. The location at which the downsampling ratio information is added to the encoded data may be determined according to a range of action corresponding to the downsampling ratio. The range of action refers to an applicable range. For example, if the range of action of the downsampling ratio is a GOP, downsampling ratio information corresponding to the GOP may be added to header information corresponding to the GOP. If the range of action of the downsampling ratio is a video sequence, the downsampling ratio information is added to sequence-level header information corresponding to the video sequence, indicating that each video frame in the video sequence is to be downsampled by using the downsampling ratio corresponding to the downsampling ratio information.

In an embodiment, the obtaining the processing manner corresponding to the input video frame includes: obtaining the processing parameter corresponding to the input video frame, and determining the processing manner corresponding to the input video frame according to the processing parameter. The adding processing manner information corresponding to the processing manner to the encoded data corresponding to the input video frame includes: adding the processing manner information corresponding to the processing manner to the encoded data corresponding to the input video frame when the processing parameter cannot be reproduced in a decoding process.

For example, the processing parameter may include at least one of image encoding information and image feature information that correspond to the input video frame. That the processing parameter cannot be reproduced in a decoding process means that the processing parameter cannot be obtained or generated in the decoding process. For example, if the processing parameter is information corresponding to image content of the input video frame, and there is a loss of image information in an encoding process, there is a difference between a decoded video frame on a decoder side and the input video frame. Therefore, the information corresponding to the image content of the input video frame is not obtained in the decoding process. That is, the information corresponding to the image content cannot be reproduced in the decoding process. Rate distortion costs need to be calculated in the encoding process and not calculated in the decoding process. When the processing parameter includes the rate distortion costs, the processing parameter cannot be reproduced in the decoding process. Information about a peak signal-to-noise ratio (PSNR) of the reconstructed video frame and the input video frame obtained in the encoding process cannot be obtained in the decoding process. Therefore, the information about the PSNR cannot be reproduced in the decoding process.

In an embodiment, when the processing parameter can be reproduced on the decoder side, the processing manner information corresponding to the processing manner may be added to the encoded data corresponding to the input video frame, or the processing manner information corresponding to the processing manner may not be added to the encoded data corresponding to the input video frame. When the processing manner information corresponding to the processing manner is added to the encoded data corresponding to the input video frame, the processing manner information may be read from the encoded data on the decoder side, and there is no need to obtain the processing manner according to processing data. When the processing manner information corresponding to the processing manner is not added to the encoded data corresponding to the input video frame, a decoding device determines, according to the processing parameter, a processing manner consistent with that on an encoder side, thereby reducing a data volume of the encoded data.

Figure 13:
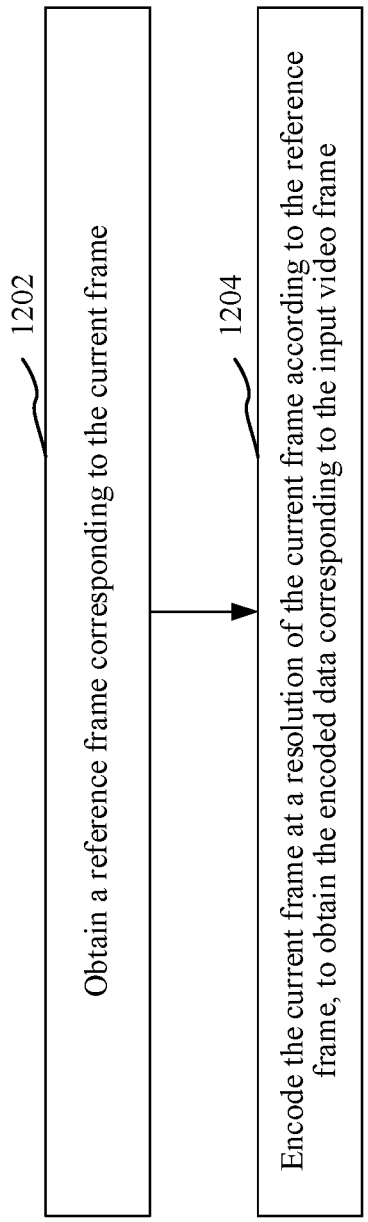
FIG. 13 is a flowchart of encoding a current frame at a resolution of the current frame to obtain encoded data corresponding to an input video frame according to an embodiment of this application.

In an embodiment, as shown in FIG. 13, the encoding the current frame at a resolution of the current frame, to obtain the encoded data corresponding to the input video frame includes the following steps:

Step 1202. Obtain a reference frame corresponding to the current frame.

For example, the reference frame is a video frame to which reference needs to be made during encoding of the current frame. The reference frame is a video frame obtained by reconstructing data that is encoded before the current frame. The current frame may correspond to one or more reference frames. For example, when the current frame is a P-frame, there may be one corresponding reference frame. When the current frame is a B-frame, there may be two corresponding reference frames. The reference frame corresponding to the current frame may be obtained according to a reference relationship, the reference relationship being determined according to each video codec standard. For example, for a second video frame, that is, a B-frame, in a GOP, a corresponding reference frame may be a video frame obtained through reconstruction after decoding after an I-frame in the GOP and a fourth frame in the GOP are correspondingly encoded.

In an embodiment, the obtaining a reference frame corresponding to the current frame includes: obtaining a first reference rule, the first reference rule including a resolution magnitude relationship between the current frame and the reference frame; and obtaining the reference frame corresponding to the current frame according to the first reference rule.

For example, the first reference rule determines a resolution magnitude limitation relationship between the current frame and the reference frame. The resolution magnitude relationship includes at least one of the following: the current frame and the reference frame have a same resolution and the current frame and the reference frame have different resolutions. When the first reference rule includes that the current frame and the reference frame have a same resolution, the first reference rule may further include a processing manner reference rule for the resolutions of the current frame and the reference frame. For example, the processing manner reference rule may include one or both of the following: for a current frame with a full resolution processing manner, reference may be made to a reference frame with a full resolution processing manner, and for a current frame with a downsampling processing manner, reference may be made to a reference frame with a downsampling processing manner. When the first reference rule includes that the current frame and the reference frame have different resolutions, the first reference rule may further include one or both of the following: the resolution of the current frame is greater than the resolution of the reference frame, and the resolution of the current frame is less than the resolution of the reference frame. Therefore, in an embodiment, the first reference rule may include one or more of the following: for a current frame of an original resolution, reference may be made to a reference frame of a downsampling resolution, for a current frame of a downsampling resolution, reference may be made to a reference frame of an original resolution, for a current frame of an original resolution, reference may be made to a reference frame of an original resolution, and for a current frame of a downsampling resolution, reference may be made to a reference frame of a downsampling resolution. The current frame of the original resolution means that the resolution of the current frame is the same as the resolution of a corresponding input video frame, and the reference frame of the original resolution means that the resolution of the reference frame is the same as the resolution of a corresponding input video frame. The current frame of the downsampling resolution means that the current frame is obtained by downsampling a corresponding input video frame. The reference frame of the downsampling resolution means that the reference frame is obtained by downsampling a corresponding input video frame. After the first reference rule is obtained, the reference frame corresponding to the current frame is obtained according to the first reference rule, so that the obtained reference frame meets the first reference rule.

In an embodiment, the encoding the current frame at a resolution of the current frame, to obtain the encoded data corresponding to the input video frame includes: adding rule information corresponding to the first reference rule to the encoded data corresponding to the input video frame.

For example, the rule information is used for describing a used reference rule, and a flag Resolution_Referencer_Rules for describing the reference rule may be added to the encoded data. A reference rule represented by a value of a flag may be set according to a requirement. A location at which the rule information is added to the encoded data may be one or more of group-level header information, sequence-level header information, and frame-level header information. The location at which the rule information is added to the encoded data may be determined according to a range of action of the first reference rule. For example, when the first reference rule is that for the current frame of the original resolution, reference may be made to the reference frame of the downsampling resolution, the corresponding Resolution_Referencer_Rules may be 1. When the first reference rule is that for the current frame of the downsampling resolution, reference may be made to the reference frame of the downsampling resolution, the corresponding Resolution_Referencer_Rules may be 2. If the video sequence uses the same first reference rule, the location at which the rule information is added to the encoded data may be sequence-level header information. If the first reference rule is a reference rule used by one GOP, the location at which the rule information is added to the encoded data is group-level header information corresponding to the GOP using the first reference rule.

Step 1204. Encode the current frame at a resolution of the current frame according to the reference frame, to obtain the encoded data corresponding to the input video frame.

For example, the reference frame corresponding to the current frame may be obtained, prediction is performed according to the reference frame to obtain a prediction residual, and transformation, quantization, or entropy encoding is performed on the prediction residual, to obtain the encoded data corresponding to the input video frame. In the process of obtaining the encoded data, at least one of the reference frame, location information corresponding to each encoded block in the current frame, location information corresponding to each reference block in the reference frame, and a motion vector is processed according to the resolution of the current frame. After the reference frame is obtained, a reference block corresponding to the encoded block in the current frame may be obtained from the reference frame, and the encoded block is encoded according to the reference block. Alternatively, the reference frame may be processed according to the resolution of the current frame, to obtain a corresponding target reference frame, a target reference block corresponding to the encoded block in the current frame is obtained from the target reference frame, and the encoded block is encoded according to the target reference block, to obtain the encoded data corresponding to the input video frame.

In an embodiment, the encoding the current frame at a resolution of the current frame, to obtain the encoded data corresponding to the input video frame includes: obtaining, at the resolution of the current frame, an encoding mode corresponding the current frame during encoding; adding encoding mode information corresponding to the encoding mode to the encoded data corresponding to the input video frame.

For example, the encoding mode is a processing manner related to encoding. For example, the encoding mode may include one or more of an upsampling manner used, during encoding, by a reconstructed video frame obtained by decoding the reference frame, a rule corresponding to the reference rule, a sampling manner for performing sampling processing on the reference frame, and a resolution corresponding to a motion vector. Encoding mode information corresponding to the encoding mode is added to the encoded data corresponding to the input video frame, so that encoded data corresponding to a current video frame can be decoded according to the encoding mode information during decoding.

In an embodiment, alternatively, encoding mode information corresponding to the encoding mode may not be added to the encoded data. Instead, an encoding mode is preset in a codec standard, and a decoding mode corresponding to the encoding mode is set on a decoder side. Alternatively, an encoding mode and a decoding mode that match each other may be obtained through calculation according to a same algorithm or corresponding algorithms on an encoder side and a decoder side. For example, as is preset in the codec standard, a method for up sampling the reference frame during encoding is the same as a method for upsampling the reference frame during decoding.

Figure 14:
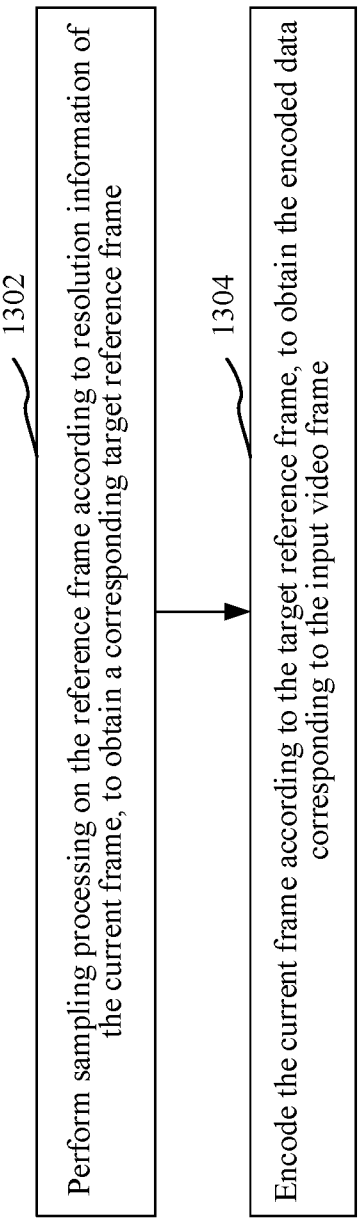
FIG. 14 is a flowchart of encoding a current frame according to a reference frame to obtain encoded data corresponding to an input video frame according to an embodiment of this application.

In an embodiment, as shown in FIG. 14, the encoding the current frame according to the reference frame, to obtain the encoded data corresponding to the input video frame includes the following steps:

Step 1302. Perform sampling processing on the reference frame according to the resolution information of the current frame, to obtain a corresponding target reference frame.

For example, the target reference frame is a video frame obtained after sampling processing is performed on the reference frame. The sampling processing is a process in which the reference frame is sampled by using the resolution information of the current frame, so that a resolution information of the obtained target reference frame matches the resolution information of the current frame. During sampling processing, a sampling manner may be determined first, the sampling manner including one of a direct sub-pixel interpolation manner and a post-sampling sub-pixel interpolation manner. The direct sub-pixel interpolation manner is adopted for directly performing sub-pixel interpolation on the reference frame. The post-sampling sub-pixel interpolation manner is adopted for performing sub-pixel interpolation after sampling processing is performed on the reference frame.

The sub-pixel interpolation is a process of obtaining reference data of a sub-pixel level by interpolating reference data of a whole pixel in the reference frame. For example, FIG. 15 and FIG. 16 are each a schematic diagram of interpolating a reference frame according to an embodiment. Referring to FIG. 15, pixels such as A1, A2, A3, B1, B2, and B3 are 2*2 whole pixels in the reference frame. Sub-pixel reference data is obtained through calculation according to reference data of these whole pixels. For example, an average value may be calculated according to reference data of three whole pixels A1, A2, and A3 to obtain reference data of a sub-pixel a23. An average value is calculated according to reference data of three whole pixels A2, B2, and C2 to obtain reference data of a sub-pixel a21. Then, reference data of a sub-pixel a22 is obtained through calculation according to the reference data of the sub-pixels a23 and a21, to implement 1/2 pixel precision interpolation on the reference frame. Referring to FIG. 16, pixels such as A1, A2, A3, B1, B2, and B3 are 4*4 whole pixels in the reference frame. Reference data of 15 sub-pixels is obtained through calculation according to reference data of these whole pixels, to implement 1/4 pixel precision interpolation on the reference frame. For example, reference data of a sub-pixel a8 is obtained through calculation according to reference data of whole pixels A2 and B2. Reference data of a sub-pixel a2 is obtained through calculation according to reference data of whole pixels A2 and A3. Similarly, reference data of a total of 15 sub-pixels a1 to a15 is obtained through calculation, to implement a 1/4 pixel precision interpolation on the whole pixel A2. In the process of encoding the current frame, a motion search technology needs to be used in the reference frame to find a reference block corresponding to an encoded block in the current frame, a motion vector is calculated according to information about a motion of the encoded block relative to the reference block, and the motion vector is encoded to notify a decoder side of a location of reference data corresponding to the reference block in the reference frame. Therefore, the sub-pixel interpolation is performed on the reference frame to obtain the target reference frame, so that motion estimation can be performed on the current frame according to the target reference frame with a higher resolution, thereby improving motion estimation accuracy, and improving encoding quality.

In an embodiment, a sampling manner used when processing is performed according to the reference frame to obtain the target reference frame may be set in encoding and decoding rules of the encoder side and the decoder side respectively. The used sampling manners are consistent. In this way, the corresponding sampling manners used for processing the reference frame are determined according to the settings during encoding and decoding.

In an embodiment, the encoding the current frame at a resolution of the current frame, to obtain the encoded data corresponding to the input video frame includes: adding corresponding sampling manner information for performing sampling processing on the reference frame to encoded data corresponding to the reference frame. A location at which the corresponding sampling manner information for performing sampling processing on the reference frame is added to the encoded data may be any one of corresponding sequence-level header information, group-level header information, and frame-level header information. The location at which the sampling manner information is added to the encoded data may be determined according to a range of action corresponding to the sampling manner. The sampling manner information may be added to frame-level header information of the encoded data corresponding to the input video frame, indicating that sub-pixel interpolation processing is performed, by using the sampling manner corresponding to the sampling manner information, on the reference frame corresponding to the input video frame that is being encoded. For example, when a flag Pixel_Sourse_Interpolation used for determining a sampling manner in the frame-level header information of the encoded data is 0, it indicates that the direct sub-pixel interpolation processing is performed on the reference frame corresponding to the input video frame. When Pixel_Sourse_Interpolation is 1, it indicates that the sub-pixel interpolation processing is performed after sampling processing is performed on the reference frame corresponding to the input video frame. In this way, the sub-pixel interpolation may be performed on the reference frame according to the sub-pixel interpolation manner indicated by the flag in the encoded data to obtain the target reference frame on the decoder side, so that the encoded data can be decoded according to the target reference frame to obtain the reconstructed video frame.

In an embodiment, a ratio for sampling the reference frame may be determined according to a ratio relationship between the resolution of the current frame and the resolution of the reference frame. For example, a resolution of each input video frame is 2M*2N. A current input video frame is processed according to the full resolution processing manner, that is, the current input video frame is directly used as a current frame. In this case, a resolution of the current frame is 2M*2N. An input video frame that may be used as a reference frame is processed according to the downsampling processing manner, to obtain a resolution of M*2N of a reference frame obtained after downsampling. Therefore, a resolution of a corresponding reconstructed reference frame is also M*2N. In this case, it is determined that upsampling processing is performed on the reference frame at a sampling ratio of width 2*height 1, to obtain a frame with the same resolution as the current frame. If a current input video frame is processed according to the downsampling processing manner, a resolution of a current frame obtained after downsampling is M*N, and an input video frame that may be used as a reference frame is processed according to the full resolution processing manner, a resolution of a reconstructed reference frame is 2M*2N. In this case, it is determined that downsampling processing is performed on the reference frame at a sampling ratio of width 1/2*height 1/2, to obtain a frame with the same resolution as the current frame.

In an embodiment, because resolutions of input video frames are usually the same, downsampling may be performed according to an input video frame to obtain a downsampling ratio corresponding to a current frame, and an input video frame that may be used as a reference frame may be downsampled to obtain a downsampling ratio corresponding to a reference frame, to determine a ratio for sampling the reference frame. For example, downsampling processing is performed on the input video frame at a sampling ratio of 1/2 to obtain a current frame, and downsampling processing is performed on the input video frame that may be used as a reference frame at a sampling ratio of 1/4 to obtain a reference frame. Therefore, a downsampling ratio corresponding to a reference frame obtained after reconstruction performed according to encoded data of the reference frame is also 1/4. In this case, it may be determined, according to a multiple relationship between the two downsampling ratios, that upsampling processing is performed on the reference frame at a sampling ratio of 2 to obtain a frame with the same resolution as the current frame.

In an embodiment, a sampling method for sampling the reference frame matches a sampling algorithm for downsampling the input video frame to obtain the current frame. That is, if the reference frame needs to be downsampled, a downsampling algorithm is the same as a downsampling algorithm for downsampling the current video frame to obtain the current frame. If the reference frame needs to be upsampled, an upsampling algorithm is a sampling algorithm matching and opposite to a downsampling algorithm for downsampling the input video frame to obtain the current frame.

In this embodiment, when the sampling algorithm for sampling the reference frame matches the sampling algorithm for downsampling the current video frame to obtain the current encoded video frame, an image matching degree between the reference frame and the current encoded video frame can be further improved, inter prediction accuracy can be further improved, and the prediction residual can be reduced, thereby improving quality of an encoded image.

Step 1304. Encode the current frame according to the target reference frame, to obtain the encoded data corresponding to the input video frame.

For example, after the target reference frame is obtained, the target reference frame is searched to obtain an image block similar to an encoded block as a reference block, and a pixel difference between the encoded block and the reference block is calculated to obtain a prediction residual. A first motion vector is obtained according to a displacement from the encoded block to a corresponding target reference block. The encoded data is obtained according to the first motion vector and the prediction residual.

In an embodiment, the first motion vector may be transformed according to target motion vector unit resolution information, to obtain a target motion vector at a target resolution, and the encoded data is generated according to the target motion vector and the prediction residual. A method for transforming the first motion vector according to the target motion vector unit resolution information, to obtain the target motion vector is to be described below.

In an embodiment, alternatively, a vector difference between the target motion vector and a corresponding prediction motion vector may be calculated, and the vector difference is encoded, to obtain encoded data, thereby further reducing a volume of the encoded data. Steps of calculating the vector difference may include: obtaining an initial prediction motion vector corresponding to a current encoded block; obtaining a second vector transformation parameter according to current motion vector unit resolution information corresponding to the initial prediction motion vector and target motion vector unit resolution information; obtaining a target prediction motion vector corresponding to the current encoded block according to the initial prediction motion vector and the second vector transformation parameter; and obtaining a motion vector difference according to the target motion vector and the target prediction motion vector. The target prediction motion vector is a motion vector at a target resolution, and a method for calculating the vector difference is to be described below.

In an embodiment, the performing sampling processing on the reference frame according to the resolution information of the current frame, to obtain a corresponding target reference frame includes: performing sampling processing on the reference frame according to the resolution information of the current frame and motion estimation pixel precision, to obtain the corresponding target reference frame.

The motion estimation pixel precision is a unit length of a motion vector corresponding to the encoded block in the current frame. When the encoded block in the current frame is encoded on the encoder side, the unit length of the motion vector corresponding to the encoded block may be refined according to the obtained motion estimation pixel precision. In this way, an obtained motion vector is more refined and accurate. Therefore, sampling processing needs to be performed on the reference frame according to the obtained motion estimation pixel precision to obtain a target reference frame. Then a first motion vector corresponding to each encoded block in the current frame is calculated according to the target reference frame, and encoding is performed based on the first motion vector to obtain encoded data corresponding to the current frame.

For example, resolution information of the reference frame may be obtained, and a method for performing sampling processing on the reference frame, a sampling ratio corresponding to the sampling process, and pixel interpolation precision are determined according to a sub-pixel interpolation manner used for the current frame, the resolution information of the current frame, the resolution information of the reference frame, and the motion estimation pixel precision corresponding to the current frame. A value of the motion estimation pixel precision may be set according to a requirement, and is usually set to, for example, 1/2 pixel precision, 1/4 pixel precision, or 1/8 pixel precision.

In an embodiment, corresponding motion estimation pixel precision may be set for the current frame according to image feature information of the current frame. The image feature information is, for example, a size, texture information, a motion speed, and the like of the current frame. The motion estimation pixel precision corresponding to the current frame may be determined comprehensively according to various image feature information. More complex image data carried in the current frame indicates richer image information and higher corresponding motion estimation pixel precision. For example, when inter prediction is performed on a P-frame, relatively high motion estimation pixel precision may be used to calculate a motion vector corresponding to each encoded block in the P-frame. When inter prediction is performed on a B-frame, relatively low motion estimation pixel precision may be used to calculate a motion vector corresponding to each encoded block in the B-frame.

In an embodiment, the performing sampling processing on the reference frame according to the resolution information of the current frame and motion estimation pixel precision, to obtain the corresponding target reference frame includes: calculating pixel interpolation precision according to the resolution information of the current frame and the motion estimation pixel precision; and directly performing sub-pixel interpolation on the reference frame according to the pixel interpolation precision, to obtain the corresponding target reference frame.

For example, the pixel interpolation precision is pixel precision corresponding to a case in which the sub-pixel interpolation is performed on the reference frame. When the sub-pixel interpolation manner is a direct sub-pixel interpolation manner, it indicates that sub-pixel interpolation processing may be directly performed on the reference frame to obtain the target reference frame. Therefore, the pixel interpolation precision may be calculated according to the resolution information of the current frame and the motion estimation pixel precision. A ratio of the resolution information of the reference frame to the resolution information of the current frame may be calculated, and the pixel interpolation precision is obtained according to the ratio and the motion estimation pixel precision.

In an embodiment, when the resolution of the reference frame is greater than the resolution of the current frame, data of some sub-pixels in the reference frame may be directly reused, and may be used as data corresponding to sub-pixels corresponding the motion estimation pixel precision. For example, the resolution of the current frame is M*N, and the resolution of the reference frame is 2M*2N. If the motion estimation pixel precision is 1/2, and the pixel interpolation precision is 1, the reference frame may be directly used as the target reference frame. If the motion estimation pixel precision is 1/4, the pixel interpolation precision is calculated to be 1/2. In this case, sub-pixel interpolation processing may be performed on the reference frame at 1/2 pixel interpolation precision to obtain the target reference frame.

In an embodiment, when resolution represented by the resolution information of the current frame is the same as the resolution of the reference frame, sub-pixel interpolation processing is directly performed on the reference frame according to the motion estimation pixel precision, to obtain the corresponding target reference frame.

For example, when the input video frame is processed in the full resolution processing manner to obtain the current frame, and the resolution of the reference frame is an original resolution, the resolution of the current frame is the same as the resolution of the reference frame. Alternatively, when the input video frame is processed in the downsampling processing manner to obtain the current frame, and the reference frame is also obtained by reconstructing encoded data that is obtained through encoding in the downsampling processing manner at the same sampling ratio, the resolution of the current frame is the same as the resolution of the reference frame. In this case, sub-pixel interpolation processing may be directly performed on the reference frame based on the motion estimation pixel precision to obtain the target reference frame, and pixel interpolation precision corresponding to the sub-pixel interpolation processing is the same as the motion estimation pixel precision.

In an embodiment, the performing sampling processing on the reference frame according to the resolution information of the current frame and motion estimation pixel precision, to obtain the corresponding target reference frame includes: performing sampling processing on the reference frame according to the resolution information of the current frame, to obtain an intermediate reference frame; and performing sub-pixel interpolation processing on the intermediate reference frame according to the motion estimation pixel precision, to obtain the target reference frame.

For example, when a sub-pixel interpolation manner corresponding to the current frame is a post-sampling sub-pixel interpolation manner, it indicates that sampling processing needs to be performed on the reference frame first, to obtain an intermediate reference frame with the same resolution as the current frame, and then sub-pixel interpolation processing is performed on the intermediate reference frame, to obtain the corresponding target reference frame.

When the resolution represented by the resolution information of the current frame is less than the resolution of the reference frame, downsampling processing is performed on the reference frame according to the resolution information of the current frame, to obtain the intermediate reference frame. Then sub-pixel interpolation processing is performed on the intermediate reference frame according to the motion estimation pixel precision corresponding to the current frame, to obtain the target reference frame. For example, downsampling processing is performed on an input video frame with a resolution of 2M*2N according to the downsampling processing manner, to obtain a current frame with a resolution of M*N. When the resolution of the reference frame is 2M*2N (the full resolution processing manner), downsampling processing is performed on the reference frame according to a 1/2 sampling ratio, to obtain an intermediate reference frame with a resolution of M*N. If motion estimation pixel precision corresponding to the obtained current frame is 1/2, sub-pixel interpolation processing is performed on the intermediate reference frame according to pixel interpolation precision the same as the motion estimation pixel precision, that is, 1/2 sub-pixel interpolation precision, to obtain the target reference frame. If motion estimation pixel precision corresponding to the obtained current frame is 1/4, sub-pixel interpolation processing is performed on the intermediate reference frame according to 1/4 sub-pixel interpolation precision, to obtain the target reference frame.

When the resolution represented by the resolution information of the current frame is greater than the resolution of the reference frame, upsampling processing is performed on the reference frame according to the resolution information of the current frame, to obtain the intermediate reference frame. Then sub-pixel interpolation processing is performed on the intermediate reference frame according to the motion estimation pixel precision corresponding to the current frame, to obtain the target reference frame. For example, if the resolution of the current frame is 2M*2N, and the resolution of the reference frame is 1/2M*1/2N, upsampling processing needs to be performed on the reference frame according to a sampling ratio of 4, to obtain an intermediate reference frame with the same resolution as the current frame. If the motion estimation pixel precision is 1/2, sub-pixel interpolation processing is further performed on the obtained intermediate reference frame according to 1/2 pixel interpolation precision, to obtain the target reference frame. If the motion estimation pixel precision is 1/4, sub-pixel interpolation processing is further performed on the obtained intermediate reference frame according to 1/4 pixel interpolation precision, to obtain the target reference frame.

Figure 17:
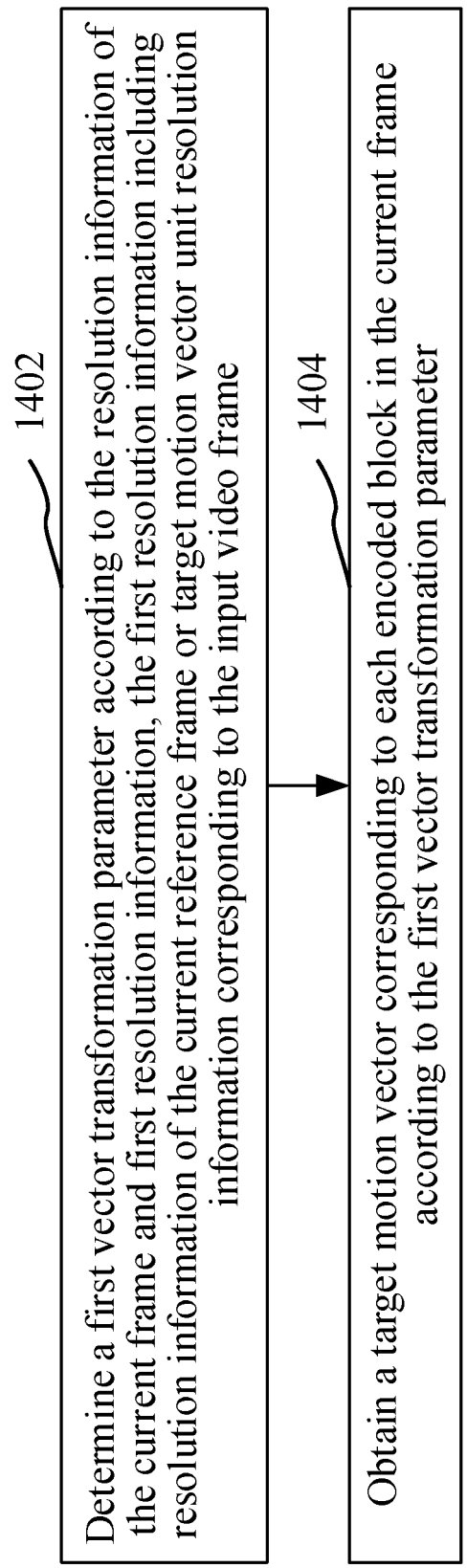
FIG. 17 is a flowchart of encoding a current frame according to a reference frame at a resolution of the current frame to obtain encoded data corresponding to an input video frame according to an embodiment of this application.
Figure 18:
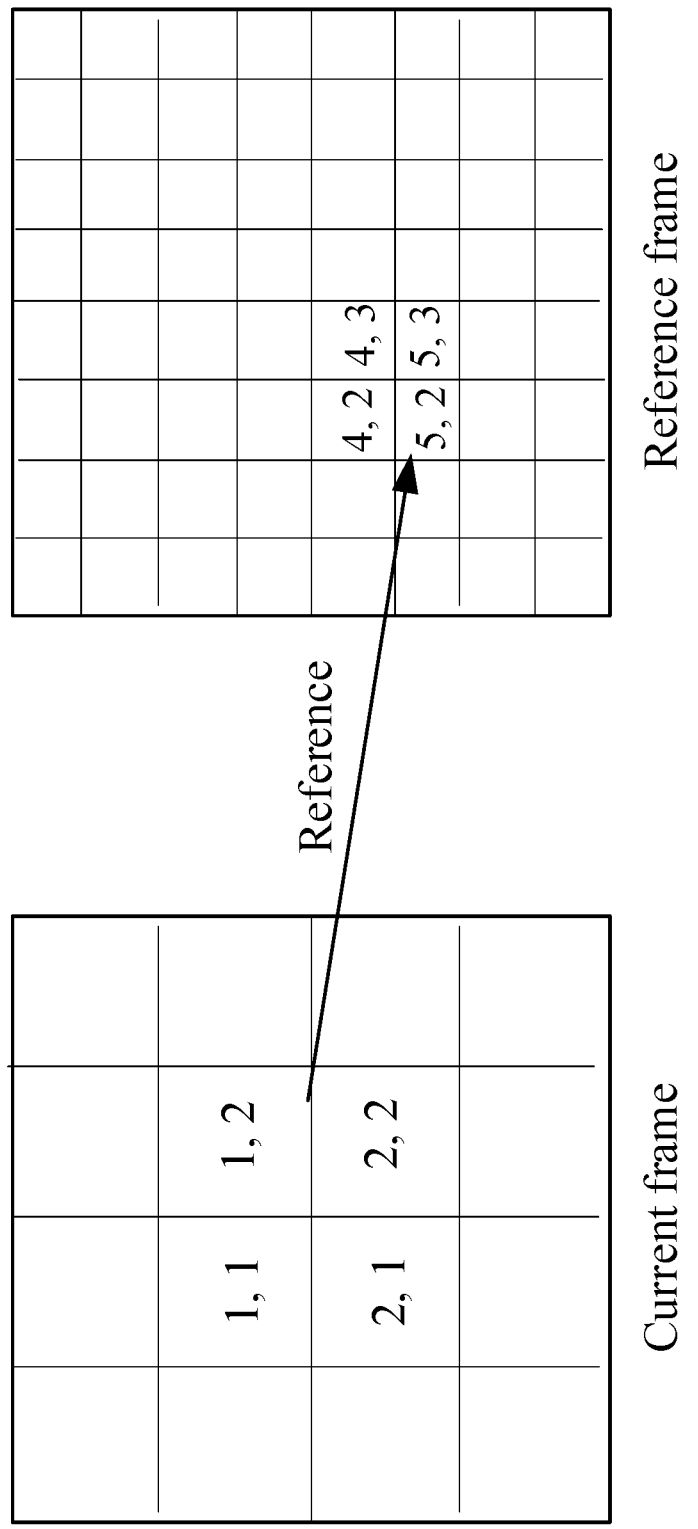
FIG. 18 is a schematic diagram of a reference frame and a current frame according to an embodiment of this application.

As shown in FIG. 17, the encoding the current frame at a resolution of the current frame according to the reference frame, to obtain the encoded data corresponding to the input video frame includes the following steps:

Step 1402. Determine a first vector transformation parameter according to the resolution information of the current frame and first resolution information, the first resolution information including resolution information of the reference frame or target motion vector unit resolution information corresponding to the input video frame.

For example, the first vector transformation parameter is used for transforming location information for obtaining a motion vector or the motion vector. The resolution information is information related to a resolution, and may be, for example, the resolution or a downsampling ratio. The first vector transformation parameter may be a ratio between the resolution information of the current frame and the first resolution information. For example, it is assumed that a downsampling ratio of the reference frame is 1/3, and a downsampling ratio of the current frame is 1/6. In this case, the first vector transformation parameter may be 1/3 divided by 1/6 equals 2.

Step 1404. Obtain a target motion vector corresponding to each encoded block in the current frame according to the first vector transformation parameter.

For example, after the first vector transformation parameter is obtained, the obtained motion vector or the location information corresponding to the motion vector is transformed according to the first vector transformation parameter, to obtain a target motion vector. When the target motion vector is transformed by using the first vector transformation parameter, the target motion vector is a motion vector at a target resolution represented by the target motion vector unit resolution information. The target motion vector unit resolution information and information that corresponds to the target resolution corresponding to a unit of the target motion vector may be, for example, the target resolution or a downsampling ratio. When the location information corresponding to the motion vector is transformed by using the first vector transformation parameter, the location information corresponding to the current frame and the location information of the reference frame are at the same quantization scale, a second motion vector is obtained according to the transformed location information, and the second motion vector is transformed into the target motion vector at the target resolution.

In an embodiment, the determining a first vector transformation parameter according to the resolution information of the current frame and first resolution information includes: determining the first vector transformation parameter according to the resolution information of the current frame and the resolution information of the reference frame. The obtaining a target motion vector corresponding to each encoded block in the current frame according to the first vector transformation parameter includes: obtaining first location information corresponding to the current encoded block, and obtaining second location information corresponding to a target reference block corresponding to the current encoded block; and calculating the target motion vector corresponding to the current encoded block according to the first vector transformation parameter, the first location information, and the second location information.

For example, the current encoded block is an encoded block on which predictive encoding currently needs to be performed in the input video frame. The target reference block is an image block, in the reference frame, used for performing predictive encoding on the current encoded block. The first location information corresponding to the current encoded block may be represented by coordinates of a pixel. The first location information corresponding to the current encoded block may include coordinates corresponding to all pixels of the current encoded block, or the first location information corresponding to the current encoded block may include coordinates of one or more pixels of the current encoded block. The second location information corresponding to the target reference block may include coordinates corresponding to all pixels of the target reference block, or the second location information corresponding to the target reference block may include coordinates of one or more pixels of the target reference block. For example, coordinates of the first pixel of the current encoded block may be used as coordinates of the current encoded block, and coordinates of the first pixel of the target reference block may be used as coordinates of the target reference block.

In an embodiment, the computer device may transform the first location information by using the first vector transformation parameter, to obtain corresponding first transformed location information, and obtain the target motion vector according to a difference between the first transformed location information and the second location information. Alternatively, the second location information may be transformed by using the first vector transformation parameter, to obtain corresponding second transformed location information, and obtain the target motion vector according to a difference between the first location information and the second transformed location information.

In an embodiment, the first vector transformation parameter is a ratio obtained by dividing larger-resolution information by smaller-resolution information in the resolution information of the current frame and the resolution information of the reference frame, where a resolution corresponding to the larger-resolution information is greater than a resolution corresponding to the smaller-resolution information. The first vector transformation parameter is used for transforming location information of a frame with the smaller-resolution information in the current frame and the reference frame. For example, if the resolution of the current frame is 1200*1200 pixels, and the resolution of the reference frame is 600*600 pixels, the larger resolution is 1200*1200 pixels, and the smaller resolution is 600*600 pixels. The first vector transformation parameter may be 2. It is assumed that the first location information is (6, 8), and the second location information is (3, 3). In this case, the target motion vector is (6, 8)−(3*2, 3*2)=(0, 2). In this embodiment of this application, the location information corresponding to the frame with the smaller-resolution information is transformed, so that a value of the target motion vector can be reduced, thereby reducing a data volume of encoded data.

In an embodiment, the first vector transformation parameter is a ratio obtained by dividing smaller-resolution information by larger-resolution information in the resolution information of the current frame and the resolution information of the reference frame, and the first vector transformation parameter is used for transforming location information of a frame with the larger-resolution information in the current frame and the reference frame. For example, the resolution of the current frame is 1200*1200 pixels, the resolution of the reference frame is 600*600 pixels, and the first vector transformation parameter may be 1/2. It is assumed that the first location information is (6, 8), and the second location information is (3, 3). In this case, the target motion vector is (6*1/2, 8*1/2)−(3, 3)=(0, 1).

In this embodiment of this application, location information is transformed by using the first vector transformation parameter, so that obtained location information is at the same quantization scale, so that a value of the target motion vector can be reduced, thereby reducing a data volume of encoded data. For example, as shown in FIG. 17, the resolution of the reference frame is twice the resolution of the current frame, the current encoded block includes pixels (1, 1), (1, 2), (2, 1), and (2, 2), and the corresponding target reference block includes pixels (4, 2), (4, 3), (5, 2), and (5, 3). If no transformation is performed, the target motion vector is (−3, −1). If during calculation of the target motion vector, corresponding location information in the current frame is multiplied by 2, and then the target motion vector is calculated, the target motion vector is (−2, 0), which is smaller than (−3, −1).

In an embodiment, the determining a first vector transformation parameter according to the resolution information of the current frame and first resolution information includes: obtaining target motion vector unit resolution information; and determining the first vector transformation parameter according to the resolution information of the current frame and the target motion vector unit resolution information. Step 1404 of obtaining a target motion vector corresponding to each encoded block in the current frame according to the first vector transformation parameter includes: obtaining a first motion vector according to a displacement of a target reference block corresponding to a current encoded block; and obtaining a target motion vector corresponding to the current encoded block according to the first vector transformation parameter and the first motion vector.

For example, the target motion vector unit resolution information refers to information corresponding to a target resolution corresponding to a unit of the target motion vector, and may be, for example, a target resolution or a corresponding downsampling ratio. The target motion vector is calculated by using a vector unit at the resolution as a standard. Resolutions of some frames corresponding to an input video sequence may be the same as an original resolution of an input video frame, while resolutions of some other frames are smaller than the original resolution of the input video frame, that is, the current frames in the video sequence have various resolutions. Therefore, the resolution corresponding to the unit of the target motion vector needs to be determined. The resolution corresponding to the unit of the target motion vector may be set before encoding or may be obtained according to an encoding process parameter, and may be set according to a requirement.

The first motion vector is obtained according to the displacement of the current encoded block and the corresponding target reference block. The target reference block may be obtained from the reference frame, or may be obtained from a target reference frame obtained by processing the reference frame. After the first motion vector is obtained, the first vector transformation parameter may be multiplied by the first motion vector, and an obtained product is used as the target motion vector. For example, it is assumed that the resolution corresponding to the unit of the target motion vector is the original resolution, and the downsampling ratio corresponding to the current frame is 1/2. Because the unit of the target motion vector is at the original resolution, and the first motion vector is calculated at the resolution of the current frame, the first motion vector needs to be transformed. The first vector transformation parameter is equal to 2. When an obtained first motion vector is (2, 2), the target motion vector is (4, 4). After the target motion vector is obtained, encoding may be performed according to the target motion vector. For example, the target motion vector and a prediction residual corresponding to the current encoded block may be encoded, to obtain encoded data.

In an embodiment, when the target reference block is obtained from the reference frame, it may be understood that, for the same encoded block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector may be the resolution corresponding to the current frame. The first vector transformation parameter may be a ratio of the resolution information corresponding to the unit of the target motion vector to the resolution information of the current frame. For example, assuming that the resolution corresponding to the unit of the target motion vector is the original resolution, a sampling ratio corresponding to the unit of the target motion vector is 1, and a sampling ratio of the resolution of the current frame is 1/2, the first vector transformation parameter may be obtained by dividing 1 by 1/2, that is, 2. Alternatively, it is assumed that the resolution corresponding to the unit of the target motion vector is the original resolution, that is, 900*900 pixels, the sampling ratio of the resolution of the current frame is 450*600 pixels, and there may be two first vector transformation parameters, that is, a first vector transformation parameter in a horizontal direction and a first vector transformation parameter in a vertical direction. In this case, the first vector transformation parameter in the horizontal direction is 900/450=2, and the first vector transformation parameter in the vertical direction is 900/600=1.5.

In an embodiment, the target motion vector unit resolution information may be obtained according to a calculation capability of a device performing the encoding. For example, when the device performing the encoding can calculate only integers or requires a long time for calculating decimals, the resolution corresponding to the unit of the target motion vector may be the original resolution corresponding to the input video frame. When the device performing the encoding can quickly calculate decimals, the resolution corresponding to the unit of the target motion vector may be the resolution corresponding to the current frame.

In an embodiment, when the resolution information of the current frame is consistent with the target motion vector unit resolution information, the first vector transformation parameter is 1, and the first motion vector is the same as the target motion vector. Therefore, step 1402 may be skipped, and the first motion vector is used as the target motion vector. When the resolution information of the current frame is inconsistent with the target motion vector unit resolution information, step 1402 is performed.

In this embodiment of this application, when the resolution corresponding to the unit of the target motion vector is the resolution corresponding to the input video frame, that is, the original resolution, for a video sequence with consistent resolutions, target resolutions corresponding to the input video frames are consistent, so that consistency of the target motion vector can be maintained. When the resolution corresponding to the unit of the target motion vector is the resolution corresponding to the current video frame, because the resolution information of the current frame is consistent with the target motion vector unit resolution information, the first motion vector does not need to be transformed, so that the calculation time can be reduced.

In an embodiment, identification information indicating the target motion vector unit resolution information may be added to the encoded data, so that the target resolution corresponding to the target motion vector may be obtained on the decoder side. If no identification information is carried, the target resolution corresponding to the target motion vector may be agreed upon between the encoder side and the decoder side. The identification information is used for indicating the resolution information corresponding to the target motion vector. A location at which the identification information is added to the encoded data may be one or more of group-level header information, sequence-level header information, frame-level header information, and block-level header information. The block-level header information is header information of encoded data corresponding to the encoded block. The location at which the identification information is added to the encoded data may be determined according to a range of action of the target motion vector unit resolution information. For example, if resolutions corresponding to vector units in the video sequence are consistent, the addition location may be the sequence-level header information. Resolution information represented by a value of a flag may be set according to a requirement. For example, when the resolution corresponding to the target motion vector unit resolution information is the original resolution, the corresponding flag MV_Scale_Adaptive is 0. When the resolution corresponding to the target motion vector unit resolution information is the resolution corresponding to the current frame, the corresponding flag MV_Scale_Adaptive is 1.

Figure 19:
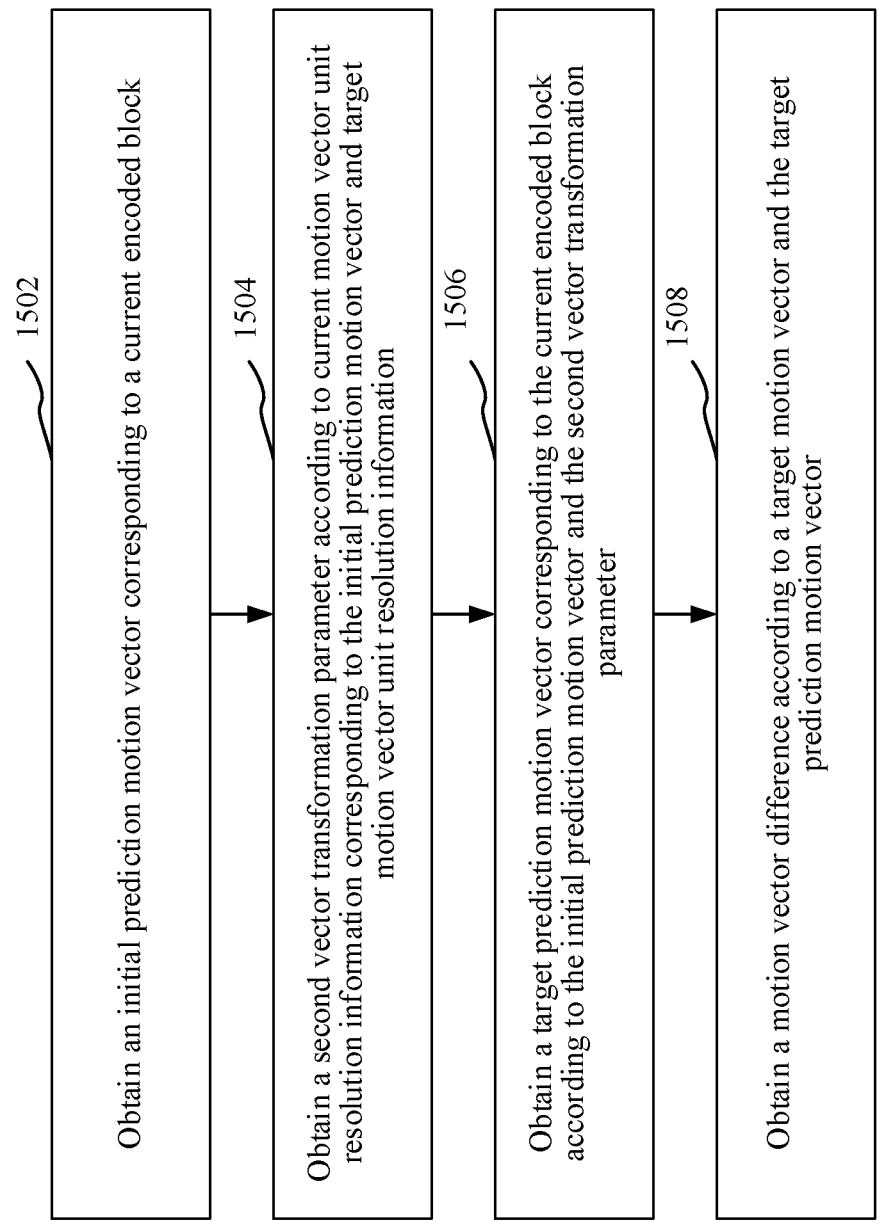
FIG. 19 is a flowchart of encoding a current frame according to a reference frame to obtain encoded data corresponding to an input video frame according to an embodiment of this application.

In an embodiment, as shown in FIG. 19, the encoding the current frame according to the reference frame, to obtain the encoded data corresponding to the input video frame includes the following steps:

Step 1502. Obtain an initial prediction motion vector corresponding to a current encoded block.

Optionally, to reduce the quantity of bits used for encoded data, a motion vector of the current encoded block may be predicted to obtain a prediction value, a difference between the target motion vector and the prediction value is calculated to obtain a motion vector difference, and the motion vector difference is encoded. The initial prediction motion vector is used for predicting the motion vector of the current encoded block. There may be one or more initial prediction motion vectors, and this may be set according to a requirement. An obtaining rule of the initial prediction motion vector may be set according to a requirement. Because the current encoded block is usually spatially correlated to an adjacent encoded block, a target motion vector value corresponding to one or more adjacent encoded blocks corresponding to the current encoded block may be used as the initial prediction motion vector. For example, a first motion vector value corresponding to adjacent encoded blocks at the upper right corner and upper left corner in the current encoded block may be used as the initial prediction motion vector. Alternatively, a target reference block motion vector value corresponding to the target reference block corresponding to the current encoded block may be used as the initial prediction motion vector.

Step 1504. Obtain a second vector transformation parameter according to current motion vector unit resolution information correspond to the initial prediction motion vector and target motion vector unit resolution information.

For example, the current motion vector unit resolution information refers to information corresponding to a current resolution corresponding to a unit of the initial prediction motion vector, and may be, for example, a current resolution or a downsampling ratio. The resolution corresponding to the unit of the initial prediction motion vector means that the initial prediction motion vector is calculated by using a vector unit at the current resolution as a standard, and is a motion vector at the current resolution. When the current motion vector unit resolution information corresponding to the initial prediction motion vector is different from the target motion vector unit resolution information, the second vector transformation parameter needs to be obtained according to the current motion vector unit resolution information corresponding to the initial prediction motion vector and the target motion vector unit resolution information. The second vector transformation parameter is used for transforming the initial prediction motion vector into a motion vector at a target resolution. The second vector transformation parameter may be a ratio of the resolution information corresponding to the unit of the target motion vector to the current motion vector unit resolution information. For example, it is assumed that the resolution corresponding to the unit of the target motion vector is 200*200 pixels, and the current motion vector unit resolution information is 100*100 pixels. In this case, the first vector transformation parameter may be 2.

Step 1506. Obtain a target prediction motion vector corresponding to the current encoded block according to the initial prediction motion vector and the second vector transformation parameter.

For example, after the second vector transformation parameter is obtained, the target prediction motion vector is calculated according to the initial prediction motion vector and the second vector transformation parameter, where the target prediction motion vector is a prediction motion vector at the target resolution. For example, when there is one initial prediction motion vector, the product of the initial prediction motion vector and the second vector transformation parameter may be used as the target prediction motion vector. When there are a plurality of initial prediction motion vectors, calculation may be performed on the initial prediction motion vectors to obtain a calculation result, and the target motion vector is obtained according to the calculation result and the second vector transformation parameter. The calculation result may be one or more of a minimum value, an average value, and a median value of the initial prediction motion vectors. It may be understood that an algorithm for obtaining the target prediction motion vector according to the initial prediction motion vector and the second vector transformation parameter may be customized, and a consistent customized algorithm may be used on the decoder side to obtain the same target prediction motion vector through calculation.

Step 1508. Obtain a motion vector difference according to a target motion vector and the target prediction motion vector.

For example, the difference between the target motion vector and the target prediction motion vector is used as the motion vector difference, to perform encoding according to the motion vector difference, to obtain the encoded data, thereby reducing a data volume of the encoded data.

In this embodiment of this application, the initial prediction motion vector is transformed to obtain the target prediction motion vector at the target resolution, so that units of the target prediction motion vector and the target motion vector are at matching quantization scales. Therefore, the obtained motion vector difference is small, thereby reducing the data volume of the encoded data.

Figure 20:
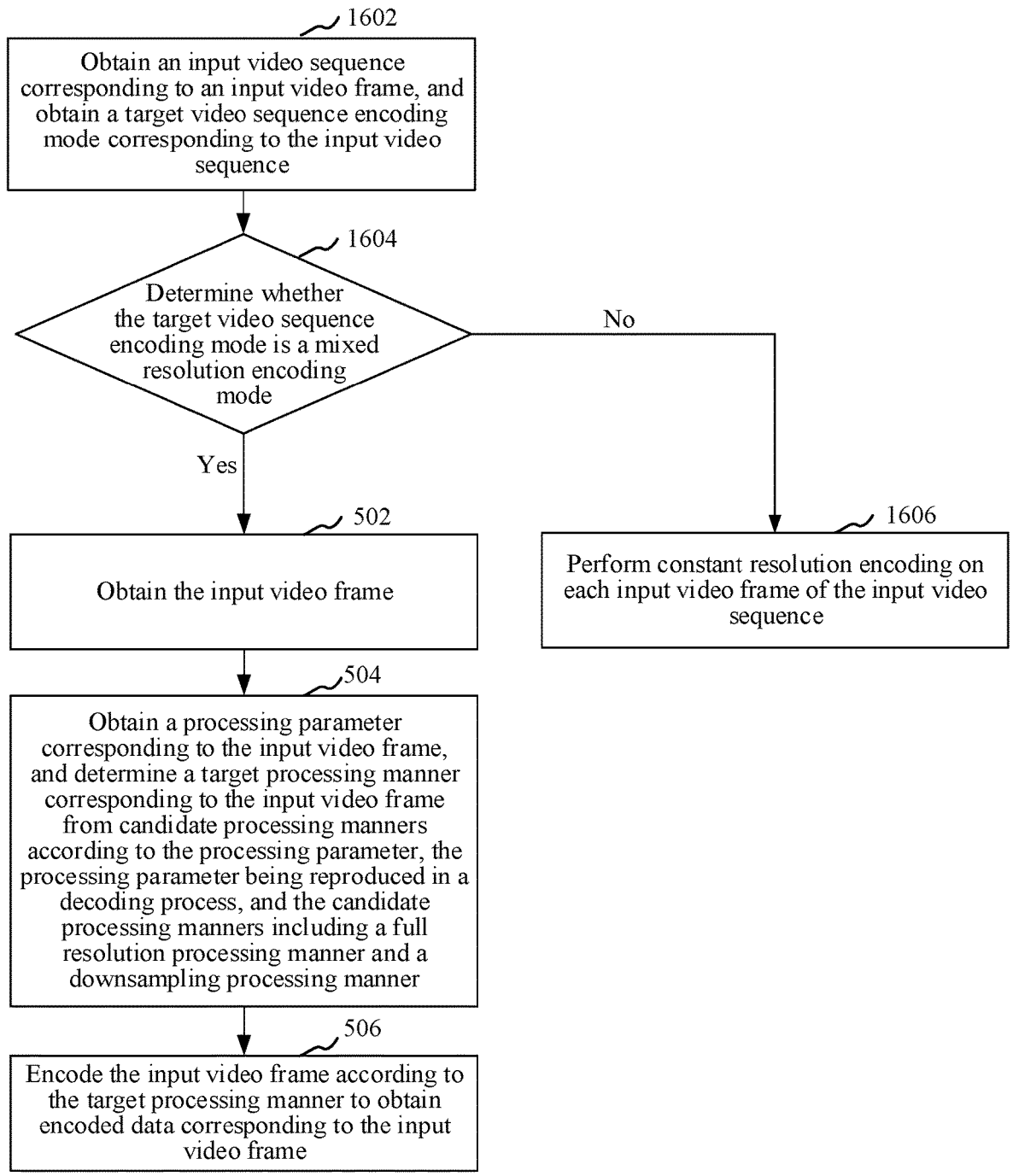
FIG. 20 is a flowchart of a video encoding method according to an embodiment of this application.

In an embodiment, as shown in FIG. 20, before the obtaining an input video frame, the video encoding method further includes the following steps:

Step 1602. Obtain an input video sequence corresponding to an input video frame, and obtain a target video sequence encoding mode corresponding to the input video sequence, the target video sequence encoding mode including a constant resolution encoding mode or a mixed resolution encoding mode.

For example, the input video sequence may include a plurality of input video frames. When the target video sequence encoding mode is the constant resolution encoding mode, each input video frame of the input video sequence is encoded at the same resolution, for example, the full resolution. When the target video sequence encoding mode is the mixed resolution encoding mode, a processing manner corresponding to each input video frame is obtained; the input video frame is processed according to the processing manner, to obtain a current frame; and encoding is performed according to the current frame, where a resolution of the current frame may be the same as the resolution of the input video frame or may be smaller than the resolution of the input video frame. The input video sequence includes frames having different resolutions. Therefore, when a video sequence encoding mode is the mixed resolution encoding mode, the video encoding method provided in the foregoing embodiment is performed.

In an embodiment, the obtaining the target video sequence encoding mode corresponding to the input video sequence includes: obtaining current environment information, the current environment information including at least one piece of the following information: current encoding environment information and current decoding environment information; and determining the target video sequence encoding mode corresponding to the input video sequence according to the current environment information.

For example, environment information may include one or more of a processing capability of a device performing the video encoding method, a processing capability of a device performing a video decoding method, and current application scenario information. The processing capability may be represented by a processing speed. For example, because a device with a strong processing capability has a high processing speed, the corresponding target video sequence encoding mode is the full resolution encoding mode. When a current application scenario corresponding to the current application scenario information is a real-time application scenario, the video sequence encoding mode is the mixed resolution encoding mode. When a current application scenario corresponding to the current application scenario information is a non-real-time application scenario, the video sequence encoding mode is the constant resolution encoding mode. A correspondence between the current environment information and the video sequence encoding mode may be set. After the current environment information is obtained, the target video sequence encoding mode corresponding to the input video sequence is obtained according to the correspondence between the current environment information and the video sequence encoding mode. For example, a correspondence between the video sequence encoding mode and an average value of processing speeds of the device performing the video encoding method and the device performing the video decoding method may be set. After the processing speed of the device performing the video encoding method and the processing speed of the device performing the video decoding method are obtained, the average value is calculated, and the target video sequence encoding mode is obtained according to the average value. Whether the current application scenario is a real-time application scenario may be set according to a requirement. For example, a video call application scenario and a game application scenario are real-time application scenarios; application scenarios corresponding to video encoding on a video website and encoding of an offline video are non-real-time application scenarios.

Step 1604. Determine whether the target video sequence encoding mode is a mixed resolution encoding mode.

If yes, go to step 502; if not, go to step 1606.

Step 1606. Perform constant resolution encoding on each input video frame of the input video sequence.

For example, when the video sequence encoding mode is the constant resolution encoding mode, constant resolution encoding is performed on each input video frame of the input video sequence.

In an embodiment, the encoding the current frame at a resolution of the current frame, to obtain the encoded data corresponding to the input video frame includes: adding video sequence encoding mode information corresponding to the target video sequence encoding mode to the encoded data.

For example, the video sequence encoding mode information is used for describing an encoding mode used for the input video sequence, and a flag Sequence_Mix_Resolution_Flag describing the video sequence encoding mode may be added to the encoded data, and a value of the flag may be set according to a requirement. A location at which the video sequence encoding mode information is added to the encoded data may be sequence-level header information. For example, when Sequence_Mix_Resolution_Flag is 1, the corresponding target video sequence encoding mode may be the mixed resolution encoding mode. When Sequence_Mix_Resolution_Flag is 0, the corresponding target video sequence encoding mode may be the constant resolution encoding mode.

Figure 21:
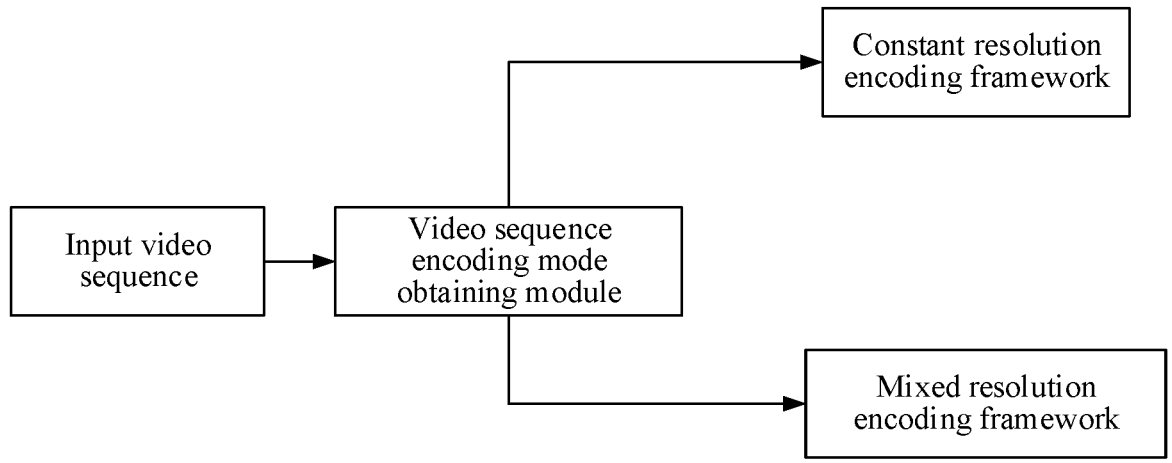
FIG. 21 is a schematic diagram of a video encoding framework according to an embodiment of this application.

In an embodiment, a video encoding framework is shown in FIG. 21. The video encoding framework includes a constant resolution encoding framework and a mixed resolution encoding framework. The mixed resolution encoding framework may correspond to the encoding framework in FIG. 2. After the input video sequence is obtained, the video sequence encoding mode is decided at a video sequence encoding mode obtaining module. When the target video sequence encoding mode is the mixed resolution encoding mode, the mixed resolution encoding framework is used for encoding. When the target video sequence encoding mode is the constant resolution encoding mode, the constant resolution encoding framework shown in FIG. 21 is used for constant resolution encoding. The constant resolution encoding framework may be an existing HEVC encoding framework or H.265 encoding framework, or the like.

The video encoding method is described in the following on the assumption that a video sequence A includes three input video frames: a, b, and c.

1. A target video sequence encoding mode corresponding to the video sequence A is obtained. Because a current environment is a video call environment, the target video sequence encoding mode is the mixed resolution encoding mode.

2. A decision is made for the first input video frame a by using a processing manner decision-making unit in a mixed resolution encoding framework, to obtain that a processing manner is a downsampling processing manner, and a downsampling ratio is 1/2. Downsampling processing is performed on a, to obtain a video frame a1. Intra-frame encoding is performed on a1, to obtain encoded data d1 corresponding to a1. The encoded data d1 corresponding to a1 is reconstructed, to obtain a corresponding reconstructed video frame a2.

3. A decision is made for the second input video frame b by using the processing manner decision-making unit in the mixed resolution encoding framework, to obtain that a processing manner is a downsampling manner, and a sampling ratio is 1/4. b is downsampled, to obtain b1, b1 is encoded to obtain encoded data corresponding to b, and sampling ratio information corresponding to the downsampling ratio and processing manner information corresponding to the processing manner are carried in the encoded data.

The encoding process includes: a2 needs to be used as a reference frame because b is an inter prediction frame, and sampling processing needs to be performed on a2 because b1 and a2 have different resolutions. It is determined that the sampling manner of a2 is direct sub-pixel interpolation, and motion estimation precision is 1/4. Therefore, pixel interpolation precision is 1/4*2=1/2. 1/2 sub-pixel interpolation is performed on a2 according to the pixel interpolation precision, to obtain a target reference frame a3. A first motion vector MV1 between a current encoded block in b1 and a target reference block in the target reference frame is calculated, and a prediction residual is p1. In addition, it is obtained that a target resolution is an original resolution. Therefore, the target motion vector is 4MV1. An initial prediction vector is calculated to be MV2, and the initial prediction vector is calculated at a resolution corresponding to a downsampling ratio of 1/4. Therefore, a target prediction vector is 4MV2. Therefore, a motion vector difference MVD1 corresponding to the current encoded block is equal to 4MV1-4MV2. Transformation, quantization, and entropy encoding are performed on MVD1 and p1, to obtain encoded data.

4. A decision is made for the third input video frame c by using the processing manner decision-making unit in the mixed resolution encoding framework, to obtain that a processing manner is a downsampling processing manner, and a sampling ratio is 1/8. c is downsampled, to obtain c1, and c1 is encoded, to obtain encoded data d2 corresponding to c.

The encoding process includes: Because c is an inter prediction frame, a corresponding reference frame is a reconstructed video frame b2 obtained by reconstructing encoded data of b; and sampling processing needs to be performed on b2 because c1 and b2 have different resolutions. It is determined that the sampling manner of b2 is direct sub-pixel interpolation, and motion estimation precision is 1/4. Therefore, pixel interpolation precision is 1/4*2=1/2. 1/2 sub-pixel interpolation is performed on b2 according to the pixel interpolation precision, to obtain a target reference frame b3. A first motion vector MV3 between a current encoded block in c1 and a target reference block in the target reference frame is calculated, and a prediction residual is p2. In addition, it is obtained that a target resolution is an original resolution. Therefore, the target motion vector is 8MV3. It is obtained that an initial prediction vector is MV4, and the initial prediction vector is calculated at a resolution corresponding to a downsampling ratio of 1/4. Therefore, a target prediction vector is 4MV4. Therefore, a motion vector difference MVD2 corresponding to the current encoded block is equal to 8MV3-4MV4. Transformation, quantization, and entropy encoding are performed on MVD2 and p2, to obtain encoded data d3.

5. An encoded data packet formed by d1, d2, and d3 is used as encoded data corresponding to the video sequence, and is sent to a receiving terminal, where the encoded data corresponding to the video sequence carries a flag for describing that the target video sequence encoding mode is the mixed resolution encoding mode.

In an embodiment, the processing parameter includes: encoded data transmitted to the decoder side; or processing data obtained according to the encoded data transmitted to the decoder side; or the encoded data and the processing data.

The processing parameter corresponding to the input video frame may be, but is not limited to, first encoded data corresponding to the input video frame, and/or second encoded data corresponding to a forward video frame before the input video frame, and/or processing data obtained according to the first encoded data and/or the second encoded data, and/or an image feature corresponding to a reconstructed video frame before the input video frame. The image feature refers to information related to content of an image, including one or more pieces of image motion information and image texture information, such as edges. For example, when the processing parameter corresponding to the input video frame is the first encoded data corresponding to the input video frame, it is determined that the processing parameter corresponding to the input video frame is a parameter reproduced in a decoding process; and/or when the processing parameter corresponding to the input video frame is the second encoded data corresponding to the forward video frame before the input video frame, it is determined that the processing parameter corresponding to the input video frame is a parameter reproduced in a decoding process; and/or when the processing parameter corresponding to the input video frame is the processing data obtained according to the first encoded data and/or the second encoded data, it is determined that the processing parameter corresponding to the input video frame is a parameter reproduced in a decoding process; and/or when the processing parameter corresponding to the input video frame is the image feature corresponding to the reconstructed video frame before the input video frame, it is determined that the processing parameter corresponding to the input video frame is a parameter reproduced in a decoding process.

In an embodiment, the determining a target processing manner corresponding to the input video frame from candidate processing manners according to the processing parameter includes: obtaining a forward encoded block in a forward encoded video frame corresponding to the input video frame; calculating a module gradient value corresponding to the forward encoded block; classifying the forward encoded block into a target module class in a module class set according to the module gradient value, each candidate module class in the module class set being respectively corresponding to a different module gradient value range; obtaining a correspondence between the candidate module classes and the candidate processing manners; and determining the target processing manner corresponding to the input video frame according to the target module class and the correspondence between the candidate module classes and the candidate processing manner.

The module gradient value refers to an average gradient value corresponding to the forward encoded block. Because forward encoded blocks may have different sizes, use of the average gradient value can better reflect a content complexity of the forward encoded block. The module gradient value of the forward encoded block is equal to an average of a sum of pixel gradient values of all pixels in the forward encoded block. The module gradient value reflects a complexity of an image corresponding to the forward encoded block. A larger module gradient value indicates more details included in the forward encoded block. For example, a module gradient value corresponding to an image edge is usually relatively large. In an embodiment, a Laplace filter may be used to calculate a pixel gradient value corresponding to each pixel, and then a module gradient value is calculated according to pixels included in the forward encoded block.

A plurality of module classes are obtained through division according to module gradient values in advance, to form a module class set. The module class set includes a plurality of module classes, and each module class corresponds to a corresponding module gradient value range. Different module classes correspond to different module gradient value ranges, and module gradient value ranges respectively corresponding to the module classes do not overlap. That is, one module gradient value can match only one module class. Therefore, after the module gradient value is obtained, a corresponding target module class may be determined according to the module gradient value.

Different module classes correspond to different processing manners. The processing manner is adopted for processing the forward encoded block. A larger module gradient value included in a module gradient value range corresponding to a module class indicates higher definition obtained in the target processing manner. A processing manner with a better processing effect indicates a higher calculation complexity and a lower corresponding processing speed. To meet requirements of users on the definition and the processing speed, a plurality of processing manners are combined for use. A forward encoded block with a larger module gradient value contains more details, and therefore, a processing manner having a higher complexity and a better effect is adopted. A forward encoded block with a smaller module gradient value contains fewer details, and therefore, a processing manner having a lower complexity is used. Because people are more sensitive to definition of content with more details, a processing manner having a good effect is preferentially adopted.

Corresponding processing manners are set for candidate module classes according to the module gradient value ranges corresponding to the candidate module classes. A larger module gradient value indicates a better processing effect of a corresponding processing manner.

After the target module class is obtained, the target processing manner corresponding to the forward encoded block may be determined according to the correspondence between the candidate module classes and the candidate processing manners. Different processing manners are adopted for different forward encoded blocks, that is, the forward encoded blocks are processing by using a plurality of processing manners, so that both video encoding quality and a video encoding speed can be improved. In an embodiment, the determining a target processing manner corresponding to the input video frame from candidate processing manners according to the processing parameter includes: calculating a target image content complexity corresponding to a forward reconstructed frame corresponding to the input video frame; obtaining a correspondence between candidate image content complexities and candidate processing manners; determining the target processing manner corresponding to the target image content complexity according to the correspondence.

The image content complexity is a content complexity of an image of the video frame. The image content complexity is related to at least one of a motion range, a texture complexity, richness of details, and a spatial correlation. In an embodiment, an image content complexity may be represented by using an image gradient value. The image gradient value is obtained according to a sum of pixel gradient values corresponding to pixels. A larger image gradient value obtained through calculation indicates a higher image content complexity.

The correspondence between the candidate image content complexities and the candidate processing manners is preset. For a higher image content complexity, when a calculation complexity allows, a more complex processing manner with higher quality is preferentially adopted. Different processing manners have different calculation complexities, and a processing manner having a higher calculation complexity indicates that a better processing effect is to be obtained.

The target processing manner corresponding to the image content complexity is obtained according to the preset correspondence between the candidate image content complexities and the candidate processing manners.

In an embodiment, a video encoding method is provided. The method may be performed by a computer device. The method includes the following steps:

Step 1. Obtain an input video frame.

Step 2. Obtain a processing parameter corresponding to the input video frame, and determine a target processing manner corresponding to the input video frame from candidate processing manners according to the processing parameter, the processing parameter being a parameter reproduced in a decoding process, and the candidate processing manners including at least one of a full resolution processing manner and a downsampling processing manner.

For example, step 2 includes the following steps:

1. Obtain a frame type corresponding to the input video frame, and obtain the processing parameter corresponding to the input video frame according to the frame type.

2. Obtain bit rate information corresponding to the input video frame, obtain original resolution information and a first threshold corresponding to the input video frame, calculate a first ratio according to the bit rate information and the original resolution information, and determine the target processing manner corresponding to the input video frame according to the first ratio and the first threshold.

For example, step 2 includes the following steps:

1. Calculate a second ratio of encoded blocks of a target prediction type in a forward encoded video frame corresponding to the input video frame, calculate a second ratio of intra-coded blocks in the forward encoded video frame in the forward encoded video frame, and when the second ratio is greater than a second threshold, determine that the processing manner is the downsampling processing manner.

For example, the computer device obtains resolution information corresponding to a reference frame corresponding to the input video frame, and determines the second threshold according to the resolution information.

For example, step 2 includes the following steps:

obtaining a current quantization parameter corresponding to the input video frame, obtaining a quantization parameter threshold corresponding to the input video frame, and determining the processing manner corresponding to the input video frame according to a magnitude relationship between the current quantization parameter and the quantization parameter threshold.

Step 3. Encode the input video frame according to the target processing manner to obtain encoded data corresponding to the input video frame.

For example, the input video frame is processed according to the target processing manner, to obtain a current frame, and the current frame is encoded at a resolution of the current frame, to obtain the encoded data corresponding to the input video frame.

Figure 22:
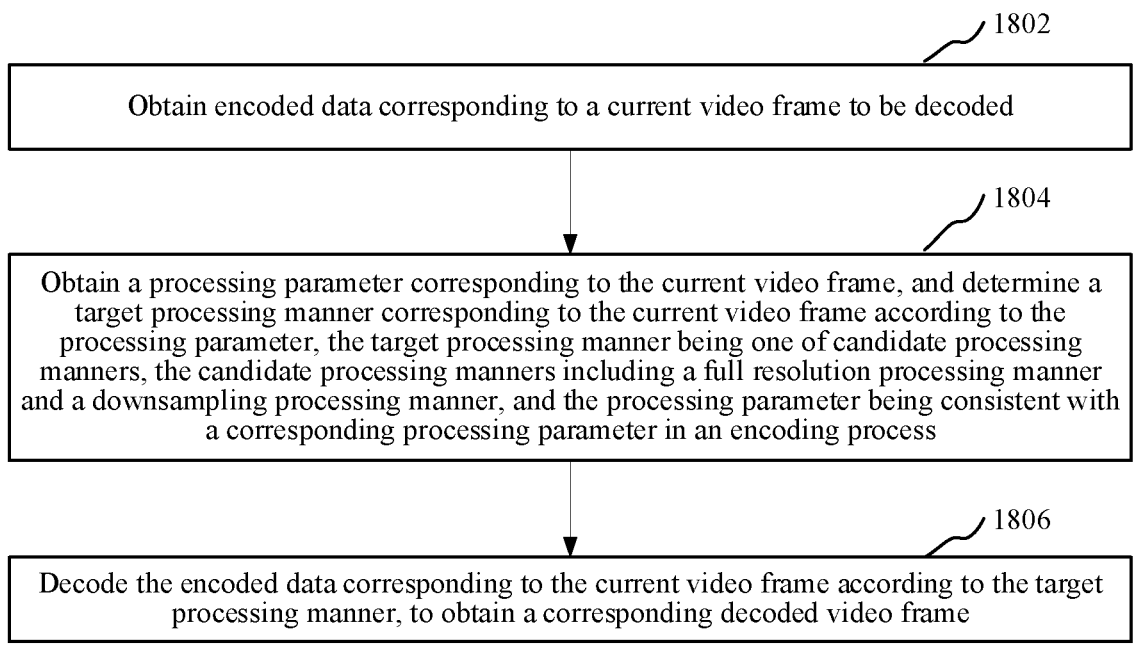
FIG. 22 is a schematic flowchart of a video decoding method according to an embodiment of this application.

As shown in FIG. 22, in an embodiment, a video decoding method is provided. This embodiment is described mainly by using an example in which the method is applied to the terminal 110 or the server 120 in FIG. 1. The method may include the following steps:

Step 1802. Obtain encoded data corresponding to a current video frame.

For example, the current video frame is a video frame that needs to be decoded. One video sequence may include a plurality of video frames. Each video frame may be a video frame obtained in real time, or may be a video frame obtained from a prestored video sequence.

Step 1804. Obtain a processing parameter corresponding to the current video frame, and determine a target processing manner corresponding to the current video frame according to the processing parameter, the target processing manner being one of candidate processing manners, the candidate processing manners including at least one of a full resolution processing manner and a downsampling processing manner, and the processing parameter being consistent with a corresponding processing parameter in an encoding process.

For example, the processing parameter is a parameter used for determining a processing manner of the current video frame. The processing parameter herein is consistent with the corresponding processing parameter in the encoding process. That is, the processing parameter in the encoding process can be reproduced in a decoding process. The processing parameter corresponding to the current video frame is obtained, and the target processing manner corresponding to the current video frame is determined according to the processing parameter, the target processing manner being one selected from the candidate processing manners. The candidate processing manners may be, but is not limited to, the full resolution processing manner or the downsampling processing manner.

Step 1806. Decode the encoded data corresponding to the current video frame according to the target processing manner, to obtain a corresponding decoded video frame.

For example, after the target processing manner is obtained, the encoded data corresponding to the current video frame is decoded according to the target processing manner, to obtain the decoded video frame. The decoded video frame is obtained by decoding the encoded data corresponding to the current video frame according to the target processing manner. When the target processing manner is the full resolution processing manner, full resolution processing may be performed on the encoded data corresponding to the current video frame. When the target processing manner is the downsampling processing manner, downsampling processing may be performed on the encoded data corresponding to the current video frame, to obtain the decoded video frame.

According to the video decoding method, encoded data corresponding to a current video frame is obtained, a processing parameter corresponding to the current video frame is obtained, a target processing manner corresponding to the current video frame is determined according to the processing parameter, the target processing manner being one of candidate processing manners, the candidate processing manners including at least one of a full resolution processing manner and a downsampling processing manner, and the processing parameter being consistent with a corresponding processing parameter in an encoding process, and finally, the encoded data corresponding to the current video frame is decoded according to the target processing manner, to obtain a corresponding decoded video frame. Therefore, during decoding, the processing parameter corresponding to the current video frame is obtained, the processing parameter being consistent with the corresponding processing parameter in the encoding process, that is, the processing parameter in the encoding process being reproduced in the decoding process, then, the target processing manner is determined according to the processing parameter, and finally, decoding is performed according to the target processing manner, so that an accurate decoded video frame can be obtained.

In an embodiment, the obtaining a processing parameter corresponding to the current video frame includes: obtaining a frame type corresponding to the current video frame, and obtaining the processing parameter corresponding to the current video frame according to the frame type.

For example, the frame type refers to a prediction type of the video frame. A frame prediction type may be an I-frame, a P-frame, or a B-frame. The I-frame is an intra prediction frame, the P-frame is a forward prediction frame, and the B-frame is a bidirectional prediction frame. Each encoded block of the P-frame and the B-frame may be encoded in an intra prediction manner or an inter prediction manner. A correspondence between a frame prediction type and a processing parameter may be set. After the frame type corresponding to the current video frame is obtained, the processing parameter corresponding to the current video frame is obtained according to the correspondence between the frame prediction type and the processing parameter. At least one of parameter types and parameter values of processing parameters corresponding to different frame types are different.

In an embodiment, a value of a corresponding processing parameter may be set according to the frequency or quantity of times for which the current video frame is used as a reference frame. A higher frequency or a larger quantity of times for which the current video frame is used as a reference frame indicates a larger probability that the target processing manner obtained according to the corresponding processing parameter is the full resolution processing manner. For example, a frequency for which the I-frame is used as a reference frame is high. In this case, when the processing parameter includes a current quantization parameter and a quantization parameter threshold, a rule for determining the processing manner is: if the current quantization parameter is greater than the quantization parameter thresholds, determining that the processing manner is a downsampling manner; otherwise, determining that the processing manner is a full resolution processing manner. A quantization parameter threshold corresponding to the I-frame is less than those corresponding to the P-frame and the B-frame, so that a probability that a target processing manner corresponding to the I-frame is the full resolution processing manner is larger than a probability for the P-frame and the B-frame.

In an embodiment, a corresponding processing manner of each of the P-frame and the B-frame may be obtained according to a ratio of intra-coded blocks in a forward encoded video frame of each of the P-frame and the B-frame. Because the I-frame is of an intra-coded prediction type, a ratio of intra-coded blocks in a forward encoded video frame of the I-frame is of little reference for determining a processing manner. Even if the ratio of the intra-coded blocks in the forward encoded video frame of the I-frame is large, encoded data corresponding to the I-frame is still relatively small when a correlation of intra-coded blocks is large. Therefore, after the I-frame is downsampled and then encoded, an effect is not substantially better than that of direct encoding at a full resolution. Therefore, a processing manner corresponding to the I-frame may be determined according to image feature information of the I-frame. For example, if it is determined that the I-frame corresponds to an intense motion scene according to image content of the I-frame, an amount of time domain information corresponding to the I-frame is large, and a corresponding bit rate that can be used for expressing spatial domain information is low. Therefore, use of a low resolution can achieve better image quality, and it is more suitable to select the downsampling processing manner as the processing manner corresponding to the I-frame.

In this embodiment, the target processing manner corresponding to the current video frame is determined from the candidate processing manners according to the processing parameter.

For example, processing manner determining methods corresponding to different frame types may be different or may be the same. For example, if parameter types of processing parameters corresponding to different frame types are the same, and values of the processing parameters are different, the same processing manner determining method may be used to determine corresponding target processing manners. If parameter types of processing parameters corresponding to different frame types are different, different processing manner determining methods may be used. After the processing parameter is obtained, the processing manner is determined from the candidate processing manners according to the processing parameter, and the target processing manner may be determined according to the processing parameter with reference to the processing manner determining method in the foregoing embodiment. Details are not described in this embodiment again.

In this embodiment of this application, a correspondence between a frame type and a processing parameter is set, so that a target processing manner can be flexibly determined according to a prediction type of an input video frame, thereby improving encoding quality.

Figure 23:
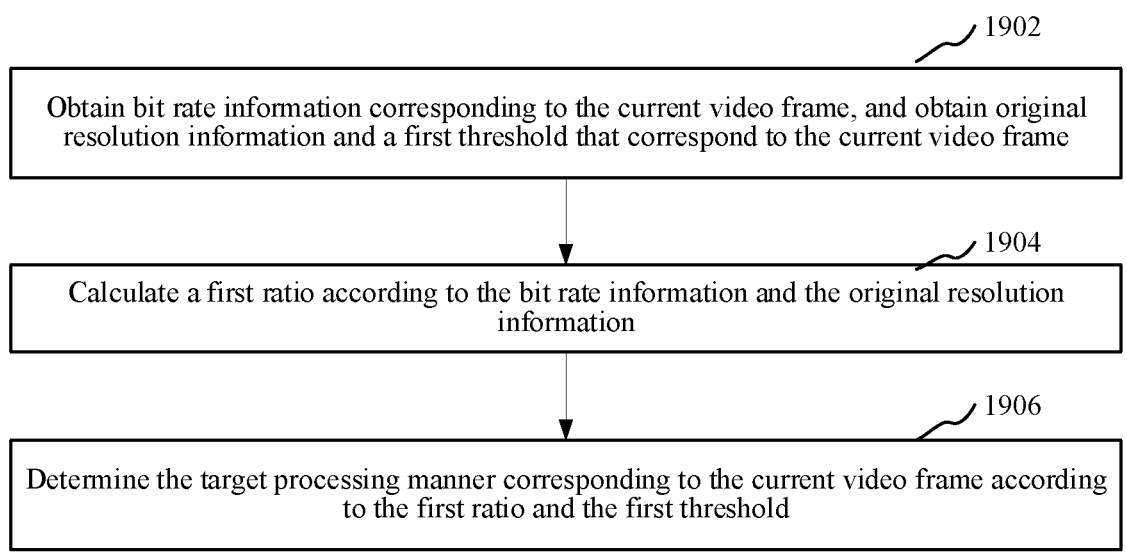
FIG. 23 is a schematic flowchart of generation steps of a target processing manner corresponding to a current video frame according to an embodiment of this application.

In an embodiment, as shown in FIG. 23, the obtaining a processing parameter corresponding to the current video frame, and determining a target processing manner corresponding to the current video frame according to the processing parameter includes the following steps:

Step 1902. Obtain bit rate information corresponding to the current video frame, and obtain original resolution information and a first threshold that correspond to the current video frame.

For example, the corresponding bit rate information is obtained according to the current video frame, and then the corresponding original resolution information and the preset first threshold are obtained according to the current video frame. The first threshold is used for comparison with the original resolution information, to obtain the target manner corresponding to the current video frame.

Step 1904. Calculate a first ratio according to the bit rate information and the original resolution information.

Step 1906. Determine the target processing manner corresponding to the current video frame according to the first ratio and the first threshold.

For example, after the bit rate information corresponding to the current video frame and the corresponding original resolution information and first threshold are obtained, the first ratio is calculated according to the bit rate information and the original resolution information. The calculation may be, but is not limited to, using a ratio of the bit rate information to the original resolution information as the first ratio. For example, if the obtained bit rate information corresponding to the current video frame is a target bit rate, and the obtained original resolution information is a product of a width and a height at an original resolution, the first ratio k calculated according to the bit rate information and the original resolution information is: the target bit rate/the product of the width and the height at the original resolution.

For example, the processing manner is selected from the candidate processing manners. The candidate processing manners include at least one of a full resolution processing manner and a downsampling processing manner. For example, after the first ratio is calculated according to the bit rate information and the original resolution information, the target processing manner corresponding to the current video frame is determined according to the first ratio and the obtained first threshold. A manner of determining the target processing manner may be customized. The customization may be, but is not limited to, determining that the target processing manner corresponding to the current video frame is the downsampling processing manner when the first ratio is less than the obtained first threshold; or determining that the target processing manner corresponding to the current video frame is the downsampling processing manner when a difference between the first ratio and the obtained first threshold is less than a preset threshold; or the like.

Figure 24:
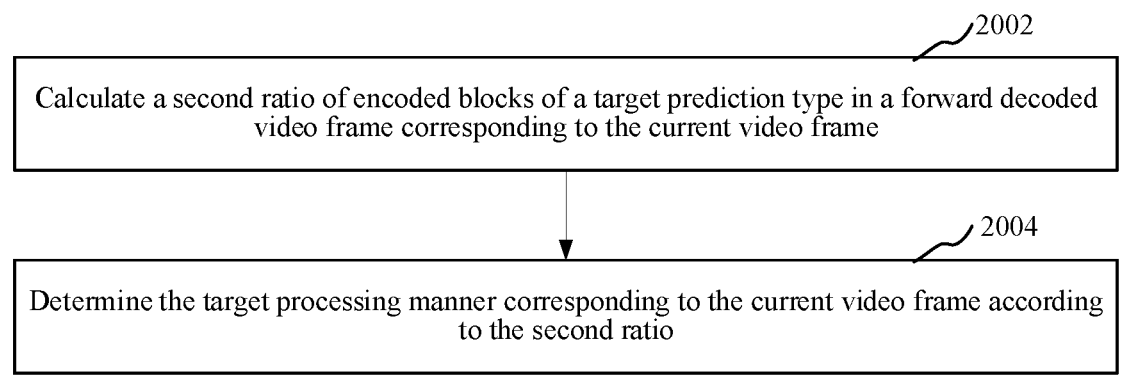
FIG. 24 is a schematic flowchart of generation steps of a target processing manner corresponding to a current video frame according to another embodiment of this application.

In an embodiment, as shown in FIG. 24, the obtaining a processing parameter corresponding to the current video frame, and determining a target processing manner corresponding to the current video frame according to the processing parameter includes the following steps:

Step 2002. Calculate a second ratio of encoded blocks of a target prediction type in a forward decoded video frame corresponding to the current video frame.

Step 2004. Determine the target processing manner corresponding to the current video frame according to the second ratio.

Figure 25:
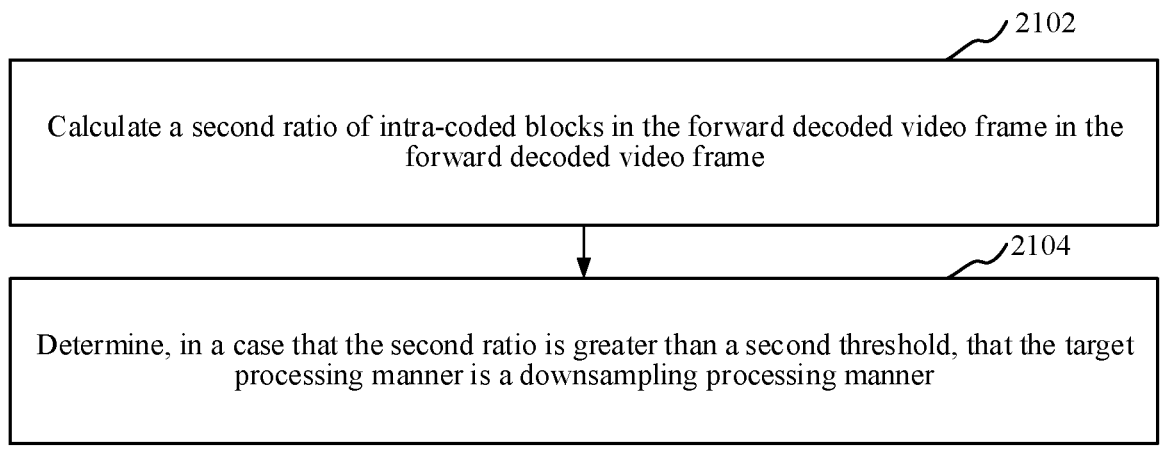
FIG. 25 is a schematic flowchart of generation steps of a target processing manner corresponding to a current video frame according to still another embodiment of this application.

For example, a decoded block of a target prediction type corresponds to an encoded block of the target prediction type. The forward decoded video frame is a video frame decoded in the current video frame. The forward decoded video frame corresponds to a forward encoded video frame. Therefore, the method for calculating a ratio of encoded blocks of the target prediction type obtained on the encoder side is consistent with a method for calculating a ratio of decoded blocks of the target prediction type obtained on the decoder side and calculation results are the same. For the method for obtaining a ratio of decoded blocks of the target prediction type, reference may be made to the method for obtaining a ratio of encoded blocks of the target prediction type. Details are not described herein again. After the processing manner is obtained, when the processing manner is the full resolution processing manner, the corresponding resolution information is the original resolution. When the processing manner is the downsampling processing manner, a preset downsampling ratio is obtained or a downsampling ratio is obtained from header information of the encoded data. In this embodiment, as shown in FIG. 25, the determining a target processing manner corresponding to the current video frame according to the processing parameter includes the following steps:

Step 2102. Calculate a second ratio of intra-coded blocks in the forward decoded video frame in the forward decoded video frame.

Step 2104. Determine, in a case that the second ratio is greater than a second threshold, that the target processing manner is a downsampling processing manner.

When the ratio corresponding to the intra-decoded blocks is greater than a second threshold, it may be determined that the target processing manner corresponding to the current video frame is the downsampling resolution processing manner; otherwise, it is determined that the target processing manner corresponding to the video frame is the full resolution processing manner. For example, when the ratio is greater than the second threshold, it is determined that the processing manner corresponding to the current video frame is the downsampling resolution processing manner; otherwise, it is determined that the target processing manner corresponding to the video frame is the full resolution processing manner.

The second threshold may be determined according to a processing manner of a reference frame corresponding to the current video frame. When the processing manner of the reference frame corresponding to the current video frame is the downsampling manner, a first preset threshold T1 is obtained, and the first preset threshold T1 is used as the second threshold. Similarly, for example, when the processing manner of the reference frame corresponding to the current video frame is the full resolution processing manner, a second preset threshold T2 is obtained, and the second preset threshold T2 is used as the second threshold. Further, for example, after the second threshold is obtained according to resolution information of the reference frame corresponding to the current video frame, the processing manner of the current video frame is determined according to the second threshold and the ratio of the intra-decoded blocks in the forward decoded video frame in the forward decoded video frame. When the ratio of the intra-decoded blocks in the forward decoded video frame in the forward decoded video frame is greater than the second threshold, it is determined that the processing manner corresponding to the current video frame is the downsampling processing manner.

Figure 26:
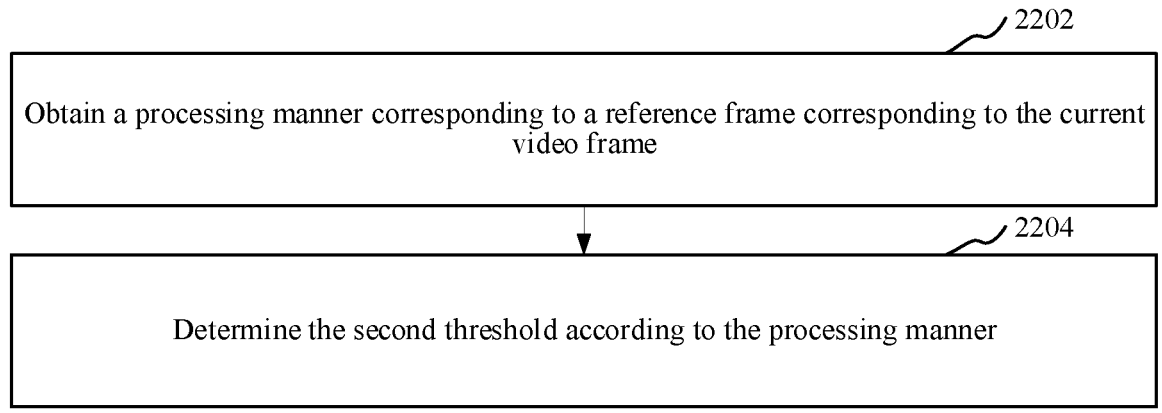
FIG. 26 is a schematic flowchart of a video decoding method according to an embodiment of this application.

In an embodiment, as shown in FIG. 26, based on the video decoding method in FIG. 21, the video decoding method further includes the following steps:

Step 2202. Obtain a processing manner corresponding to a reference frame corresponding to the current video frame.

Step 2204. Determine the second threshold according to the processing manner.

The second threshold may be determined according to a processing manner of a reference frame corresponding to the current video frame. When the processing manner of the reference frame corresponding to the current video frame is the downsampling manner, a first preset threshold T1 is obtained, and the first preset threshold T1 is used as the second threshold. Similarly, for example, when the processing manner of the reference frame corresponding to the current video frame is the full resolution processing manner, a second preset threshold T2 is obtained, and the second preset threshold T2 is used as the second threshold. Further, for example, after the second threshold is obtained according to resolution information of the reference frame corresponding to the current video frame, the processing manner of the current video frame is determined according to the second threshold and the ratio of the intra-decoded blocks in the forward decoded video frame in the forward decoded video frame. When the ratio of the intra-decoded blocks in the forward decoded video frame in the forward decoded video frame is greater than the second threshold, it is determined that the processing manner corresponding to the current video frame is the downsampling processing manner.

In an embodiment, a second preset threshold is greater than a first preset threshold. In this case, when the processing manner corresponding to the reference frame is the full resolution processing manner, it is more suitable to adopt the full resolution processing manner for the current video frame. When the reference frame corresponds to the downsampling processing manner, it is more suitable to adopt the downsampling processing manner for the current video frame.

Figure 27:
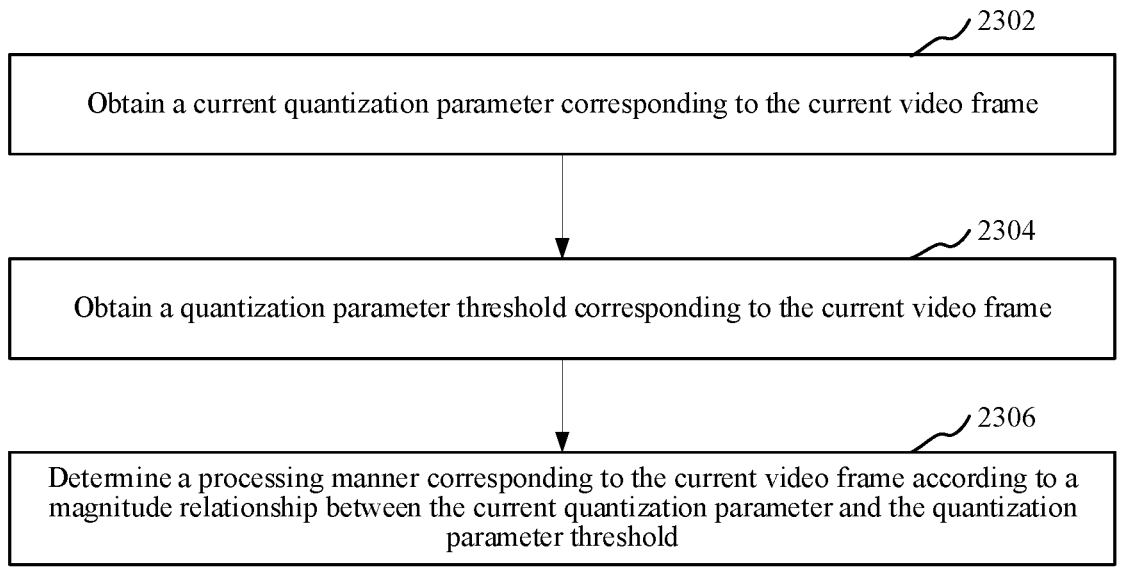
FIG. 27 is a schematic flowchart of generation steps of a target processing manner corresponding to a current video frame according to an embodiment of this application.

In an embodiment, as shown in FIG. 27, the obtaining a processing parameter corresponding to the current video frame, and determining a target processing manner corresponding to the current video frame according to the processing parameter includes the following steps:

Step 2302. Obtain a current quantization parameter corresponding to the current video frame.

Step 2304. Obtain a quantization parameter threshold corresponding to the current video frame.

Step 2306. Determine a processing manner corresponding to the current video frame according to a magnitude relationship between the current quantization parameter and the quantization parameter threshold.

For example, a processing manner corresponding to an input frame may be obtained according to the current quantization parameter and the quantization parameter threshold that correspond to the current video frame, and then the processing manner corresponding to the current video frame is determined according to the magnitude relationship between the current quantization parameter and the quantization parameter threshold. If the current quantization parameter is greater than the quantization parameter threshold, it is determined that the processing manner is the downsampling processing manner; otherwise, it is determined that the processing manner is the full resolution processing manner. The quantization parameter threshold may be obtained according to an intra prediction block ratio of a quantity of intra-coded blocks in an encoded forward decoded video frame before the current video frame to a quantity of encoded blocks. A correspondence between an intra prediction block ratio and the quantization parameter threshold may be preset, so that after an intra prediction block ratio of a current frame is determined, a quantization parameter threshold corresponding to the intra prediction block ratio of the current frame can be determined according to the preset correspondence. For fixed quantization parameter encoding, the current quantization parameter may be a corresponding fixed quantization parameter value. For fixed bit rate encoding, the current quantization parameter corresponding to the current video frame may be obtained through calculation according to a bit rate control model. Alternatively, a quantization parameter corresponding to a reference frame may be used as the current quantization parameter corresponding to the current video frame.

Figure 28:
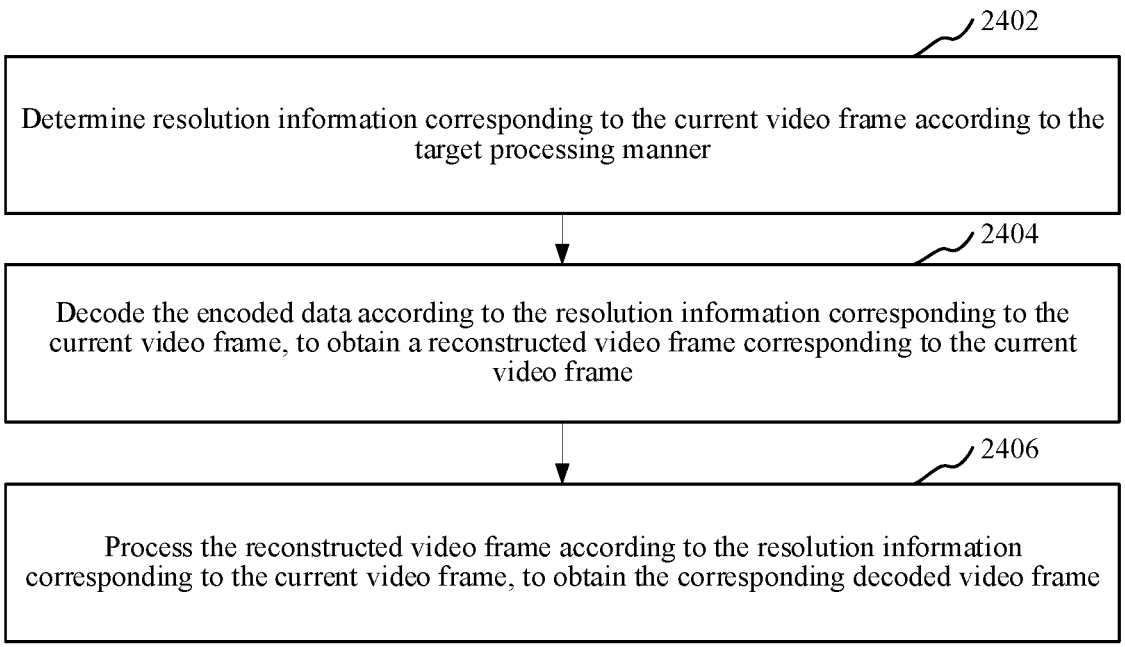
FIG. 28 is a schematic flowchart of decoding steps of a current video frame according to an embodiment of this application.

In an embodiment as shown in FIG. 28, the decoding the encoded data corresponding to the current video frame according to the target processing manner, to obtain a corresponding decoded video frame includes the following steps:

Step 2402. Determine resolution information corresponding to the current video frame according to the target processing manner.

For example, the resolution information is information related to a resolution, and may be the resolution or a downsampling ratio. The resolution information corresponding to the current video frame may be carried in the encoded data or may be obtained through calculation by a decoding device.

In an embodiment, the encoded data may carry the resolution information corresponding to the current video frame. For example, the encoded data may carry a resolution or a downsampling ratio corresponding to the current video frame.

In an embodiment, the encoded data may carry processing manner information, and the decoding device obtains the processing manner information from the encoded data, and obtains the resolution information corresponding to the current video frame according to the processing manner information. For example, the processing manner information that may be carried in the encoded data corresponds to a downsampling processing manner. If it is determined in a codec standard that all downsampling ratios are 1/2 or the encoded data carries a corresponding downsampling ratio, the obtained resolution information is the downsampling ratio of 1/2.

Step 2404. Decode the encoded data according to the resolution information corresponding to the current video frame, to obtain a reconstructed video frame corresponding to the current video frame.

For example, the reconstructed video frame is a video frame obtained through decoding and reconstruction. It may be understood that resolution information corresponding to the reconstructed video frame corresponds to resolution information of a current frame in an encoding process. If there is no loss of image information in the encoding process, the reconstructed video frame is the same as the current frame. If there is a loss of image information in the encoding process, a difference between the reconstructed video frame and the current frame corresponds to a loss value. The encoded data is decoded by using the resolution information corresponding to the current video frame. The decoding may include at least one of prediction, inverse transformation, inverse quantization, and entropy decoding, and is determined according to the encoding process. During decoding, at least one of the reference frame, location information corresponding to each current block of the current frame, location information corresponding to each reference block of the reference frame, and a motion vector is processed according to the resolution information of the current video frame, where a processing method matches the processing method used during encoding performed on the encoder side. For example, a reference frame corresponding to the current video frame may be obtained, and the reference frame is processed according to the resolution information corresponding to the current video frame, to obtain a target reference frame. A target reference block is obtained according to carried motion vector information, a prediction value corresponding to a current block is obtained according to the target reference block, and a reconstructed video frame is obtained according to a prediction residual in the encoded data and the prediction value.

In an embodiment, if the encoder side has transformed location information, when corresponding location information is obtained in the decoding process, the location information needs to be correspondingly transformed, to maintain consistency between a target reference block obtained on the encoder side and the target reference block obtained on the decoder side.

In an embodiment, when the motion vector information carried in the encoded data is a target motion vector, the target motion vector may be transformed according to target motion vector unit resolution information and the resolution information corresponding to the current video frame, to obtain a first motion vector at the resolution information corresponding to the current video frame. The target reference block corresponding to the current block is obtained according to the first motion vector.

In an embodiment, when the motion vector information carried in the encoded data is a motion vector difference, an initial prediction motion vector corresponding to a current block is obtained, and the motion vector difference and the initial prediction motion vector corresponding to each current block are processed at the same resolution, to obtain the first motion vector that corresponds to the corresponding current block and is at the resolution of the current video frame. The target reference block corresponding to the current block is obtained according to the first motion vector.

For example, both the motion vector difference and the initial prediction motion vector are transformed to corresponding motion vectors at the same resolution. For example, the initial prediction motion vector may be transformed to a target prediction motion vector at a target resolution; a target motion vector is obtained according to the target prediction motion vector and the motion vector difference; and then the target motion vector is transformed to the first motion vector at the resolution of the current video frame. Alternatively, the initial prediction motion vector may be transformed to a prediction motion vector at the resolution of the current video frame, and the motion vector difference may be transformed to a motion vector difference at the resolution of the current video frame. The first motion vector is obtained according to the motion vector difference at the resolution of the current video frame and the prediction motion vector at the resolution of the current video frame.

Step 2406. Process the reconstructed video frame according to the resolution information corresponding to the current video frame, to obtain the corresponding decoded video frame.

For example, processing performed on the reconstructed video frame may be sampling processing, for example, upsampling processing. A method for processing the reconstructed video frame may correspond to the method for processing the input video frame during encoding. For example, when a processing manner of the input video frame is the downsampling processing manner, and resolution information of the input video frame is a 1/2 downsampling ratio, upsampling processing is performed on the reconstructed video frame, and an upsampling ratio may be 2.

In an embodiment, when it is determined, on the decoder side from header information of encoded data, that the encoded data is obtained through encoding in the downsampling processing manner, used downsampling ratio information or downsampling method information may further be obtained on the decoder side from the header information, and upsampling processing is performed on the obtained reconstructed video frame by using an upsampling ratio and an upsampling method that match the downsampling ratio information or the downsampling method information, to obtain a decoded video frame. For example, if a sampling ratio corresponding to the downsampling ratio information is 1/2, the decoder side needs to perform upsampling processing on the reconstructed video frame according to a sampling ratio of 2 and an upsampling method matching the downsampling method information, to obtain the decoded video frame. The decoder side may obtain, from any one of sequence-level header information, group-level header information, and frame-level header information, the downsampling ratio information or downsampling method information corresponding to the current encoded data.

In an embodiment, all reconstructed video frames corresponding to the current video frames of the video sequence are processed into decoded video frames having the same resolution. For example, the reconstructed video frames are processed into decoded video frames having a resolution the same as an original resolution of the input video frame.

Figure 29:
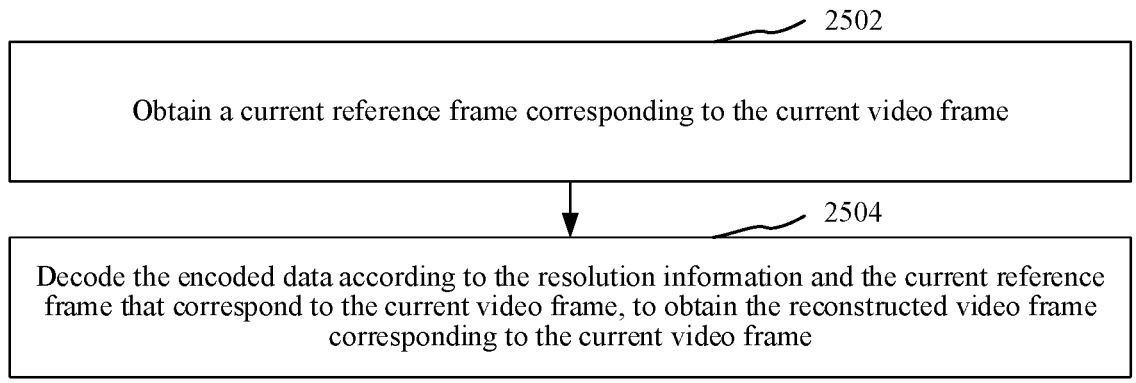
FIG. 29 is a flowchart of decoding encoded data according to resolution information corresponding to a current video frame to obtain a reconstructed video frame corresponding to the current video frame according to an embodiment of this application.

In an embodiment, as shown in FIG. 29, the decoding the encoded data according to the resolution information corresponding to the current video frame, to obtain a reconstructed video frame corresponding to the current video frame includes the following steps:

Step 2502. Obtain a reference frame corresponding to the current video frame.

For example, there may be one or more reference frames corresponding to the current video frame. For example, when the current video frame is a P-frame, there may be one corresponding reference frame. When the current video frame is a B-frame, there may be two corresponding reference frames. The reference frame corresponding to the current video frame may be obtained according to a reference relationship, and the reference relationship may vary with different video codec standards. For example, when the second video frame in a GOP is a B-frame, a corresponding video frame may be an I-frame of the GOP and the fourth frame of the GOP. Alternatively, the reference frame corresponding to the current video frame may be first one or two frames in forward encoded frames of the current video frame. It may be understood that, the reference frame is consistent with the reference frame in the encoding process.

In an embodiment, the obtaining a reference frame corresponding to the current video frame includes: obtaining a second reference rule, the second reference rule including a resolution magnitude relationship between the current video frame and the reference frame; and obtaining the reference frame corresponding to the current video frame according to the second reference rule.

For example, the second reference rule determines a resolution magnitude limitation relationship between the current video frame and the reference frame. It may be understood that, to ensure that the reference frame obtained in the encoding process is consistent with the reference frame obtained in the decoding process, the first reference rule is consistent with the second reference rule. The first reference rule and the second reference rule may be preset in a codec standard. Alternatively, during encoding, the first reference rule may be selected according to an encoding application scenario, a real-time requirement, and the like, and reference rule information is added to the encoded data, so that a decoder obtains the second reference rule according to the reference rule information in the encoded data. The resolution magnitude relationship includes at least one of the following: resolutions of the current video frame and the reference frame are the same or different. When the second reference rule includes that the current video frame and the reference frame have a same resolution, the second reference rule may further include a processing manner reference rule for the resolutions of the current video frame and the reference frame. For example, the processing manner reference rule may include one or both of the following: for a current video frame with a full resolution processing manner, reference may be made to a reference frame with a full resolution processing manner, and for a current video frame with a downsampling processing manner, reference may be made to a reference frame with a downsampling processing manner. When the second reference rule includes that the current video frame and the reference frame have different resolutions, the second reference rule may further include one or both of the following: the resolution of the current video frame is greater than the resolution of the reference frame, and the resolution of the current video frame is less than the resolution of the reference frame. Therefore, the second reference rule may include one or more of the following: for a current video frame of an original resolution, reference may be made to a reference frame of a downsampling resolution, for a current video frame of a downsampling resolution, reference may be made to a reference frame of an original resolution, for a current video frame of an original resolution, reference may be made to a reference frame of an original resolution, and for a current video frame of a downsampling resolution, reference may be made to a reference frame of a downsampling resolution. The video frame of an original resolution means that a resolution of the current video frame is the same as that of a corresponding input video frame, and the reference frame of an original resolution means that a resolution of the reference frame is the same as that of an input video frame corresponding to the reference frame. The video frame of a downsampling resolution means that the resolution information corresponding to the current video frame is downsampling. The reference frame of a downsampling resolution means that resolution information corresponding to the reference frame is downsampling. After the second reference rule is obtained, the reference frame corresponding to the current video frame is obtained according to the second reference rule, so that the obtained reference frame meets the second reference rule.

Step 2504. Decode the encoded data according to the resolution information and the reference frame that correspond to the current video frame, to obtain the reconstructed video frame corresponding to the current video frame.

For example, a reference block corresponding to a current block of the current video frame may be obtained from the reference frame, and the current block is decoded according to the reference block. Alternatively, the reference frame may be processed according to the resolution information of the current video frame, to obtain a corresponding target reference frame, a target reference block corresponding to the current block of the current video frame is obtained from the target reference frame, and the encoded block is decoded according to the target reference block, to obtain the reconstructed video frame corresponding to the current video frame.

In an embodiment, the decoding the encoded data according to the resolution information corresponding to the current video frame and the reference frame, to obtain a reconstructed video frame corresponding to the current video frame includes: performing sampling processing on the reference frame according to the resolution information corresponding to the current video frame, to obtain the corresponding target reference frame; and decoding the current video frame according to the target reference frame, to obtain the reconstructed video frame corresponding to the current video frame.

For example, the target reference block is obtained from the target reference frame according to carried motion vector information, a prediction value corresponding to the current block is obtained according to the target reference block, and the reconstructed video frame is obtained according to a prediction residual in the encoded data and the prediction value.

In an embodiment, the performing sampling processing on the reference frame according to the resolution information corresponding to the current video frame, to obtain the corresponding target reference frame includes: performing sampling processing on the reference frame according to the resolution information and motion estimation pixel precision of the current video frame, to obtain the corresponding target reference frame.

In an embodiment, the performing sampling processing on the reference frame according to the resolution information and motion estimation pixel precision of the current video frame, to obtain the corresponding target reference frame includes: calculating pixel interpolation precision according to the resolution information and the motion estimation pixel precision of the current video frame; and directly performing sub-pixel interpolation processing on the reference frame according to the pixel interpolation precision, to obtain the corresponding target reference frame.

In an embodiment, the performing sampling processing on the reference frame according to the resolution information and motion estimation pixel precision of the current video frame, to obtain the corresponding target reference frame includes: performing sampling processing on the reference frame according to the resolution information of the current video frame, to obtain an intermediate reference frame; and performing sub-pixel interpolation processing on the intermediate reference frame according to the motion estimation pixel precision, to obtain the target reference frame.

For example, the resolution of the current video frame is the same as the resolution of the current video frame, and the obtained target reference frames are also the same. Therefore, the method in which sampling processing is performed on the reference frame according to the resolution information corresponding to the current video frame, to obtain the corresponding target reference frame is the same as the method on the encoder side and in which sampling processing is performed on the reference frame according to the resolution information of the current frame, to obtain the corresponding target reference frame. Details are not described herein again in this embodiment of this application.

In an embodiment, the decoder side may further obtain sampling manner information corresponding to the current video frame from the header information of the encoded data. The decoder side may obtain, from any one of sequence-level header information, group-level header information, and frame-level header information, sub-pixel interpolation manner information corresponding to the current video frame. For example, when a flag Pixel_Sourse_Interpolation used for determining a sampling manner in the frame-level header information of the encoded data is 0, it indicates that the direct sub-pixel interpolation processing is performed on the reference frame corresponding to the input video frame. When Pixel_Sourse_Interpolation is 1, it indicates that the sub-pixel interpolation processing is performed after sampling processing is performed on the reference frame corresponding to the input video frame. In this way, the sub-pixel interpolation processing may be performed on the reference frame according to a manner same as the sub-pixel interpolation manner indicated by the flag in the encoded data to obtain the target reference frame on the decoder side, so that the encoded data can be decoded according to the target reference frame to obtain the reconstructed video frame.

Figure 30:
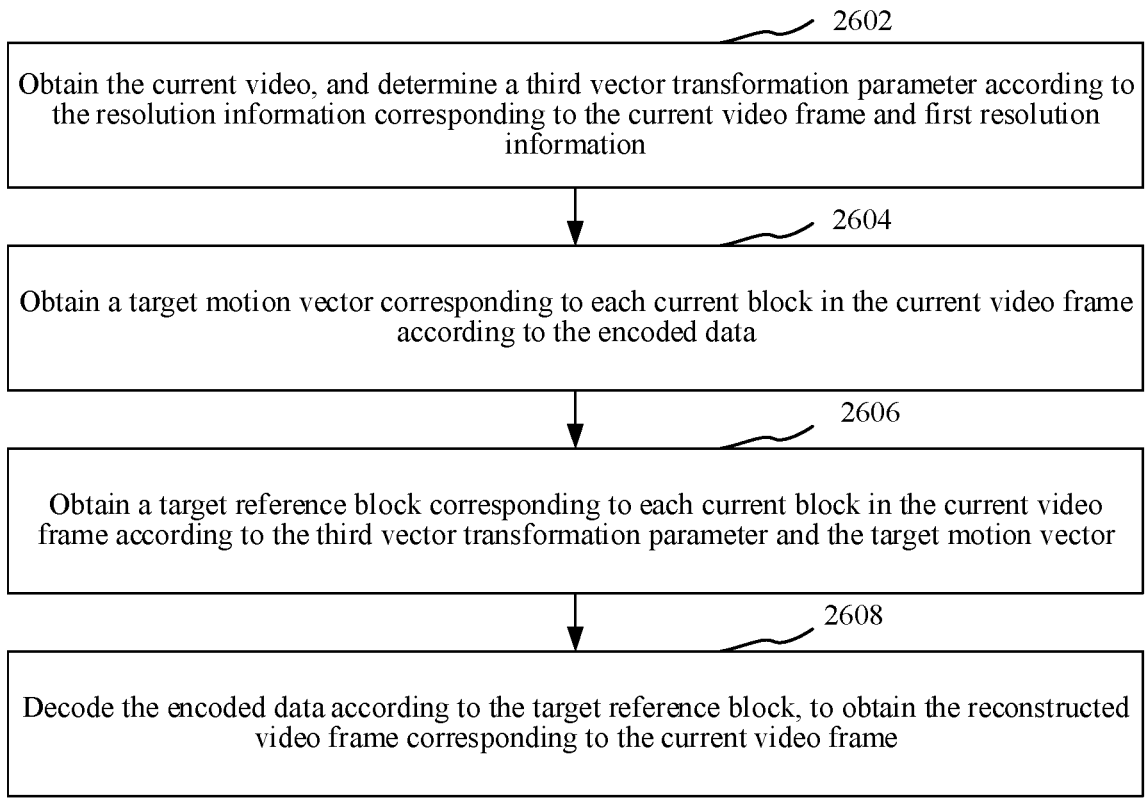
FIG. 30 is a flowchart of decoding encoded data according to resolution information corresponding to a current video frame and a reference frame to obtain a reconstructed video frame corresponding to the current video frame according to an embodiment of this application.

In an embodiment, as shown in FIG. 30, the decoding the encoded data according to the resolution information and the reference frame that correspond to the current video frame, to obtain the reconstructed video frame corresponding to the current video frame includes the following steps:

Step 2602. Determine a third vector transformation parameter according to the resolution information corresponding to the current video frame and first resolution information, the first resolution information including target motion vector unit resolution information or resolution information of the reference frame.

For example, the third vector transformation parameter is used for transforming location information of an obtained motion vector or the motion vector. The third vector transformation parameter may be a ratio of the first resolution information to the resolution information of the current video frame, and corresponds to the first vector transformation parameter. When the target motion vector is transformed by using the third vector transformation parameter, the target motion vector may be transformed to a motion vector corresponding to a resolution corresponding to the current video frame, and the third vector transformation parameter may be a reciprocal of the first vector transformation parameter. When location information corresponding to the motion vector is transformed by using the third vector transformation parameter, if the first vector transformation parameter in the encoder side is used for transforming the first location information, because the location information of the current block is the same as that of the encoded block, the third vector transformation parameter is the same as the first vector transformation parameter. If the first vector transformation parameter in the encoder side is used for transforming the second location information, because a location value calculated according to the target motion vector and the first location information is a location value obtained after transforming the second location information according to the first vector transformation parameter in the encoder side, the third vector transformation parameter is a reciprocal of the first vector transformation parameter.

Step 2604. Obtain a target motion vector corresponding to each current block in the current video frame according to the encoded data.

For example, when the encoded data carries the target motion vector, the target motion vector is read from the encoded data. When the encoded data carries a motion vector difference, a target prediction motion vector may be calculated, and the target motion vector is obtained according to the motion vector difference and the target prediction motion vector.

Step 2606. Obtain a target reference block corresponding to each current block in the current video frame according to the third vector transformation parameter and the target motion vector.

For example, after the third vector transformation parameter is obtained, the obtained motion vector or the location information corresponding to the motion vector is transformed according to the third vector transformation parameter, to obtain the location information corresponding to the target reference block, thereby obtaining the target reference block.

Step 2608. Decode the encoded data according to the target reference block, to obtain the reconstructed video frame corresponding to the current video frame.

For example, after the target reference block is obtained, a pixel value of each image block of the reconstructed video frame is obtained according to a pixel value of the target reference block and the prediction residual of the current block that is carried in the encoded data, to obtain the reconstructed video frame.

In an embodiment, the determining a third vector transformation parameter according to the resolution information corresponding to the current video frame and first resolution information includes: determining the third vector transformation parameter according to the resolution information corresponding to the current video frame and the resolution information of the reference frame. The obtaining a target reference block corresponding to each current block in the current video frame according to the third vector transformation parameter and the target motion vector includes: obtaining first location information corresponding to the current block; and obtaining the target reference block corresponding to the current block according to the first location information, the third vector transformation parameter, and the target motion vector.

For example, second location information corresponding to the target reference block may be obtained according to the first location information, the third vector transformation parameter, and the target motion vector, and the target reference block is obtained according to the second location information. Due to the correspondence between encoding and decoding, if the first vector transformation parameter in the encoder side is used for transforming the first location information, because the location information of the current block is the same as that of the encoded block, the third vector transformation parameter is the same as the first vector transformation parameter. If the first vector transformation parameter in the encoder side is used for transforming the second location information, because a location value calculated according to the target motion vector and the first location information is a location value obtained after transforming the second location information according to the first vector transformation parameter in the encoder side, the third vector transformation parameter is a reciprocal of the first vector transformation parameter.

For example, the resolution of the current video frame is 1200*1200 pixels, and the resolution of the reference frame is 600*600 pixels. The first vector transformation parameter is used for transforming the second location information, the first vector transformation parameter is 2, and the third vector transformation parameter is 1/2. Assuming that the first location information is (6, 8), and the target motion vector is (0, 2), the intermediate location information is (6, 8)−(0, 2)=(6, 6), and the second location information corresponding to the target reference block is (6*1/2, 6*1/2)= (3, 3).

For example, the resolution of the current video frame is 1200*1200 pixels, and the resolution of the reference frame is 600*600 pixels. If the first vector transformation parameter is used for transforming the second location information, and the first vector transformation parameter is 2, the third vector transformation parameter is 1/2. Assuming that the first location information is (6, 8), and the target motion vector is (0, 2), the intermediate location information is (6, 8)−(0, 2)=(6, 6), and the second location information corresponding to the target reference block is (6*1/2, 6*1/2)= (3, 3).

For example, if the resolution of the current video frame is 1200*1200 pixels, the resolution of the reference frame is 600*600 pixels, the first vector transformation parameter is used for transforming the first location information, and the first vector transformation parameter is 1/2, the third vector transformation parameter is 1/2. Assuming that the first location information is (6, 8), the target motion vector is (0, 1). In this case, the second location information is (6*1/2, 8*1/2)−(0, 1)=(3, 3).

In an embodiment, the determining a third vector transformation parameter according to the resolution information corresponding to the current video frame and first resolution information includes: determining the third vector transformation parameter according to the resolution information corresponding to the current video frame and the target motion vector unit resolution information; and the obtaining a target reference block corresponding to each current block in the current video frame according to the third vector transformation parameter and the target motion vector includes: obtaining a first motion vector according to the target motion vector and the third vector transformation parameter; and obtaining a target reference block corresponding to a current block according to the first motion vector.

For example, the third vector transformation parameter is determined according to the resolution information corresponding to the current video frame and the target motion vector unit resolution information, and is used for transforming the target motion vector into the corresponding first motion vector at the resolution corresponding to the current video frame. After the third vector transformation parameter is obtained, the third vector transformation parameter may be multiplied by the target motion vector, and an obtained product is used as the first motion vector. It may be understood that the process of obtaining a first motion vector according to the third vector transformation parameter and the target motion vector is an inverse process of obtaining a target motion vector corresponding to the current encoded block according to the first vector transformation parameter and the first motion vector. For example, in the encoder side, the first vector transformation parameter of the encoded block corresponding to the current block is equal to 2. The obtained first motion vector is (2, 2), and the target motion vector obtained according to a product of the first vector transformation parameter and the first motion vector (2, 2) is (4, 4). Then, in the decoding process, the third vector transformation parameter is 1/2, the obtained target motion vector is (4, 4), and the first motion vector obtained according to a product of the third vector transformation parameter 1/2 and the target motion vector (4, 4) is (2, 2).

In an embodiment, in a case that the encoded data carries the motion vector difference, the obtaining a target motion vector corresponding to each current block in the current video frame according to the encoded data includes: obtaining a motion vector difference corresponding to a current video block in the current video frame according to the encoded data; and obtaining an initial prediction motion vector corresponding to the current block; obtaining the second vector transformation parameter according to current motion vector unit resolution information corresponding to the initial prediction motion vector and the target motion vector unit resolution information; obtaining a target prediction motion vector corresponding to the current block according to the initial prediction motion vector and the second vector transformation parameter; and obtaining the target motion vector according to the target prediction motion vector and the motion vector difference.

For example, because the current block in the decoding process corresponds to the current block in the encoding process, and rules for obtaining the initial prediction motion vectors are the same, the initial prediction motion vector corresponding to the current block is consistent with the initial prediction motion vector corresponding to the current block. For the method for obtaining the target prediction motion vector, reference may be made to the corresponding method in the encoding process. Details are not described herein again. The target motion vector is a sum of the target prediction motion vector and the motion vector difference.

In an embodiment, before the obtaining encoded data corresponding to a current video frame, the video decoding method further includes: obtaining a video sequence corresponding to the current video frame, and obtaining a video sequence decoding mode corresponding to the video sequence, where the video sequence decoding mode includes a constant resolution decoding mode or a mixed resolution decoding mode; when the video sequence decoding mode is the mixed-resolution decoding mode, performing a mixed resolution decoding method on each video frame of the video sequence; and when the video sequence decoding mode is the constant resolution decoding mode, performing constant resolution decoding on the video sequence.

For example, video frame sequence encoding mode information may be obtained from the encoded data, and the video frame sequence decoding mode is obtained according to the video frame sequence encoding mode information. For example, when the video sequence encoding mode corresponding to the video sequence encoding mode information is the constant resolution encoding mode, the corresponding video sequence decoding mode is the constant resolution decoding mode. In the constant resolution decoding mode, each video frame in the video sequence has the same resolution. When the video sequence encoding mode corresponding to the video sequence encoding mode information is the mixed-resolution encoding mode, the corresponding video sequence decoding mode is the mixed resolution decoding mode.

In an embodiment, a decoding framework corresponding to the current video frame may be determined from the header information of the encoded data. For example, the decoder side may obtain, from sequence-level header information corresponding to the encoded data, an encoding framework used for encoding each input video frame in an input video frame sequence corresponding to the current encoded data, so as to determine a decoding framework of the current video frame that matches the encoding framework. For example, when a flag Sequence_Mix_Flag that is in the sequence-level header information of the encoded data and used for determining the used encoding framework is 0, it represents that an encoding framework of a constant resolution is used when each input video frame in the input video frame sequence is encoded, and the decoder side may use a decoding framework of a constant resolution to decode the encoded data to obtain a reconstructed video frame corresponding to the current video frame; and when Sequence_Mix_Flag is 1, it represents that an encoding framework of a mixed resolution is used when each input video frame in the input video frame sequence is encoded, and the decoder side may use a decoding framework of a mixed resolution to decode the encoded data to obtain a reconstructed video frame sequence.

In an embodiment, the obtaining the video sequence decoding mode corresponding to the video sequence may include: obtaining current environment information, the current environment information including at least one piece of the following information: current encoding environment information and current decoding environment information; and determining a target video sequence decoding mode corresponding to the video sequence according to the current environment information.

For example, the decoder side may alternatively obtain a corresponding target video sequence decoding mode according to a method for calculating a video sequence encoding mode at the encoder side. Therefore, in this embodiment of this application, determining a target video sequence decoding mode according to current environment information is consistent with determining a target video sequence encoding mode according to current environment information. Details are not described herein again.

In an embodiment, the current environmental information includes an application scenario corresponding to the video sequence, and the video sequence decoding mode corresponding to the video sequence may be obtained according to the application scenario.

The video decoding method is described below by using an example of decoding the encoded data corresponding to a video frame sequence A. It is assumed that the input video frames a, b, and c respectively correspond to video frames e, f, and g on a decoder side.

1. A receiving terminal obtains the encoded data corresponding to the video sequence A, and obtains, from sequence header information corresponding to the encoded data, that a target video sequence encoding mode is a mixed resolution encoding mode. Therefore, the encoded data is decoded by using a mixed resolution decoding framework.

2. A resolution information obtaining unit of the mixed resolution decoding framework obtains resolution information corresponding to the first video frame e. It may be understood that, encoded data corresponding to e is data obtained by encoding a1. Intra-frame decoding is performed on e, to obtain a reconstructed video frame e1. Because resolution information corresponding to e is 1/2, the reconstructed video frame e1 may be upsampled by using a sampling ratio of 2, to obtain a decoded video frame e2.

3. The resolution information obtaining unit of the mixed resolution decoding framework obtains resolution information corresponding to the second video frame f. It may be understood that, encoded data corresponding to f is data obtained by encoding b1. Inter-frame decoding is performed on f, to obtain a reconstructed video frame f1. Because resolution information corresponding to f is a downsampling ratio of 1/4, the reconstructed video frame f1 may be upsampled by using a sampling ratio of 4, to obtain a decoded video frame f2.

The decoding process is as follows: because f is an inter prediction frame, the reconstructed video frame e1 needs to be used as a reference frame. It may be understood that e1 and a2 are the same, and the same sampling processing is performed on e1 and a2, to obtain e3. Herein, e3 and a3 are the same, and are target reference frames. It is obtained from the encoded data that a motion vector difference corresponding to a current block is MVD1. MVD1 is at a target resolution, that is, an original resolution, so that MVD1 needs to be transformed to be at a resolution corresponding to f. Therefore, MVD3 being MVD1/4 may be obtained. It is obtained that an initial prediction vector is MV2, and the initial prediction vector is calculated at a resolution corresponding to a downsampling ratio of 1/4, and this resolution is the same as the resolution corresponding to f. Therefore, a first motion vector MV1 being equal to MVD1/4+MV2 may be obtained. A target reference block is obtained according to MV1. A prediction value corresponding to the current block is obtained according to the target reference block, and a prediction residual p1 is added to the prediction value, to reconstruct and obtain a reconstructed block corresponding to the reconstructed video frame f1.

4. The resolution information obtaining unit of the mixed resolution decoding framework obtains resolution information corresponding to the third video frame g. It may be understood that encoded data corresponding to g is data obtained by encoding c1. Inter-frame decoding is performed on g, to obtain a reconstructed video frame g1. Because the resolution information corresponding to g is 1/8, the reconstructed video frame g1 may be upsampled by using a sampling ratio of 8, to obtain a decoded video frame g2.

The decoding process is as follows: because g is an inter prediction frame, the reconstructed video frame f1 needs to be used as a reference frame. It may be understood that f1 and b2 are the same, and the same sampling processing is performed on f1 and b2, to obtain f3. Herein, f3 and b3 are the same, and are target reference frames. t is obtained from the encoded data that a motion vector difference corresponding to a current block is MVD2. MVD2 is at a target resolution, that is, an original resolution, so that MVD2 needs to be transformed to be at a resolution corresponding to g. Therefore, MVD2 being MVD1/8 may be obtained. It is obtained that an initial prediction vector is MV4. Because the initial prediction vector is calculated at a resolution corresponding to a downsampling ratio of 1/4, the initial prediction vector needs to be transformed to be at a resolution corresponding to f A downsampling ratio corresponding to f is 1/8, and therefore, a first motion vector MV3 being equal to MVD2/8+MV4/2 may be obtained. A target reference block is obtained according to MV3. A prediction value corresponding to the current block is obtained according to the target reference block, and a prediction residual p2 is added to the prediction value, to reconstruct and obtain a reconstructed block corresponding to the reconstructed video frame g1.

5. The receiving terminal plays e2, f2, and g2.

In an embodiment, the obtaining a processing parameter corresponding to the current video frame includes: determining the processing parameter is a parameter reproduced in the decoding process when the processing parameter is encoded data received at the decoder side and/or processing data obtained according to the encoded data received at the decoder side.

The processing parameter corresponding to the current video frame may be, but is not limited to, first encoded data corresponding to the current video frame, and/or second encoded data corresponding to a forward video frame before the current video frame, and/or processing data obtained according to the first encoded data and/or the second encoded data, and/or an image feature corresponding to a reconstructed video frame before the current video frame. The image feature refers to information related to content of an image, and includes one or more of image motion information and image texture information, such as edges. For example, when the processing parameter corresponding to the current video frame is the first encoded data corresponding to the current video frame, it is determined that the processing parameter corresponding to the current video frame is a parameter reproduced in the decoding process; and/or when the processing parameter corresponding to the current video frame is the second encoded data corresponding to the forward decoded video frame before the current video frame, it is determined that the processing parameter corresponding to the current video frame is a parameter reproduced in the decoding process; and/or when the processing parameter corresponding to the current video frame is the processing data obtained according to the first encoded data and/or the second encoded data, it is determined that the processing parameter corresponding to the current video frame is a parameter reproduced in the decoding process; and/or when the processing parameter corresponding to the current video frame is the image feature corresponding to the reconstructed video frame before the current video frame, it is determined that the processing parameter corresponding to the current video frame is a parameter reproduced in the decoding process.

In an embodiment, the determining a target processing manner corresponding to the current video frame according to the processing parameter includes: obtaining a forward decoded block in a forward decoded video frame corresponding to the current video frame; calculating a module gradient value corresponding to the forward decoded block; classifying the forward decoded block into a target module class in a module class set according to the module gradient value, candidate module classes in the module class set respectively corresponding to different module gradient value ranges; obtaining a correspondence between the candidate module classes and the candidate processing manners; and determining the target processing manner corresponding to the current video frame according to the target module class and the correspondence between the candidate module classes and the candidate processing manners.

The module gradient value is an average gradient value corresponding to the forward decoded block. The forward decoded blocks may have different sizes, so that use of the average gradient value can better reflect a content complexity of the forward decoded block. The module gradient value of the forward decoded block is equal to an average value of a sum of pixel gradient values of all pixels in the forward decoded block. The module gradient value reflects a complexity of an image corresponding to the forward decoded block. A larger module gradient value indicates more details included in the forward decoded block. For example, a gradient value corresponding to an edge of an image is usually relatively large. In an embodiment, a pixel gradient value corresponding to each pixel may be calculated by using a Laplace filter, and then a module gradient value is calculated according to pixels included in the forward decoded block.

A plurality of module classes are obtained through division according to module gradient values in advance, to form a module class set. The module class set includes a plurality of module classes, and each module class corresponds to a corresponding module gradient value range. Different module classes correspond to different module gradient value ranges, and module gradient value ranges respectively corresponding to the module classes do not overlap. That is, one module gradient value can only match one module class. Therefore, after the module gradient value is obtained, a target module class corresponding to the forward decoded block may be determined according to the module gradient value.

Different module classes correspond to different processing manners, and the processing manners are used for processing forward decoded blocks. A larger module gradient value included in a module gradient value range corresponding to a module class indicates higher definition obtained in the target processing manner. A processing manner with a better processing effect indicates a higher calculation complexity, and a lower corresponding processing speed. To ensure that both user's requirements for the definition and for the processing speed can be satisfied, a plurality of processing manners are combined for use. A forward decoded block with a larger module gradient value contains more details, so that a processing manner having a higher complexity and a better effect is adopted. A forward decoded block with a smaller module gradient value contains fewer details, so that a processing manner having a lower complexity is adopted. Because people are more sensitive to definition of content with more details, a processing manner having a good effect is preferentially adopted.

Corresponding processing manners are set for the candidate module classes according to the module gradient value ranges corresponding to the candidate module classes. A larger module gradient value indicates a corresponding processing manner having a better processing effect.

After the target module class is obtained, the target processing manner corresponding to the forward decoded block may be determined according to the correspondence between the candidate module classes and the candidate processing manners. For different forward decoded blocks, different processing manners are adopted. That is, the forward decoded blocks are processed by combining a plurality of processing manners, so that both video decoding quality and a video decoding speed can be improved.

In an embodiment, the determining a target processing manner corresponding to the current video frame according to the processing parameter includes: calculating a target image content complexity corresponding to a forward reconstructed frame corresponding to the current video frame; obtaining a correspondence between candidate image content complexities and candidate processing manners; and determining the target processing manner corresponding to the target image content complexity according to the correspondence.

The image content complexity is a content complexity of an image of the current video frame. The image content complexity is related to at least one of a motion range, a texture complexity, richness of details, and a spatial correlation. In an embodiment, an image content complexity may be represented by using an image gradient value. The image gradient value is obtained according to a sum of pixel gradient values corresponding to pixels. A larger image gradient value obtained through calculation indicates a higher image content complexity.

The correspondence between the candidate image content complexities and the candidate processing manners is preset. For a higher image content complexity, when the calculation complexity allows, a more complex processing manner with higher quality is preferentially adopted. Different processing manners have different calculation complexities, and a processing manner having a higher calculation complexity indicates a better processing effect is to be obtained.

The target processing manner corresponding to the image content complexity is obtained according to the preset correspondence between the candidate image content complexities and the candidate processing manners.

In an embodiment, a video decoding method is provided. The method includes the following steps:

Step 2. Obtain encoded data corresponding to a current video frame.

Step 4. Obtain a processing parameter corresponding to the current video frame, and determine a target processing manner corresponding to the current video frame according to the processing parameter, the target processing manner being one of candidate processing manners, the candidate processing manners including at least one of a full resolution processing manner and a downsampling processing manner, and the processing parameter being consistent with a corresponding processing parameter in a encoding process.

For example, step 4 includes the following two steps:

(1) obtaining a frame type corresponding to the current video frame, and obtaining the processing parameter corresponding to the current video frame according to the frame type; and (2) obtaining bit rate information corresponding to the current video frame, obtaining original resolution information and a first threshold corresponding to the current video frame, calculating a first ratio according to the bit rate information and the original resolution information, and determining the target processing manner corresponding to the current video frame according to the first ratio and the first threshold.

For example, step 4 includes the following two steps:

(1) calculating a second ratio of encoded blocks of a target prediction type in a forward decoded video frame corresponding to the current video frame, and determining the target processing manner corresponding to the current video frame according to the second ratio; and (2) calculating a second ratio of intra-coded blocks in the forward decoded video frame in the forward decoded video frame, and when the ratio is greater than a second threshold, determining that the processing manner is the downsampling processing manner.

For example, step 4 includes the following two steps:

(1) obtaining resolution information corresponding to a reference frame corresponding to the current video frame; and determining a second threshold according to the resolution information; and (2) obtaining a current quantization parameter corresponding to the current video frame, obtaining a quantization parameter threshold corresponding to the current video frame, and determining the processing manner corresponding to the current video frame according to a magnitude relationship between the current quantization parameter and the quantization parameter threshold.

Step 3. Decode the encoded data corresponding to video frame according to the target processing manner, to obtain a corresponding decoded video frame.

Optionally, the resolution information corresponding to the current video frame is determined according to the target processing manner, and the encoded data is decoded according to the resolution information corresponding to the current video frame, to obtain a reconstructed video frame corresponding to the current video frame. The reconstructed video frame is processed according to the resolution information corresponding to the current video frame, to obtain a corresponding decoded video frame.

It is to be understood that although the steps in the flowchart are sequentially shown according to indication of an arrow, the steps are not necessarily sequentially performed according to a sequence indicated by the arrow. Unless clearly described in this specification, a sequence of performing the steps is not strictly limited, and the steps may be performed in another sequence. In addition, at least some steps in the foregoing flowchart may include a plurality of sub-steps or stages. These sub-steps or stages are not necessarily performed at the same moment but may be performed at different moments. These sub-steps or stages are not necessarily performed sequentially, but may be performed in turn or alternately with another step or at least some sub-steps or stages of the another step.

Figure 31:
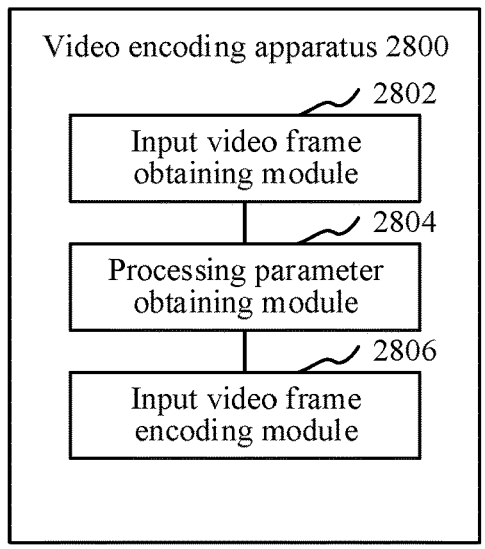
FIG. 31 is a structural block diagram of a video encoding apparatus according to an embodiment of this application.

In an embodiment, as shown in FIG. 31, a video encoding apparatus 2800 is provided. The video encoding apparatus may be integrated into the server 120 or the terminal 110, and includes:

an input video frame obtaining module 2802, configured to obtain an input video frame;

a processing parameter obtaining module 2804, configured to: obtain a processing parameter corresponding to the input video frame, and determine a target processing manner corresponding to the input video frame from candidate processing manners according to the processing parameter, the processing parameter being a parameter reproduced in a decoding process, and the candidate processing manners including at least one of a full resolution processing manner and a downsampling processing manner; and an input video frame encoding module 2806, configured to encode the input video frame according to the target processing manner to obtain encoded data corresponding to the input video frame.

Figure 32:
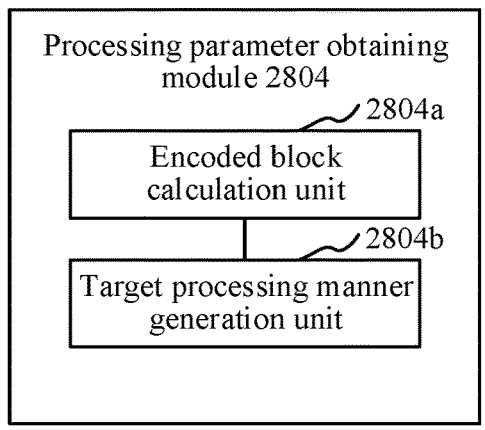
FIG. 32 is a structural block diagram of a processing parameter obtaining module according to an embodiment of this application.

In an embodiment, as shown in FIG. 32, the processing parameter obtaining module 2804 includes:

an encoded block calculation unit 2804a, configured to calculate a second ratio of encoded blocks of a target prediction type in a forward encoded video frame corresponding to the input video frame; and a target processing manner generation unit 2804b, configured to determine the target processing manner corresponding to the input video frame according to the second ratio.

In an embodiment, the encoded block calculation unit 2804a is further configured to calculate a second ratio of intra-coded blocks in the forward encoded video frame in the forward encoded video frame; and the target processing manner generation unit 2804b is configured to determine, in a case that the second ratio is greater than a second threshold, that the target processing manner is a downsampling processing manner.

Figure 33:
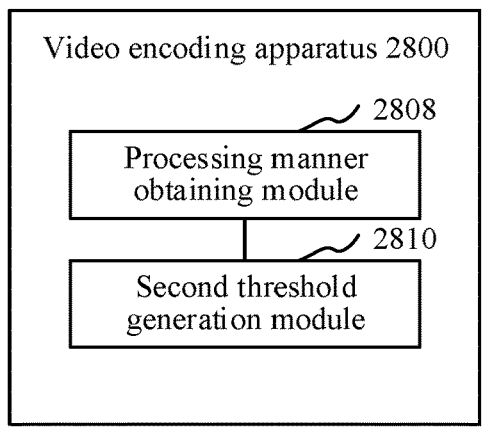
FIG. 33 is a structural block diagram of a video encoding apparatus according to another embodiment of this application.

In an embodiment, as shown in FIG. 33, the video encoding apparatus 2800 further includes:

a processing manner obtaining module 2808, configured to obtain a processing manner corresponding to a reference frame corresponding to the input video frame; and a second threshold generation module 2810, configured to determine the second threshold according to the processing manner.

In an embodiment, the processing parameter obtaining module 2804 is further configured to: obtain a frame type corresponding to the input video frame, and obtain the processing parameter corresponding to the input video frame according to the frame type.

Figure 34:
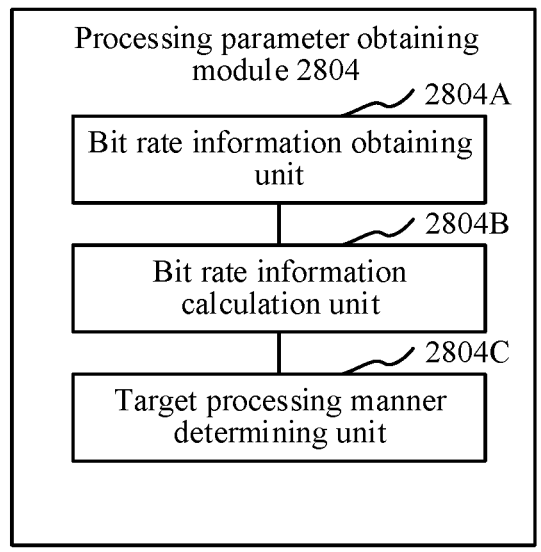
FIG. 34 is a structural block diagram of a processing parameter obtaining module according to another embodiment of this application.

In an embodiment, as shown in FIG. 34, the processing parameter obtaining module 2804 includes:

a bit rate information obtaining unit 2804A, configured to: obtain bit rate information corresponding to the input video frame, and obtain original resolution information and a first threshold that correspond to the input video frame;

a bit rate information calculation unit 2804B, configured to calculate a first ratio according to the bit rate information and the original resolution information; and a target processing manner determining unit 2804C, configured to determine the target processing manner corresponding to the input video frame according to the first ratio and the first threshold.

In an embodiment, the processing parameter obtaining module 2804 is further configured to: obtain a current quantization parameter corresponding to the input video frame; obtain a quantization parameter threshold corresponding to the input video frame; and determine a processing manner corresponding to the input video frame according to a magnitude relationship between the current quantization parameter and the quantization parameter threshold.

Figure 35:
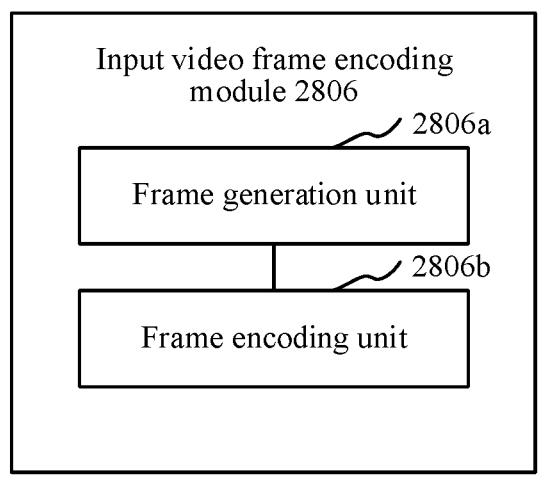
FIG. 35 is a structural block diagram of an input video frame encoding module according to an embodiment of this application.

In an embodiment, as shown in FIG. 35, the input video frame encoding module 2806 includes:

a frame generation unit 2806a, configured to process the input video frame according to the target processing manner, to obtain a current frame; and a frame encoding unit 2806b, configured to encode the current frame at a resolution of the current frame, to obtain the encoded data corresponding to the input video frame.

In an embodiment, the current frame encoding unit 2806b is further configured to add processing manner information corresponding to the processing manner to the encoded data corresponding to the input video frame.

In an embodiment, the processing parameter obtaining module 2804 is configured to: obtain the processing parameter corresponding to the input video frame; and determine the processing manner corresponding to the input video frame according to the processing parameter. The adding processing manner information corresponding to the processing manner to the encoded data corresponding to the input video frame includes: adding the processing manner information corresponding to the processing manner to the encoded data corresponding to the input video frame when the processing parameter cannot be reproduced in a decoding process.

In an embodiment, the current frame encoding unit 2806b includes:

a reference frame obtaining unit, configured to obtain a reference frame corresponding to the current frame; and an encoding unit, configured to encode the current frame at a resolution of the current frame according to the reference frame, to obtain the encoded data corresponding to the input video frame.

In an embodiment, the encoding unit is configured to: determine a first vector transformation parameter according to resolution information of the current frame and first resolution information, the first resolution information including resolution information of the reference frame or target motion vector unit resolution information corresponding to the input video frame; and obtain a target motion vector corresponding to each encoded block in the current frame according to the first vector transformation parameter.

In an embodiment, the current frame encoding unit 2806b is configured to: perform sampling processing on the reference frame according to the resolution information of the current frame, to obtain a corresponding target reference frame; and encode the current frame according to the target reference frame, to obtain the encoded data corresponding to the input video frame.

Figure 36:
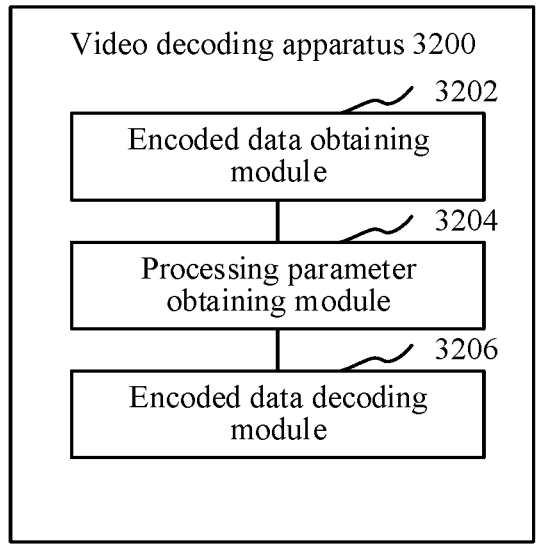
FIG. 36 is a structural block diagram of a video decoding apparatus according to an embodiment of this application.

In an embodiment, as shown in FIG. 36, a video decoding apparatus 3200 is provided. The video decoding apparatus may be integrated into the server 120 or the terminal 110, and includes:

an encoded data obtaining module 3202, configured to obtain encoded data corresponding to a current video frame;

a processing parameter obtaining module 3204, configured to: obtain a processing parameter corresponding to the current video frame, and determine a target processing manner corresponding to the current video frame according to the processing parameter, the target processing manner being one of candidate processing manners, the candidate processing manners including at least one of a full resolution processing manner and a downsampling processing manner, and the processing parameter being consistent with a corresponding processing parameter in an encoding process;

and an encoded data decoding module 3206, configured to decode the encoded data corresponding to the current video frame according to the target processing manner, to obtain a corresponding decoded video frame.

Figure 37:
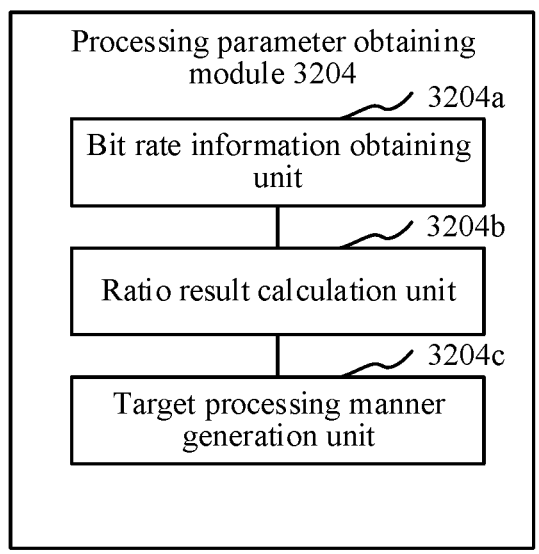
FIG. 37 is a structural block diagram of a processing parameter obtaining module according to an embodiment of this application.

In an embodiment, as shown in FIG. 37, the processing parameter obtaining module 3204 includes:

a bit rate information obtaining unit 3204a, configured to: obtain bit rate information corresponding to the current video frame, and obtain original resolution information and a first threshold that correspond to the current video frame;

a first ratio calculation unit 3204b, configured to calculate a first ratio according to the bit rate information and the original resolution information; and a target processing manner generation unit 3204c, configured to determine the target processing manner corresponding to the current video frame according to the first ratio and the first threshold.

Figure 38:
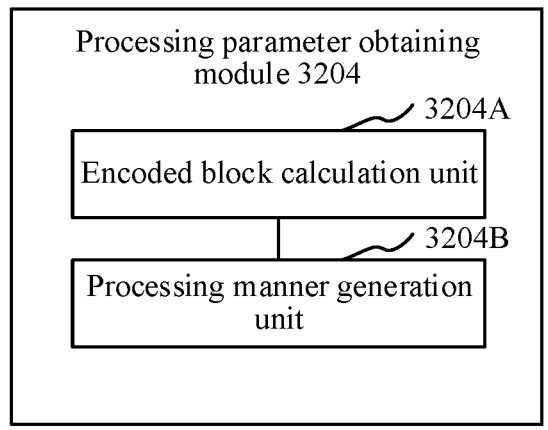
FIG. 38 is a structural block diagram of a processing parameter obtaining module according to another embodiment of this application.

In an embodiment, as shown in FIG. 38, the processing parameter obtaining module 3204 includes:

an encoded block calculation unit 3204A, configured to calculate a second ratio of encoded blocks of a target prediction type in a forward decoded video frame corresponding to the current video frame; and a processing manner generation unit 3204B, configured to determine the target processing manner corresponding to the current video frame according to the second ratio.

In an embodiment, the encoded block calculation unit 3204A is configured to calculate a second ratio of the intra-coded blocks in the forward decoded video frame in the forward decoded video frame; and the processing manner generation unit 3204B is configured to determine, in a case that the second ratio is greater than a second threshold, that the target processing manner is a downsampling processing manner.

In an embodiment, the video decoding apparatus 3200 is further configured to: obtain a processing manner corresponding to a reference frame corresponding to the current video frame, and determine the second threshold according to the processing manner.

Figure 39:
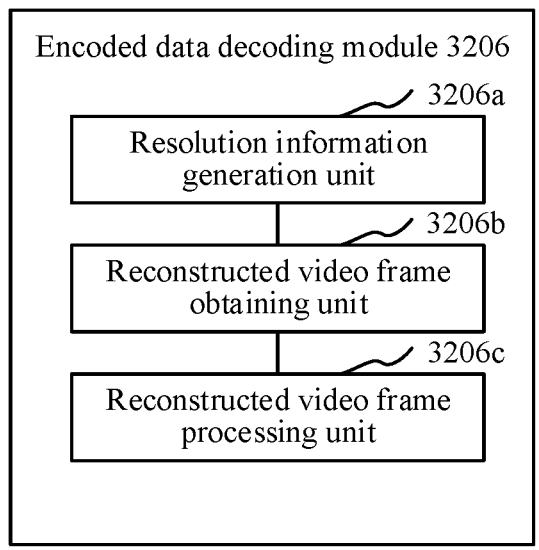
FIG. 39 is a structural block diagram of an encoded data decoding module according to an embodiment of this application.

In an embodiment, as shown in FIG. 39, the encoded data decoding module 3206 includes:

a resolution information generation unit 3206a, configured to determine resolution information corresponding to the current video frame according to the target processing manner;

a reconstructed video frame obtaining unit 3206b, configured to decode the encoded data according to the resolution information corresponding to the current video frame, to obtain a reconstructed video frame corresponding to the current video frame; and a reconstructed video frame processing unit 3206c, configured to process the reconstructed video frame according to the resolution information corresponding to the current video frame, to obtain the corresponding decoded video frame.

In an embodiment, the processing parameter obtaining module 3204 is further configured to: obtain a frame type corresponding to the current video frame, and obtain the processing parameter corresponding to the current video frame according to the frame type.

In an embodiment, the processing parameter obtaining module 3204 is further configured to: obtain bit rate information corresponding to the current video frame, obtain original resolution information and a first threshold that correspond to the current video frame, calculate a first ratio according to the bit rate information and the original resolution information, and determine the target processing manner corresponding to the current video frame according to the first ratio and the first threshold.

In an embodiment, the processing parameter obtaining module 3204 is further configured to: obtain a current quantization parameter corresponding to the current video frame; obtain a quantization parameter threshold corresponding to the current video frame; and determine a processing manner corresponding to the current video frame according to a magnitude relationship between the current quantization parameter and the quantization parameter threshold.

In an embodiment, the resolution information generation unit 3206a is further configured to: read processing manner information from the encoded data, and obtain resolution information corresponding to the current video frame according to the processing manner information.

In an embodiment, the resolution information generation unit 3206a is configured to: calculate a second ratio of decoded blocks of a target prediction type in a forward decoded video frame corresponding to the current video frame; determine a processing manner corresponding to the current video frame according to the second ratio; and obtain resolution information corresponding to the current video frame according to the processing manner.

In an embodiment, the reconstructed video frame obtaining unit 3206b is further configured to: obtain a reference frame corresponding to the current video frame; and decode the encoded data according to the resolution information corresponding to the current video frame and the reference frame, to obtain a reconstructed video frame corresponding to the current video frame.

Figure 40:
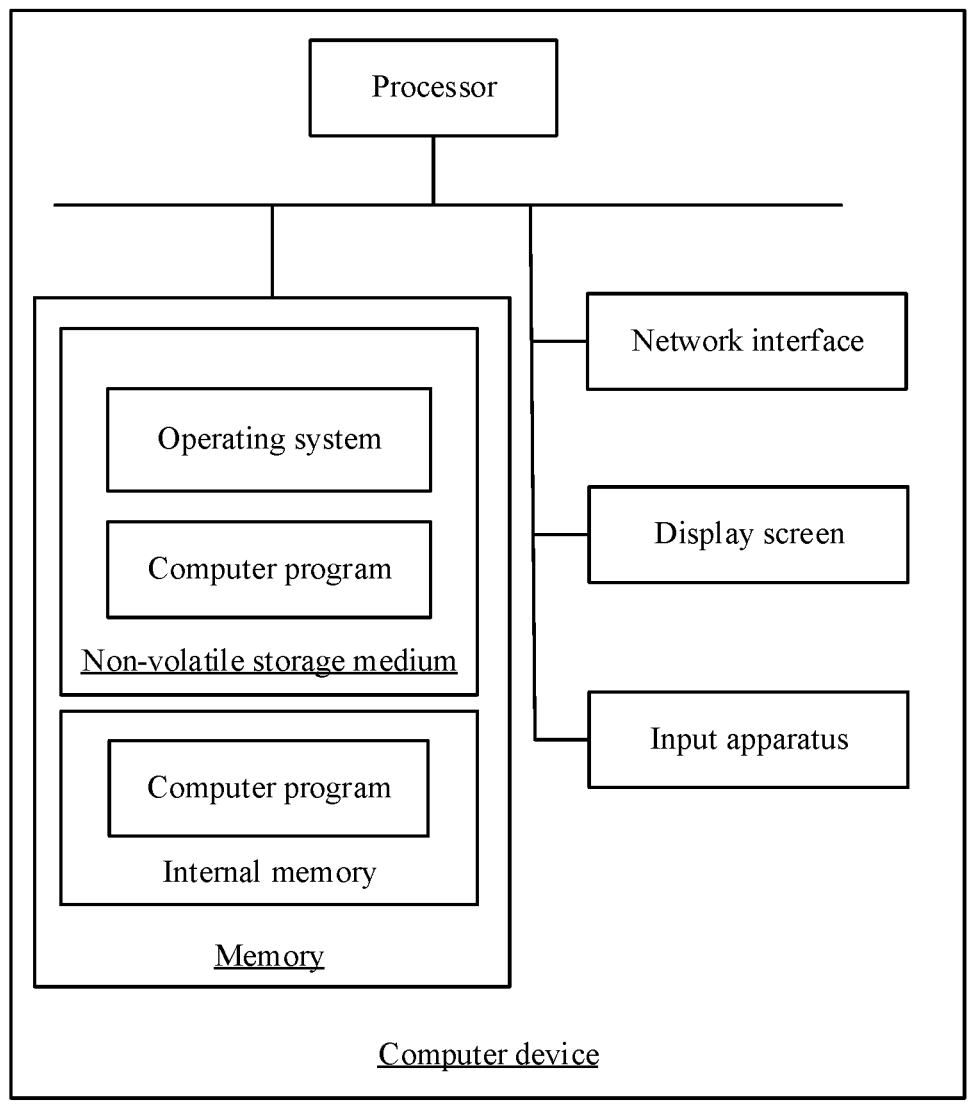
FIG. 40 is a structural block diagram of a computer device according to an embodiment of this application.

FIG. 40 is a diagram of an internal structure of a computer device according to an embodiment. The computer device may be the terminal 110 in FIG. 1. As shown in FIG. 40, the computer device includes a processor, a memory, a network interface, an input apparatus, and a display screen that are connected by using a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. The computer program, when executed by the processor, may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, mouse or the like.

Figure 41:
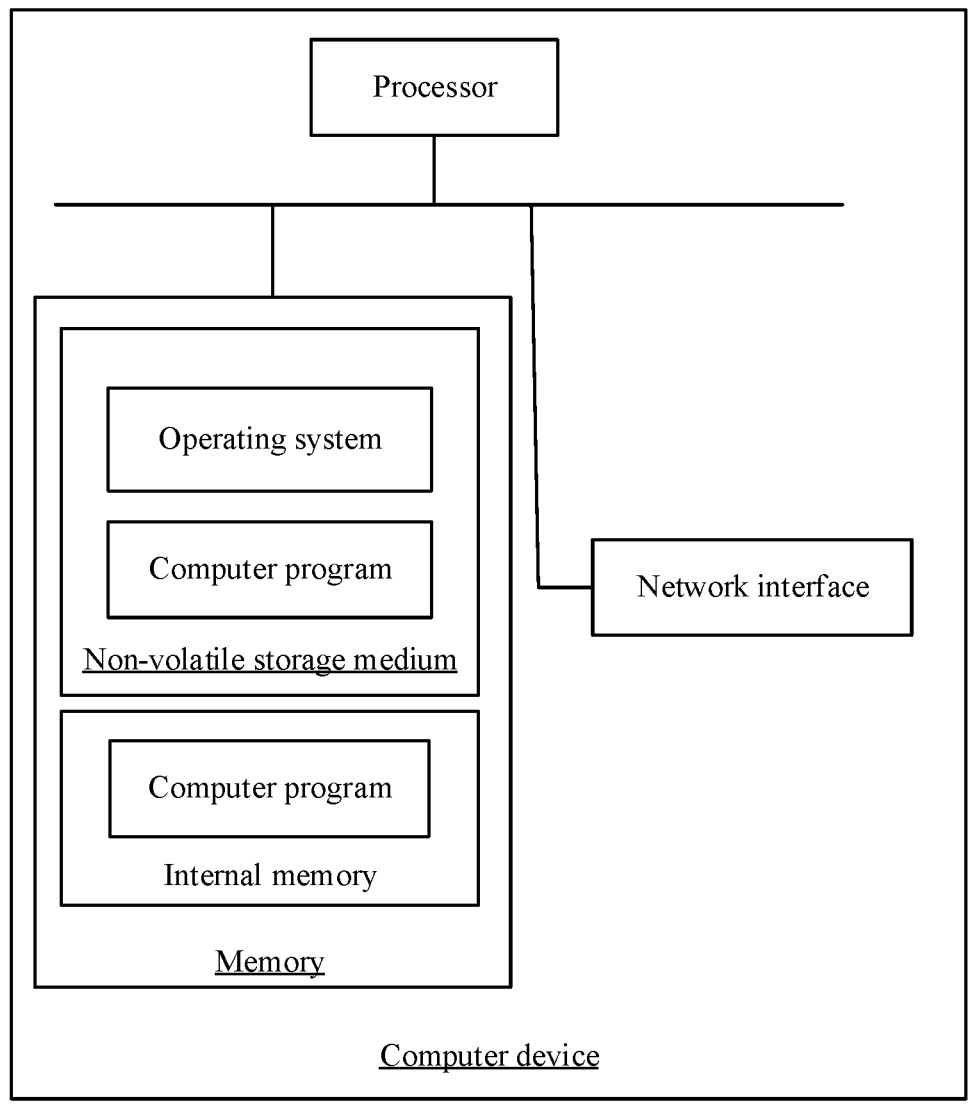
FIG. 41 is a structural block diagram of a computer device according to another embodiment of this application.

FIG. 41 is a diagram of an internal structure of a computer device according to an embodiment. The computer device may be the server 120 in FIG. 1. As shown in FIG. 41, the computer device includes a processor, a memory, and a network interface that are connected by using a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. The computer program, when executed by the processor, may cause the processor to perform at least one of the video encoding method and the video decoding method.

A person skilled in the art may understand that in the structures shown in FIG. 40 and FIG. 41, only block diagrams of a partial structure related to a solution in this application are shown, and FIG. 40 and FIG. 41 do not constitute a limitation to the computer device to which the solution in this application is applied. The computer device may include more or fewer components than those shown in FIG. 40 and FIG. 41, or some components may be combined, or a different component deployment may be used.

In an embodiment, the video encoding apparatus provided in this application may be implemented in a form of a computer program, and the computer program may run on the computer device shown in FIG. 40 or FIG. 41. The memory of the computer device may store various program modules that constitute the video encoding apparatus, for example, as shown in FIG. 31, the input video frame obtaining module, the processing parameter obtaining module, and the input video frame encoding module. The computer program formed by the various program modules causes the processor to perform the steps in the video encoding method of the embodiments of this application described in this specification.

For example, the computer device shown in FIG. 40 or FIG. 41 may obtain an input video frame by using the input video frame obtaining module in the video encoding apparatus shown in FIG. 31. The computer device may obtain a processing parameter corresponding to the input video frame by using the processing parameter obtaining module, and determine a target processing manner corresponding to the input video frame from candidate processing manners according to the processing parameter, the processing parameter being a parameter reproduced in a decoding process, and the candidate processing manners including at least one of a full resolution processing manner and a downsampling processing manner. The computer device may encode the input video frame by using the input video frame encoding module according to the target processing manner to obtain encoded data corresponding to the input video frame.

In an embodiment, the video decoding apparatus provided in this application may be implemented in a form of a computer program, and the computer program may run on the computer device shown in FIG. 40 or FIG. 41. The memory of the computer device may store various program modules that constitute the video encoding apparatus, for example, as shown in FIG. 36, the encoded data obtaining module, the processing parameter obtaining module, and the encoded data decoding module. The computer program formed by the various program modules causes the processor to perform the steps in the video encoding method of the embodiments of this application described in this specification.

For example, the computer device shown in FIG. 40 or FIG. 41 may obtain encoded data corresponding to a current video frame by using the encoded data obtaining module in the video encoding apparatus shown in FIG. 36. The computer device may obtain a processing parameter corresponding to the current video frame by using the processing parameter obtaining module, and determine a target processing manner corresponding to the current video frame according to the processing parameter, the target processing manner being one of candidate processing manners, the candidate processing manners including at least one of a full resolution processing manner and a downsampling processing manner, and the processing parameter being consistent with a corresponding processing parameter in an encoding process. The computer device may decode the encoded data corresponding to the current video frame by using the encoded data decoding module according to the target processing manner, to obtain a corresponding decoded video frame.

A person of ordinary skill in the art can understand that all or some of the procedures in the methods of the foregoing embodiments may be implemented by a computer program instructing related hardware. The program may be stored in a non-volatile computer-readable storage medium. When the program is executed, the procedures of the embodiments of the foregoing methods may be performed. Any reference to a memory, a storage, a database, or other mediums in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description instead of limitation, the RAM may be in a plurality of forms such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are to be considered as falling within the scope described in this specification.

The foregoing embodiments show only several implementations of this application, and descriptions thereof are in detail, but are not to be understood as limiting the patent scope of this application. A person of ordinary skill in the art may further make several variations and improvements without departing from the idea of this application, and the variations and improvements all fall within the protection scope of this application. Therefore, the patent protection scope of this application is subject to the appended claims.

What is claimed is:

1. A video decoding method, applied to a computer device having a processor and memory storing a plurality of computer programs to be executed by the processor, the method comprising:
obtaining encoded data corresponding to a current video frame;
obtaining a processing parameter corresponding to the current video frame, including:
obtaining bit rate information corresponding to the current video frame; and
obtaining original resolution information and a first threshold that correspond to the current video frame;
determining a target processing manner corresponding to the current video frame according to the processing parameter, the target processing manner being one of a plurality of candidate processing manners, the candidate processing manners comprising at least one of a full resolution processing manner and a downsampling processing manner, and the processing parameter is consistent with a corresponding processing parameter in an encoding process, the determining including:
    calculating a first ratio between the bit rate information and the original resolution information; and
    determining the target processing manner corresponding to the current video frame according to the first ratio and the first threshold; and
decoding the encoded data corresponding to the current video frame according to the target processing manner, to obtain a corresponding decoded video frame.

2. The method according to claim 1, wherein the obtaining a processing parameter corresponding to the current video frame comprises:
    obtaining a frame type corresponding to the current video frame, and obtaining the processing parameter corresponding to the current video frame according to the frame type.

3. The method according to claim 1, wherein the determining a target processing manner corresponding to the current video frame according to the processing parameter further includes:
    calculating a second ratio of encoded blocks of a target prediction type in a forward decoded video frame corresponding to the current video frame, the second ratio being a ratio of the encoded blocks of the target prediction type to encoded blocks of other prediction types, or the second ratio being a ratio of a quantity of the encoded blocks of the target prediction type to a total quantity of encoded blocks; and
    determining the target processing manner corresponding to the current video frame according to the second ratio.

4. The method according to claim 3, wherein the encoded blocks of the target prediction type are intra-coded blocks;
    the calculating a second ratio of encoded blocks of a target prediction type in a forward decoded video frame corresponding to the current video frame comprises:
    calculating a second ratio of the intra-coded blocks in the forward decoded video frame in the forward decoded video frame; and
    the determining the target processing manner corresponding to the current video frame according to the second ratio comprises:
    determining, in a case that the second ratio is greater than a second threshold, that the target processing manner is a downsampling processing manner.

5. The method according to claim 4, further comprising:
obtaining a processing manner corresponding to a reference frame corresponding to the current video frame; and
determining the second threshold according to the processing manner.

6. The method according to claim 1, wherein the obtaining a processing parameter corresponding to the current video frame, and determining a target processing manner corresponding to the current video frame according to the processing parameter comprises:
    obtaining a current quantization parameter corresponding to the current video frame;
    obtaining a quantization parameter threshold corresponding to the current video frame; and
    determining a processing manner corresponding to the current video frame according to a magnitude relationship between the current quantization parameter and the quantization parameter threshold.

7. The method according to claim 1, wherein the decoding the encoded data corresponding to the current video frame according to the target processing manner, to obtain a corresponding decoded video frame comprises:
    determining resolution information corresponding to the current video frame according to the target processing manner;
    decoding the encoded data according to the resolution information corresponding to the current video frame, to obtain a reconstructed video frame corresponding to the current video frame; and
    processing the reconstructed video frame according to the resolution information corresponding to the current video frame, to obtain the corresponding decoded video frame.

8. The method according to claim 1, wherein the processing parameter comprises:
    encoded data transmitted to a decoder side; or
    processing data obtained according to the encoded data transmitted to the decoder side; or
    the encoded data and the processing data.

9. The method according to claim 1, wherein the determining a target processing manner corresponding to the current video frame according to the processing parameter further includes:
    obtaining a forward encoded block in a forward decoded video frame corresponding to the current video frame;
    calculating a module gradient corresponding to the forward encoded block;
    classifying the forward encoded block into a target module class in a module class set according to the module gradient, candidate module classes in the module class set being respectively corresponding to different module gradient ranges;
    obtaining a correspondence between the candidate module classes and the candidate processing manners; and
    determining the target processing manner corresponding to the current video frame according to the target module class and the correspondence between the candidate module classes and the candidate processing manners.

10. The method according to claim 1, wherein the determining a target processing manner corresponding to the current video frame according to the processing parameter further includes:
    calculating a target image content complexity corresponding to a forward reconstruction frame corresponding to the current video frame;
    obtaining a correspondence between the candidate image content complexity and the candidate processing manners; and
    determining the target processing manner corresponding to the target image content complexity according to the correspondence.

11. A computer device, comprising:
a processor; and
memory, the memory storing a plurality of computer programs that, when executed by the processor, cause the processor to perform a plurality of operations including:
    obtaining encoded data corresponding to a current video frame;
    obtaining a processing parameter corresponding to the current video frame, including:
        obtaining bit rate information corresponding to the current video frame; and
        obtaining original resolution information and a first threshold that correspond to the current video frame;

determining a target processing manner corresponding to the current video frame according to the processing parameter, the target processing manner being one of a plurality of candidate processing manners, the candidate processing manners comprising at least one of a full resolution processing manner and a downsampling processing manner, and the processing parameter is consistent with a corresponding processing parameter in an encoding process, the determining including:
  calculating a first ratio between the bit rate information and the original resolution information; and
  determining the target processing manner corresponding to the current video frame according to the first ratio and the first threshold; and
decoding the encoded data corresponding to the current video frame according to the target processing manner, to obtain a corresponding decoded video frame.

12. The computer device according to claim 11, wherein the obtaining a processing parameter corresponding to the current video frame comprises:
  obtaining a frame type corresponding to the current video frame, and obtaining the processing parameter corresponding to the current video frame according to the frame type.

13. The computer device according to claim 11, wherein the determining a target processing manner corresponding to the current video frame according to the processing parameter further includes:
  calculating a second ratio of encoded blocks of a target prediction type in a forward decoded video frame corresponding to the current video frame, the second ratio being a ratio of the encoded blocks of the target prediction type to encoded blocks of other prediction types, or the second ratio being a ratio of a quantity of the encoded blocks of the target prediction type to a total quantity of encoded blocks; and
  determining the target processing manner corresponding to the current video frame according to the second ratio.

14. The computer device according to claim 11, wherein the obtaining a processing parameter corresponding to the current video frame, and determining a target processing manner corresponding to the current video frame according to the processing parameter comprises:
  obtaining a current quantization parameter corresponding to the current video frame;
  obtaining a quantization parameter threshold corresponding to the current video frame; and
  determining a processing manner corresponding to the current video frame according to a magnitude relationship between the current quantization parameter and the quantization parameter threshold.

15. The computer device according to claim 11, wherein the decoding the encoded data corresponding to the current video frame according to the target processing manner, to obtain a corresponding decoded video frame comprises:
  determining resolution information corresponding to the current video frame according to the target processing manner;
  decoding the encoded data according to the resolution information corresponding to the current video frame, to obtain a reconstructed video frame corresponding to the current video frame; and
  processing the reconstructed video frame according to the resolution information corresponding to the current video frame, to obtain the corresponding decoded video frame.

16. The computer device according to claim 11, wherein the determining a target processing manner corresponding to the current video frame according to the processing parameter further includes:
  obtaining a forward encoded block in a forward decoded video frame corresponding to the current video frame;
  calculating a module gradient corresponding to the forward encoded block;
  classifying the forward encoded block into a target module class in a module class set according to the module gradient, candidate module classes in the module class set being respectively corresponding to different module gradient ranges;
  obtaining a correspondence between the candidate module classes and the candidate processing manners; and
  determining the target processing manner corresponding to the current video frame according to the target module class and the correspondence between the candidate module classes and the candidate processing manners.

17. The computer device according to claim 11, wherein the determining a target processing manner corresponding to the current video frame according to the processing parameter comprises:
  calculating a target image content complexity corresponding to a forward reconstruction frame corresponding to the current video frame;
  obtaining a correspondence between the candidate image content complexity and the candidate processing manners; and
  determining the target processing manner corresponding to the target image content complexity according to the correspondence.

18. A non-transitory computer-readable storage medium, storing a plurality of computer programs, the computer programs, when executed by a processor of a computer device, causing the computer device to perform a plurality of operations including:
  obtaining encoded data corresponding to a current video frame;
  obtaining a processing parameter corresponding to the current video frame, including:
    obtaining bit rate information corresponding to the current video frame; and
    obtaining original resolution information and a first threshold that correspond to the current video frame;
  determining a target processing manner corresponding to the current video frame according to the processing parameter, the target processing manner being one of a plurality of candidate processing manners, the candidate processing manners comprising at least one of a full resolution processing manner and a downsampling processing manner, and the processing parameter is consistent with a corresponding processing parameter in an encoding process, the determining including:
    calculating a first ratio between the bit rate information and the original resolution information; and
    determining the target processing manner corresponding to the current video frame according to the first ratio and the first threshold; and
  decoding the encoded data corresponding to the current video frame according to the target processing manner, to obtain a corresponding decoded video frame.

* * * * *